(12) United States Patent
Song et al.

(10) Patent No.: US 7,797,205 B2
(45) Date of Patent: Sep. 14, 2010

(54) SYSTEM FOR OPTIMIZING BULK PRODUCT ALLOCATION, TRANSPORTATION AND BLENDING

(75) Inventors: Jin-Hwa Song, Whitehouse Station, NJ (US); Kevin C. Furman, Glen Gardner, NJ (US); Gary R. Kocis, Vienna, VA (US); Michael K. McDonald, Burke, VA (US); Philip H. Warrick, Oakton, VA (US); Chad D. Reimann, Baton Rouge, LA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 12/292,600

(22) Filed: Nov. 21, 2008

(65) Prior Publication Data

US 2009/0192864 A1 Jul. 30, 2009

Related U.S. Application Data

(60) Provisional application No. 61/008,581, filed on Dec. 21, 2007.

(51) Int. Cl.
*G06Q 10/00* (2006.01)
*G06F 17/50* (2006.01)
*G06F 17/30* (2006.01)

(52) U.S. Cl. .................................. 705/28; 705/7; 705/10
(58) Field of Classification Search ....................... None
See application file for complete search history.

(56) References Cited

U.S. PATENT DOCUMENTS

| 6,915,268 B2 * | 7/2005 | Riggs et al. ..................... 705/7 |
| 7,043,414 B2 | 5/2006 | Brown |
| 7,142,936 B2 | 11/2006 | Yokomori et al. |
| 2003/0018490 A1 | 1/2003 | Magers et al. |

OTHER PUBLICATIONS

International Search Report, PCT/US 08/13818, mailed Feb. 6, 2009.
Written Opinion, PCT/US 08/13818, mailed Feb. 6, 2009.

* cited by examiner

*Primary Examiner*—F. Ryan Zeender
*Assistant Examiner*—Denisse Ortiz Roman
(74) *Attorney, Agent, or Firm*—W. R. H. Clark

(57) ABSTRACT

A computer application loaded on a computer readable medium, a computer apparatus comprising the same, and process employing the same, is described herein. The computer application, when executed, causes a computer to optimize, for maximum net profit margin, the product allocation, transportation routing, transportation vehicle/route scheduling and, optionally, blending, of bulk products that are produced by and loaded from supply locations and delivered to and consumed by demand locations, using a heterogeneous fleet of transportation vehicles over a pre-defined period of time.

15 Claims, 25 Drawing Sheets

Figure 1:
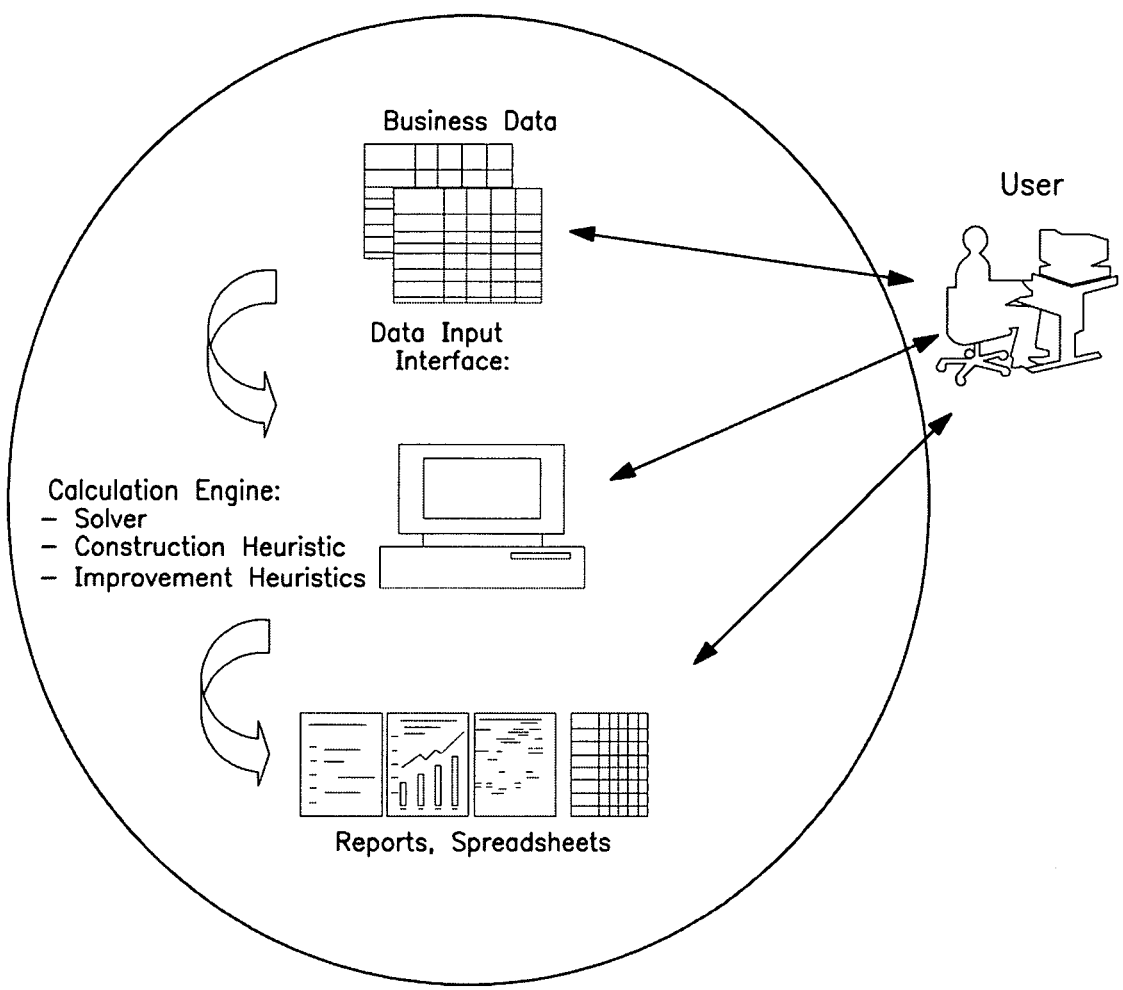

|   | A | B | C | D | E | F |
|---|---|---|---|---|---|---|
| 1 |   |   |   |   |   |   |
| 2 |   |   | Time Period: |   |   |   |
| 3 |   |   |   |   |   |   |
| 4 |   |   | Number of Outlook Days | 56 |   |   |
| 5 |   |   | Number of Rollover Days | 17 |   |   |
| 6 |   |   |   |   |   |   |
| 7 |   |   |   |   |   |   |
| 8 |   |   | Production Start Date | 7/30/2007 |   |   |
| 9 |   |   | Production End Date | 9/23/2007 |   |   |
| 10 |   |   | Demand Start Date | 8/16/2007 |   |   |
| 11 |   |   | Demand End Date | 10/10/2007 |   |   |
| 12 |   |   |   |   |   |   |
| 17 |   |   |   |   |   |   |
| 18 |   |   |   |   |   |   |
| 19 |   |   |   |   |   |   |
| 20 |   |   | Values for Problem Options |   |   |   |
| 21 |   |   |   |   |   |   |
| 22 |   |   | Minimum Total VGO Transported | 350 |   |   |
| 23 |   |   | Minimum Number of Ships | 6 |   |   |
| 24 |   |   | Maximum Number of Ships | 10 |   |   |
| 25 |   |   | Maximum Cost Per Ton of VGO | 60 |   |   |
| 26 |   |   | Load Side Slack Penalty | 1 |   |   |
| 27 |   |   | Discharge Side Slack Penalty | 3 |   |   |
| 28 |   |   |   |   |   |   |
| 29 |   |   |   |   |   |   |
| 30 |   |   |   |   |   |   |
| 31 |   |   | Inventory Holding Cost at Load Port | 0.19 |   |   |
| 32 |   |   | Inventory Holding Cost at Discharge Port | 0.19 |   |   |
| 33 |   |   | Inventory Holding Cost on Ship | 0.19 |   |   |
| 34 |   |   |   |   |   |   |

| | A | B | C | D | E | F | G | H | I |
|---|---|---|---|---|---|---|---|---|---|
| 52 | | | | | | | | | |
| 53 | | | | | | | | | |
| 54 | | | XOM Load Port Properties | | | | | | |
| 55 | | | | | | | | | |
| 56 | | | XOM Load Ports | Min Flow | Max Flow | Outlet Draft Limit | Inlet Draft Limit | Load Revisit Limit | Days For Next Visit (adjacency) |
| 57 | | | LP1 | 5 | 72 | 72 | 35 | 1 | 1 |
| 58 | | | LP2 | 5 | 40 | 90 | 90 | 3 | 3 |
| 59 | | | LP3 | 5 | 72 | 72 | 72 | 0 | 0 |
| 60 | | | LP4 | 5 | 72 | 72 | 72 | 0 | 0 |
| 61 | | | LP5 | 5 | 55 | 72 | 55 | 0 | 0 |
| 62 | | | LP6 | 5 | 55 | 72 | 55 | 0 | 0 |
| 63 | | | LP7 | 5 | 55 | 55 | 55 | 0 | 0 |
| 64 | | | LP8 | 5 | 55 | 55 | 55 | 0 | 0 |
| 65 | | | LP9 | 5 | 55 | 55 | 55 | 0 | 0 |
| 66-78 | | | | | | | | | |
| 79 | | | 3rd Party Load Ports Properties | | | | | | |
| 80 | | | 3rd Party Load Ports | Min Flow | Max Flow | Outlet Draft Limit | Inlet Draft Limit | Revisit Limit | |
| 81 | | | LP1 | 5 | 55 | 72 | 72 | 0 | |
| 82 | | | LP2 | 5 | 55 | 72 | 72 | 0 | |
| 83 | | | LP3 | 5 | 55 | 72 | 72 | 0 | |
| 84 | | | LP4 | 5 | 55 | 72 | 72 | 0 | |

Start \ Port \ Product-Spec_Def \ Product-Supply \ Product-Demand \ Production \ Consump

CAPS

FIG. 4D

|   | A | B | C | D | E | F | G |
|---|---|---|---|---|---|---|---|
| 1 |   | Product-Spec_Def |   |   |   |   |   |
| 2 |   | Spec Definition for FCC VGO |   |   |   |   |   |
| 3 |   |   |   |   |   | Value |   |
| 4 |   |   |   |   |   | Base |   |
| 5 |   |   |   | Units | Reverse | Unit |   |
| 6 |   |   | Sulfur | wt% | N | 0.5 |   |
| 7 |   |   | Analine | deg F | Y | 10.0 |   |
| 8 |   |   | CCR | wt% | N | 0.2 |   |
| 9 |   |   | N2 | ppm | N | 200 |   |
| 10 |   |   | Na | ppm | N | 1.0 |   |
| 11 |   |   | Ni | ppm | N | 1.0 |   |
| 12 |   |   | Cu | ppm | N | 1.0 |   |
| 13 |   |   | Fe | ppm | N | 1.0 |   |
| 14 |   |   | Va | ppm | N | 1.0 |   |
| 15 |   |   | 50% | deg F | Y | 50 |   |
| 16 |   |   |   |   |   |   |   |
| 17 |   |   |   |   |   |   |   |
| 18 |   |   |   |   |   |   |   |
| 19 |   | Standard Specs for FCC VGO |   |   |   |   |   |
| 20 |   |   |   |   | LSVGO | MGVGO | HSVGO |
| 21 |   |   | Minimum | Sulfur | >=0.0 | >=0.7 | >=1.4 |
| 22 |   |   | Maximum | Sulfur | <0.7 | <1.4 | 4.0 |
| 23 |   |   | Typical | Sulfur | 0.5 | 1.0 | 1.8 |
| 24 |   |   | Typical | Analine | 185 | 175 | 165 |
| 25 |   |   | Typical | CCR | 0.4 | 0.6 | 0.8 |
| 26 |   |   | Typical | N2 | 1200 | 1500 | 1700 |
| 27 |   |   | Typical | Na | 1.0 | 1.0 | 1.0 |
| 28 |   |   | Typical | Ni | 0.5 | 0.6 | 0.7 |
| 29 |   |   | Typical | Cu | 0.0 | 0.0 | 0.0 |
| 30 |   |   | Typical | Fe | 0.0 | 0.5 | 0.7 |
| 31 |   |   | Typical | Va | 1.0 | 1.0 | 1.0 |
| 32 |   |   | Typical | 50% | 800 | 800 | 800 |

FIG. 5

FIG. 6

| | A | B | C | D | E | F | G | H | I | J | K | L |
|---|---|---|---|---|---|---|---|---|---|---|---|---|
| 1 | | Product Demand | | | | | | | | | | |
| 2 | | Demand | | | | | | | | | | |
| 3 | | | Name | On/Off | Port | Feed Typ | Barrels/Ton Calculate | Barrels/Ton | API | Density | | |
| 4 | | | DP1_type1 | 1 | DP1 | FCCU | 6.950 | 6.95 | | | | |
| 5 | | | DP3_type3 | 1 | DP3 | FCCU | 6.950 | 6.95 | | | | |
| 6 | | | DP2_type2 | 0 | DP2 | | | | | | | |
| 7 | | | DP4_type1 | 0 | DP4 | | | | | | | |
| 8 | | | 3rdP_type2 | 0 | 3rdP | FCCU | 6.950 | 6.95 | | | | |
| 9 | | | USSPOT_Sale_type1 | 0 | USSPOT_S | FCCU | 6.950 | 6.95 | | | | |
| 10 | | | USSPOT_Sale_type2 | 0 | USSPOT_S | FCCU | 6.950 | 6.95 | | | | |
| 11 | | | DP5_type3 | 0 | DP5 | FCCU | 6.950 | 6.95 | | | | |
| 12 | | | DP6_type1 | 0 | DP6 | | | | | | | |
| 13 | | | DP6_type2 | 0 | DP6 | | | | | | | |
| 14 | | | DP6_type3 | 0 | DP6 | | | | | | | |
| 15 | | | DP7_type1 | 0 | DP7 | FCCU | 6.950 | 6.95 | | | | |
| 16 | | | DP7_type3 | 1 | DP7 | FCCU | 6.950 | 6.95 | | | | |
| 17 | | | | 0 | | | | | | | | |
| 18 | | | | 0 | | | | | | | | |
| 19 | | | | 0 | | | | | | | | |
| 20 | | | | 0 | | | | | | | | |
| 21 | | | | 0 | | | | | | | | |
| 22 | | | | 0 | | | | | | | | |
| 23 | | | | 0 | | | | | | | | |
| 24 | | | | | | | | | | | | |
| 25 | | | | | | | | | | | | |
| 26 | | | | | | | | | | | | |
| 27 | | | | DP1_type1 | DP3_type3 | | | | | | DP7_type3 | |
| 28 | | | Product | LSVGO | HSVGO | | | | | | HSVGO | |
| 29 | | | Base Value | 79.38 | 76.75 | | | | | | 85.00 | |
| 30 | | | Min | | | | | | | | | |
| 31 | | | Sulfur | 0.3 | 1.8 | 1.8 | 0.3 | 1.8 | 1.8 | 0.08 | 1.8 | |
| 32 | | | Analine | 165 | 145 | 145 | 145 | 135 | 165 | 165 | 145 | |
| 33 | | | CCR | 0.1 | 0.3 | 0.3 | 0.1 | 0.1 | 0.3 | 0.1 | 0.3 | |
| 34 | | | N2 | 600 | 1500 | 1500 | 600 | 1500 | 1500 | 600 | 1500 | |
| 35 | | | Na | 0.1 | 1.0 | 1.0 | 0.1 | 1.0 | 1 | 0.1 | 1.0 | |
| 36 | | | Ni | 0.1 | 1.0 | 1.0 | 0.1 | 1.0 | 1 | 0.1 | 1.0 | |
| 37 | | | Cu | 0.1 | 1.0 | 1.0 | 0.1 | 1.0 | 1 | 0.1 | 1.0 | |
| 38 | | | Fe | 0.1 | 1.0 | 1.0 | 0.1 | 1.0 | 1 | 0.1 | 1.0 | |
| 39 | | | Va | 0.1 | 1.0 | 1.0 | 0.1 | 1.0 | 1 | 0.1 | 1.0 | |
| 40 | | | 50% | 500 | 500 | 500 | 500 | 500 | 500 | 500 | 500 | |
| 41 | | | Max | | | | | | | | | |
| 42 | | | Sulfur | 0.5 | 2.6 | 2.0 | 0.5 | 2.5 | 2 | 0.12 | 2.6 | |
| 43 | | | Analine | 200 | 200 | 200 | 200 | 200 | 200 | 200 | 200 | |
| 44 | | | CCR | 0.5 | 0.8 | 0.8 | 0.5 | 2.0 | 0.5 | 0.5 | 0.8 | |
| 45 | | | N2 | 1200 | 2000 | 2000 | 1200 | 3000 | 1600 | 1200 | 2000 | |
| 46 | | | Na | 1.5 | 1.5 | 1.5 | 1.5 | 2.0 | 1.5 | 1.0 | 1.5 | |
| 47 | | | Ni | 1.5 | 1.5 | 1.5 | 1.5 | 2.0 | 1.5 | 1.0 | 1.5 | |
| 48 | | | Cu | 1.5 | 1.5 | 1.5 | 1.5 | 2.0 | 1.5 | 1.0 | 1.5 | |
| 49 | | | Fe | 1.5 | 1.5 | 1.5 | 1.5 | 2.0 | 1.5 | 1.0 | 1.5 | |
| 50 | | | Va | 1.5 | 1.5 | 1.5 | 1.5 | 2.0 | 1.5 | 1.0 | 1.5 | |
| 51 | | | 50% | 900 | 900 | 900 | 900 | 1000 | 900 | 900 | 900 | |
| 52 | | | Value vs. Standard | | | | | | | | | |
| 53 | | | Sulfur | 0.18 | 0.36 | 0.21 | 0.27 | 0.25 | 0.07 | 0.17 | 0.43 | |
| 54 | | | Analine | 0.05 | 0.04 | 0.06 | 0.09 | 0.02 | 0.05 | 0.07 | 0.02 | |
| 55 | | | CCR | 0.05 | 0.34 | 0.11 | 0.03 | 0.02 | 0.03 | 0.08 | 0.05 | |
| 56 | | | N2 | 0.08 | 0.05 | 0.07 | 0.13 | 0.08 | 0.12 | 0.10 | 0.23 | |
| 57 | | | Na | 0.01 | 0.02 | 0.07 | 0.09 | 0.03 | 0.05 | 0.12 | 0.04 | |
| 58 | | | Ni | 0.27 | 0.18 | 0.03 | 0.13 | 0.13 | 0.22 | 0.13 | 0.25 | |
| 59 | | | Cu | 0.17 | 0.12 | 0.11 | 0.27 | 0.18 | 0.31 | 0.07 | 0.22 | |
| 60 | | | Fe | 0.03 | 0.02 | 0.03 | 0.02 | 0.00 | 0.01 | 0.05 | 0.02 | |
| 61 | | | Va | 0.10 | 0.25 | 0.02 | 0.15 | 0.01 | 0.08 | 0.06 | 0.05 | |
| 62 | | | 50% | 0.03 | 0.06 | 0.03 | 0.08 | 0.03 | 0.04 | 0.08 | 0.09 | |

Demand Schedule for XOM Discharge Ports

| | | DP1_type1 | | | DP3_type3 | | | | DP7_type3 | | | | | | | |
|---|---|---|---|---|---|---|---|---|---|---|---|---|---|---|---|---|
| | | Inv | Min | Max | Inv | Min | Max | Inv | Inv | Min | Max | Inv | Min | Max | Inv | Min | Max | Inv |
| 2007-8-16 | 100.0 | 50.0 | 115.0 | 0.0 | 0.0 | 500.0 | 0.0 | 0.0 | 30.0 | 0.0 | 0.0 | 50.0 | 0.0 | 0.0 | 7.0 | 0.0 | 0.0 | 15.0 | 0.0 | 0.0 | 10.0 | 0.0 | 0 |
| 2007-8-17 | 93.0 | 50.0 | 115.0 | 0.0 | 0.0 | 500.0 | 0.0 | 0.0 | 30.0 | 0.0 | 0.0 | 50.0 | 0.0 | 0.0 | 7.0 | 0.0 | 0.0 | 15.0 | 0.0 | 0.0 | 10.0 | 0.0 | 0 |
| 2007-8-18 | 72.0 | 50.0 | 115.0 | 0.0 | 0.0 | 500.0 | 0.0 | 0.0 | 30.0 | 0.0 | 0.0 | 50.0 | 0.0 | 0.0 | 7.0 | 0.0 | 0.0 | 15.0 | 0.0 | 0.0 | 10.0 | 0.0 | 0 |
| 2007-8-19 | 73.0 | 50.0 | 115.0 | 0.0 | 0.0 | 500.0 | 0.0 | 0.0 | 30.0 | 0.0 | 0.0 | 50.0 | 0.0 | 0.0 | 7.0 | 0.0 | 0.0 | 15.0 | 0.0 | 0.0 | 10.0 | 0.0 | 0 |
| 2007-8-20 | 72.0 | 50.0 | 115.0 | 0.0 | 0.0 | 500.0 | 0.0 | 0.0 | 30.0 | 0.0 | 0.0 | 50.0 | 0.0 | 0.0 | 7.0 | 0.0 | 0.0 | 15.0 | 0.0 | 0.0 | 10.0 | 0.0 | 0 |

3rd Party Discharge Ports Availability for spot sales

| 3rd Party Discharge Port Product | Window Start date | Window End date | Amount |
|---|---|---|---|

Availability for Spot Market Sales

| | USSPOT_Sale_typ | USSPOT_Sale_type3 |
|---|---|---|
| 2007-8-16 | 72.0 | 55.0 |
| 2007-8-17 | 72.0 | 55.0 |
| 2007-8-18 | 72.0 | 55.0 |
| 2007-8-19 | 72.0 | 55.0 |
| 2007-8-20 | 72.0 | 55.0 |
| 2007-8-21 | 72.0 | 55.0 |
| 2007-8-22 | 72.0 | 55.0 |
| 2007-8-23 | 72.0 | 55.0 |
| 2007-8-24 | 72.0 | 55.0 |
| 2007-8-25 | 72.0 | 55.0 |

| | A | B | C | D | E | F | G | H | I | J | K | L | M | N | O |
|---|---|---|---|---|---|---|---|---|---|---|---|---|---|---|---|
| 1 | | | | | | | | | | | | | | | |
| 2 | | Ship | | | | | | | | | | | | | |
| 3 | | | Vessel Use | Vessel Type | Max Capacity | World Scale | Base Volume | Overage | Demurrage | Max Demurrage Days (Actual) | Start Date (chartered date) for Vessel | Last Window Date | Actual Arrival Date for Chartered Vessels | Penalty/ (Incentive) to use Vessel | Min % Basis Vol |
| 4 | | | Chartered | Panamax | 54 | 1.870 | 55 | 0.0 | 29 | 12 | 24-Apr-07 | 24-Apr-07 | 24-Apr-07 | 0 | 0.65 |
| 5 | | | Chartered | Panamax | 55 | 1.600 | 55 | 0.0 | 29 | 12 | 25-Jul-07 | 25-Jul-07 | 25-Jul-07 | 0 | 0.65 |
| 6 | | P1 | Chartered | Panamax | 51 | 1.740 | 55 | 0.0 | 29 | 12 | 03-Aug-07 | 03-Aug-07 | 31-Jul-07 | 0 | 0.65 |
| 7 | | P2 | Chartered | Panamax | 55 | 1.740 | 55 | 0.0 | 29 | 12 | 07-Aug-07 | 07-Aug-07 | 07-Aug-07 | 0 | 0.65 |
| 8 | | P3 | Chartered | Panamax | 53 | 1.750 | 55 | 0.0 | 29 | 12 | 09-Aug-07 | 09-Aug-07 | 09-Aug-07 | 0 | 0.65 |
| 9 | | P4 | Chartered | Panamax | 54 | 1.750 | 55 | 0.0 | 29 | 12 | 09-Aug-07 | 09-Aug-07 | 06-Aug-07 | 0 | 0.65 |
| 10 | | P5 | New | Panamax | 54 | 1.750 | 55 | 0.0 | 29 | 12 | 10-Aug-07 | 31-Aug-07 | 10-Aug-07 | 0 | 0.65 |
| 11 | | P6 | New | Panamax | 54 | 1.750 | 55 | 0.0 | 29 | 12 | 15-Aug-07 | 31-Aug-07 | 15-Aug-07 | 0 | 0.65 |
| 12 | | P7 | New | Panamax | 54 | 1.750 | 55 | 0.0 | 29 | 12 | 15-Aug-07 | 31-Aug-07 | 15-Aug-07 | 0 | 0.65 |
| 13 | | P8 | New | Panamax | 54 | 1.750 | 55 | 0.0 | 29 | 12 | 15-Aug-07 | 31-Aug-07 | 15-Aug-07 | 0 | 0.65 |
| 14 | | | New | Panamax | 54 | 1.750 | 55 | 0.0 | 29 | 12 | 15-Aug-07 | 31-Aug-07 | 15-Aug-07 | 0 | 0.65 |
| 15 | | A1 | Chartered | Aframax | 72 | 1.400 | 80 | 0.0 | 35 | 12 | 20-Aug-07 | 31-Aug-07 | 20-Aug-07 | 0 | 0.65 |
| 16 | | | New | Aframax | 72 | 1.50 | 80 | 0.0 | 35 | 12 | 20-Apr-07 | 15-May-07 | 20-Aug-07 | 0 | 0.65 |
| 17 | | | New | Aframax | 54 | 2.00 | 55 | 0.0 | 32 | 12 | 20-Apr-07 | 15-May-07 | 20-Apr-07 | 0 | 0.65 |
| 18 | | | | | | | | | | | | | | | |
| 19 | | | New | Panamax | 35 | 0.00 | 0 | 0.0 | 35 | 12 | 01-Apr-07 | 10-Apr-07 | 01-Apr-07 | 0 | 0.7 |
| 20 | | | | | | | | | | | | | | | |

SYSTEM FOR OPTIMIZING BULK PRODUCT ALLOCATION, TRANSPORTATION AND BLENDING

1.0 CROSS REFERENCE TO RELATED APPLICATIONS

This application relates to and claims priority to U.S. Provisional Patent Application No. 61/008,581, entitled "System for Bulk Product Allocation, Transportation and Blending", filed on Dec. 21, 2007.

1.1 BACKGROUND OF THE INVENTION 1.2. Field of the Invention

The invention relates to the field of bulk product transportation and inventory management. More particularly, the invention relates to an application stored on a computer readable medium which, when executed, causes a computer to optimize allocation, transportation routing, transportation vehicle/route scheduling and, preferably, product blending, in the movement of one or more bulk products from supply locations to consumption locations using a heterogeneous fleet of transportation vehicles over a predefined period of time.

1.3. Description of Related Art

Current approaches to optimizing product transportation, whether for the movement of discrete products or bulk products, generally focus on transportation routing and/or vehicle scheduling and do not consider inventory management. In addition, these approaches typically require one or more of the following: a single homogeneous cargo or multiple cargos that cannot be mixed; the use of a homogenous fleet of vessels; travel between a single supply location and a single demand location; and a constant rate of supply and demand. Generally, these approaches also focus on minimizing cost rather than maximizing net profit.

TurboRouter® is a tool recently developed by the Norwegian Marine Technology Research Institute, MARINTEK Logistics. It performs vessel routing and scheduling calculations. The purpose of the tool is to allow a commercial shipping company, as opposed to a chartering party, to maximize the revenue obtained by shipping optional cargo in addition to contract cargos that must be shipped. This tool, however, does not account for inventory management or envision blending.

The shipping of ammonia has been addressed by M. Christiansen et. al., *Decomposition of a combined inventory and time constrained ship routing problem*, Transportation Science, 33(1): 3-16 (1999). This article poses the problem where inventory management and routing are constrained by time-window requirements and vessels are permitted to carry partial loads. A fleet of vessels transport a single bulk product between production and consumption harbors. The economic calculations of this approach oversimplify real problems and assume constant rates of production and consumption.

The minimum cost inventory routing problem for multiple bulk liquid products (which cannot be mixed) is addressed by D. Ronen, *Marine inventory routing: shipments planning*, Journal of the Operational Research Society, 53: 108-114 (2002). The vessels in this routing problem have multiple compartments and each vessel is restricted to loading and unloading at only one port. Additionally, this routing problem only allows a homogeneous pool of vessels.

There have been numerous publications in the field of vessel routing and scheduling. One survey article is *Ship routing and scheduling: status and perspectives*, Transportation Science, 38(1): 1-18, M. Christiansen, K. Fagerholt, and D. Ronen (2004). One overview article is *Marine Transportation*, Handbooks in Operations Research and Management Science Transportation, M. Christiansen, K. Fagerholt, B. Nygreen, D. Ronen, edited by C. Barnhart and G. Laporte (2007).

One publication of note is *Scheduling Ocean Transportation of Crude Oil*, Management Science, G. G. Brown, G. W. Graves, D. Ronen, 33(3): 335-346 (1987). This paper addresses a crude oil marine transportation problem. The modeling problem described therein includes the following assumptions/simplifications: (1) each cargo (i.e., crude oil to be shipped) moves between a single loading port and a single discharging port; (2) the cargo shipped must always be a full vessel load (i.e., the cargo must be of a fixed size); and (3) each vessel is the same size. In addition, the objective function of the model is to minimize cost as opposed to net profit margin.

Another publication of note is *Fleet management models and algorithms for an oil tanker routing and scheduling problem*, H. D. Sherali, S. M. Al-Yakoob, M. M. Hassan, IIE Trans. 31: 395-406 (1999). This paper also addresses a crude oil marine transportation modeling problem. Again, the modeling problem characteristics are such that each voyage must consist of a single loading port and a single discharging port and each cargo must be a full vessel load. In addition, the objective is to minimize cost as opposed to net profit margin. The problem addressed in this paper is different from the preceding paper in that the vessels do not have to be the same size and there is an explicit treatment of vessel compartments.

There is a need in the art for an application that optimizes the total net profit associated with product allocation, transportation routing, and transportation vehicle/route scheduling and, optionally, product blending. There is a need in the art for an application that perform this function in a manner that permits the movement of multiple types and qualities of bulk product, each with non-constant rates of supply (production) and demand (consumption), and each with different monetary values, from one or more supply locations to one or more demand locations, using a heterogeneous fleet of vessels, where each vessel may make multiple loads and discharges. In particular, such an application would provide significant financial benefits in the movement of petroleum and petroleum derived products from supply locations to demand locations.

2.0 BRIEF DESCRIPTION OF THE DRAWINGS

Figure 2:
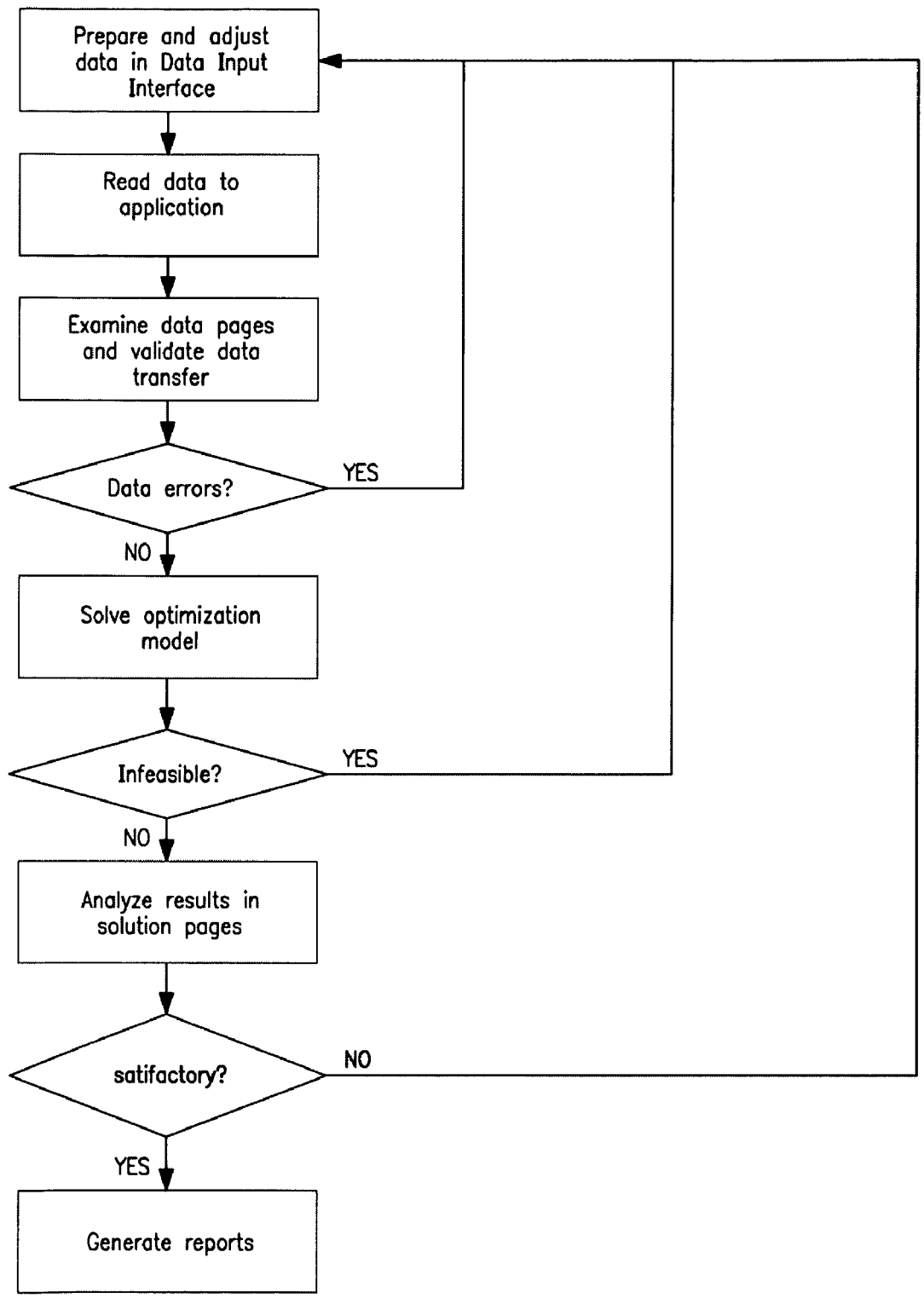
Figure 18:
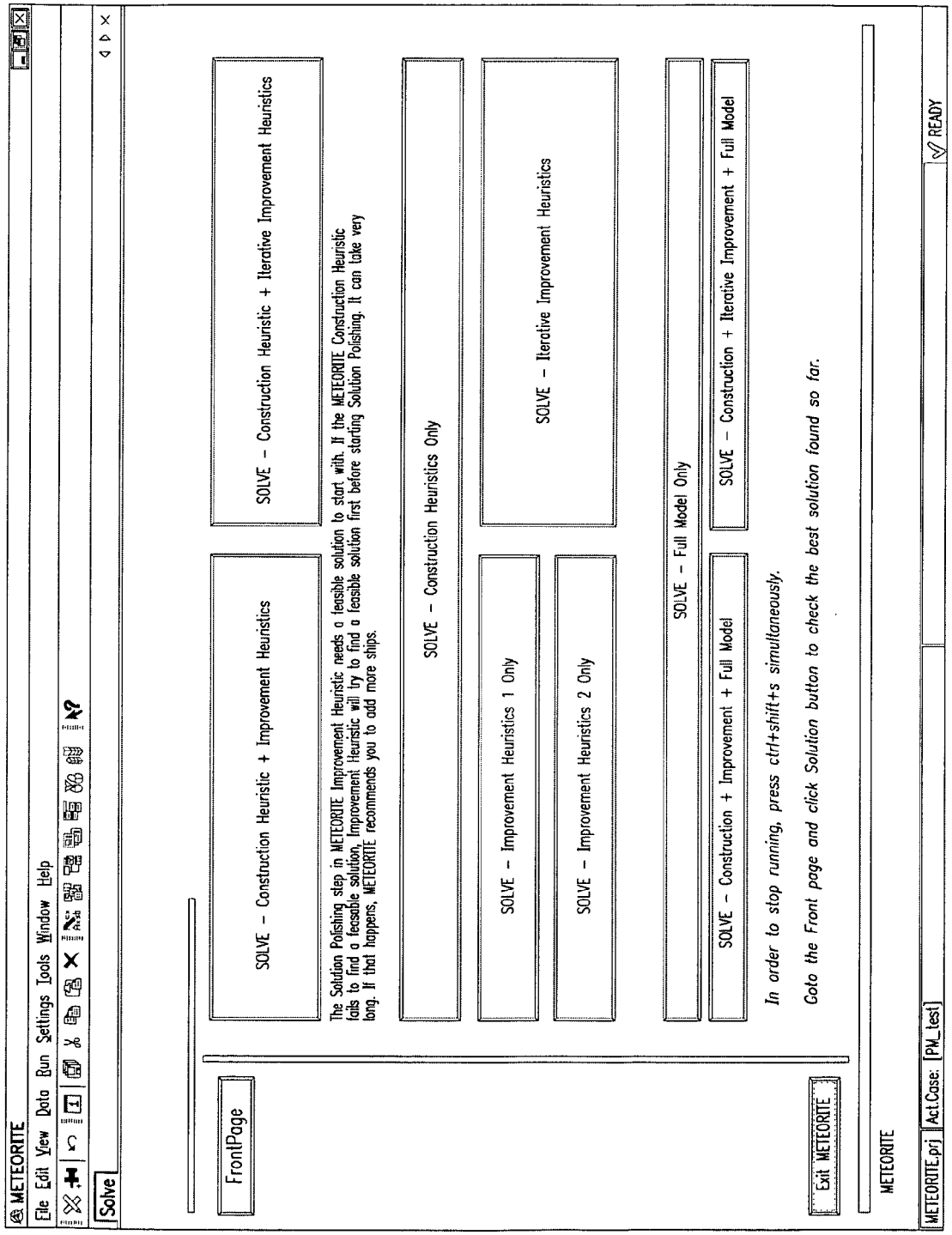
Figure 19:
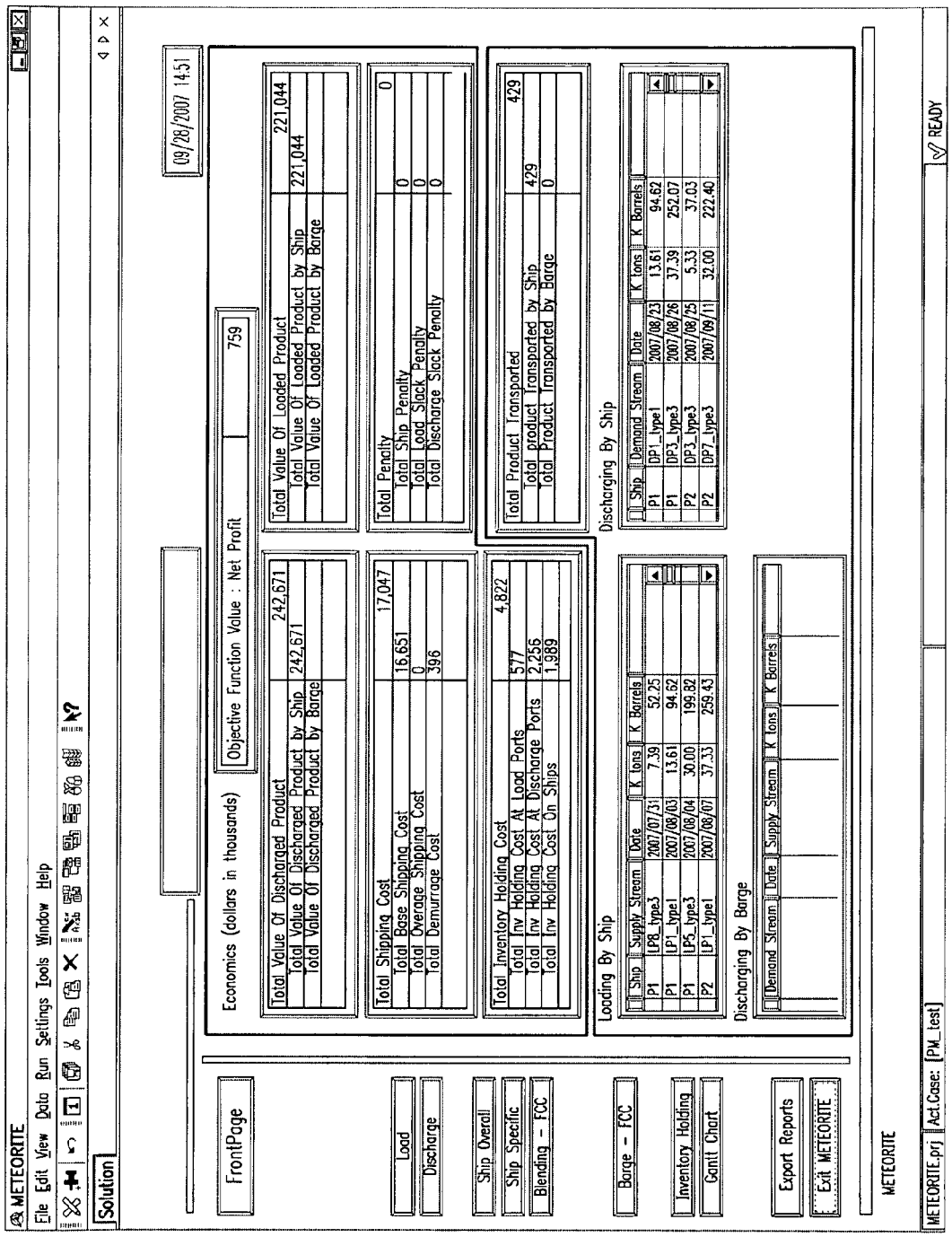
Figure 20:
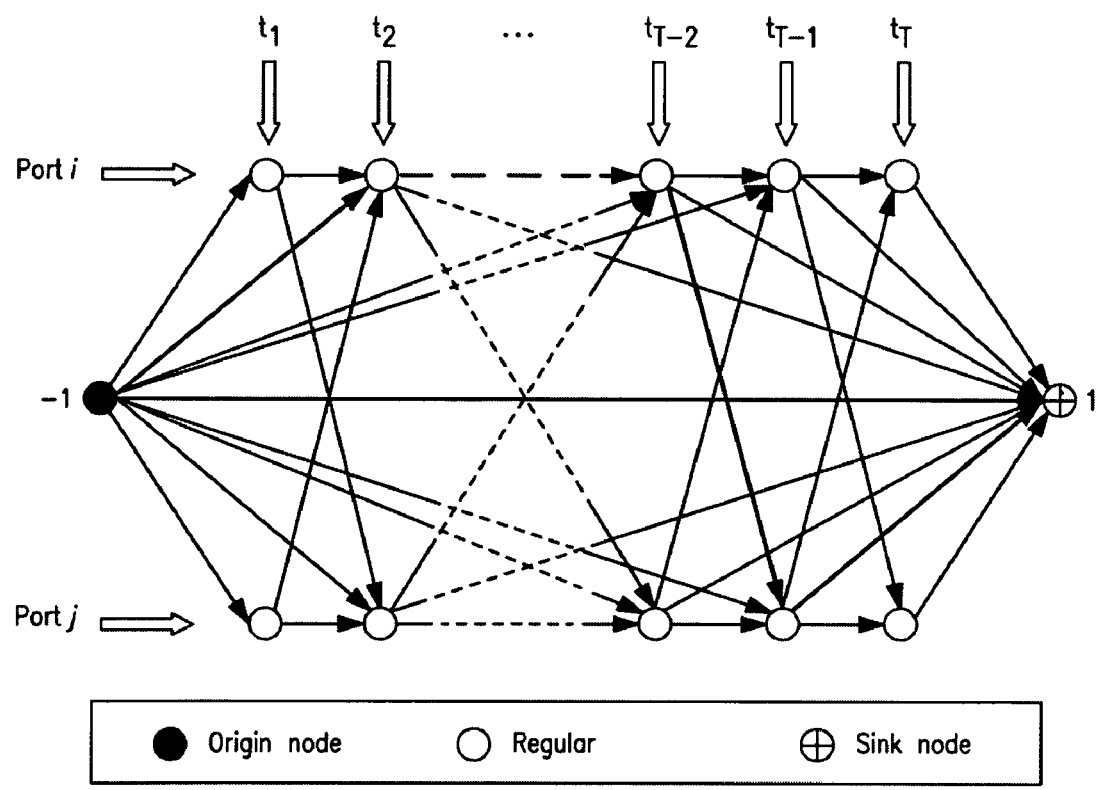

The following is a general description of the detailed drawings that form part of this application:

FIG. 1 depicts, in a general manner, the interaction between a user and a modeling application stored on a computer in one embodiment of this invention;

FIG. 2 provides a general process for using one embodiment of the invention;

FIGS. 3, 4A, 4B, 4C, 4D, 5, 6, 7, 8, 9, 10, 11A, 11B, 11C, 12, 13 and 14 illustrate data entry spreadsheets in a data entry workbook utilized in one embodiment of the invention;

FIGS. 15, 16, 17, 18, and 19 illustrate screen shots from an application user interface utilized in one embodiment of the invention; and FIG. 20 shows a time-space network formulation in which a vessel is a commodity and nodes represent a possible visit to a port at a particular time.

The aforementioned figures are provided for the purposes of illustration only. The data in the illustrative spreadsheets and user interface screen shots is representative data from a hypothetical, not an actual, problem. Accordingly, the results derived there from, which are set forth in the illustrative user interface screen shots and sample reports are representative results to a hypothetical problem.

3.0 SUMMARY OF THE INVENTION

A computer application stored on a computer readable medium, a computer apparatus comprising the same, and process employing the same, is described herein. The computer application, when executed, causes a computer to optimize, for maximum total net profit margin, the product allocation, transportation routing and transportation vehicle/route scheduling for the movement of one or more bulk products from supply locations to demand locations within a planning horizon. Optionally, but preferably, the computer application, when executed, also causes the computer to optimize product blending.

In one embodiment, the computer application, when executed, causes a computer to consider the inventory, production schedule and properties of each supply stream produced. Alternatively, or in addition, the computer application, when executed, causes the computer to consider the inventory, consumption schedule and property requirements of each demand stream. Alternatively, or in addition, the computer application, when executed, causes the computer to factor in the ability to blend products upon vehicle loading, during vehicle transit or upon vehicle discharge, to raise the overall value of the products delivered. The computer application, when executed, causes the computer to consider the vehicles in an available fleet, their associated capacities and costs. The computer application, when executed, also causes the computer to consider the availability of spot market purchases to augment deficits in supply and/or the availability of spot market sales to deplete overages in supply. A computer, running the computer application, can employ a number of solution methods and, depending on the method of solution employed, calculate an optimal or near optimal means for meeting demand side consumption using supply side production.

The computer application preferably allows multiple supply streams to be produced at each supply location, each with its own stored inventory and product schedule, property specifications and monetary valuation. Similarly, the computer application preferably allows multiple demand streams to be consumed at each demand location, each with its own stored inventory and consumption schedule, tolerance ranges for the properties of delivered product streams and property dependant monetary valuations for delivered product. The products are moved using an available fleet of vehicles that can be, and preferably is, heterogeneous in both capacity and cost.

There are many ways to calculate total net profit margin. However, total net profit margin preferably reflects the uplift in value, minus costs associated with transportation, obtained by transporting products from the supply locations to the demand locations during the planning horizon. More preferably, total net profit margin is the assessed local spot market value of the products delivered minus the assessed local spot market value of the products loaded and the costs associated with transportation and inventory holding.

4.0 DETAILED DESCRIPTION

4.1 Definitions

All words in this specification are intended to have their conventional meaning. For further clarity, the conventional meaning of some terms used in this specification is set forth below.

"Allocation," when used with respect to the movement of product from supply locations to demand locations, refers to determinations regarding the identity and/or amount of supply-side product to be transported and demand side product needs to be met.

"Bulk product" means any product that is unbound and substantially fluid as loaded; in other words, it is in a loose unpackaged form. Examples of bulk products include petroleum products.

"Code" embraces both source code and object code.

"Computer-readable medium" includes any mechanism for storing or transmitting information in a form readable by a computer. For example, a computer-readable medium includes, but is not limited to, read only memory ("ROM"), random access memory ("RAM"), magnetic disk storage media, optical storage media, flash memory devices, etc.

"Discharge location," "demand location" and "destination location," as used synonymously herein, refer to a place where transported cargo is unloaded. Similarly, "discharge port," "demand port" and "destination port" are each synonymous terms that refer to a port where cargo is discharged.

"Load location," "supply location" and "origin location," as used synonymously herein, refer to a place where transported cargo is loaded. Similarly, "load port," "supply port," and "origin port" are each synonymous terms that refer to a port where cargo is loaded.

"Transportation routing," when used with respect to the movement of product from supply locations to demand locations, refers to determinations regarding the number of trips, sequence of stops, and assignment of vessels to perform a product allocation.

"Transportation vehicle/route scheduling" refers to the assignment of time to each activity to perform a plan for transportation routing.

"Vehicle" means any vessel, barge, plane, train, truck or other mechanical means of transportation.

"Vessel" means any ship, barge or other water faring vehicle.

4.2 The Modeling Application

One aspect of the invention is a computer application stored on a computer readable medium comprising an optimization model. The computer application, when executed, causes a computer to simultaneously optimize bulk product allocation, transportation routing, and transportation vehicle/route scheduling, for the movement of one or more bulk products from supply locations to demand locations within a planning horizon, in order to maximize total net profit margin. In one preferred embodiment, the computer application also causes a computer to simultaneously optimize product blending.

Preferably, the total net profit margin reflects the uplift in value, minus transportation costs, obtained by transporting products from supply locations to demand locations. More preferably, the total net profit margin is the assessed local spot market value of the products delivered minus the assessed local spot market value of the products loaded and costs associated with transportation inventory holding. Transportation costs can include flat rates, overage costs, demurrage costs, etc. Holding costs can be incurred supply side, demand side or on-board a vessel.

In a first embodiment, the application, when executed, causes a computer to take into account one or more of the following: (i) existing inventory, anticipated production, properties and monetary value of the bulk product(s) produced at each supply location; (ii) existing inventory, anticipated consumption and property requirements of bulk product(s) needed at each demand location and the monetary value of bulk products that meet the property requirements; and (iii) opportunities to blend different bulk products to benefit the overall value of delivered bulk products. Preferably, the executed application causes a computer to take into account at least items (i) and (ii) above. Ideally, the executed application causes a computer to take into account each of items (i), (ii) and (iii) above.

Each supply location can produce multiple supply streams of bulk product, each stream having its own properties and monetary valuation based thereon, and each stream having its own accumulated inventory, storage constraints and production schedule. In addition, each demand location can require multiple demand streams of bulk product, each stream having its own property range requirements and property based monetary valuation for actual bulk products that are delivered to meet those requirements, and each stream having its own inventory, storage constraints and consumption schedule. The different bulk product streams are loaded into separate segregations of the same transportation vehicle. However, the different bulk products can be blended, upon loading, discharge or during transit, in a manner that changes the properties of one or more of the loaded bulk products and benefits the overall value of bulk products delivered to meet the demand location requirements. Each of these points is further elaborated upon below.

Each supply location in the problem considered by the application may produce multiple bulk products. In other words, the application permits, but does not require, each supply location to produce multiple streams of different types and/or grades of bulk product. Thus, for example, the bulk product produced at one supply location might be a single stream of a specific grade of gasoline. Alternatively, the bulk product produced at the supply location might be multiple streams of different grades of vacuum gas oil (VGO), such as low sulfur VGO and high sulfur VGO. Preferably, the user identifies each supply location to be considered by the application and its corresponding production streams.

Each production stream in the problem considered by the application will have its own properties and property based monetary valuation. The properties may be chemical or physical, but typically relate to chemical composition of the production stream. For example, the value of fuel products, such as VGO and gasoline, typically rise or fall based on composition (e.g., nitrogen content, sulfur content, etc.). Preferably, the user designates each supply stream monetary value based on current prices in the local spot market for the supply location.

Each production stream in the problem considered by the application will also have its own accumulated inventory, preferred minimum and maximum storage constraints and anticipated production schedule. The production schedule does not have to be constant or continuous. The application considers these factors when developing the allocation, transportation routing and transportation vehicle/route schedules. Preferably, the user designates the existing inventories, preferred storage constraints and anticipated production schedule for each production stream.

Each demand location in the problem considered by the application may consume multiple bulk products. In other words, the application permits, but does not require, each demand location to consume multiple streams of different types and/or grades of bulk product. Thus, for example, the bulk product consumed by one supply location might be a particular grade of gasoline. Alternatively, the bulk product consumed by the demand location might be multiple streams of different grades of VGO. Preferably, the user identifies each demand location to be considered by the application and its corresponding demand streams.

Each demand stream in the problem considered by the application will have its own property range requirements and property based monetary valuations for actual bulk products that are delivered to meet those requirements. The properties may be chemical or physical, but typically relate to the chemical composition of the delivered bulk product. For example, fuel products, such as different grades of gasoline or VGO, must meet the specific compositional range requirements of a demand stream (e.g., nitrogen content, sulfur content, etc.) to be acceptable. However, all fuel products that meet the requirements are not the same and the actual value of any particular product that meets the requirements may vary depending upon where, within the required property ranges, the properties of the particular product actually fall. Accordingly, a base monetary value is typically set for an average product that meets the property range requirements of the demand stream. In addition, property based adjustment factors are provided to adjust the base monetary value for actual bulk products that are delivered based on their properties relative to the properties of the average product. Preferably, the base monetary value and property adjustment factors are input by the user based on value assessments in the local spot market for the demand location.

Each demand stream in the problem considered by the application will also have its own accumulated inventory, preferred minimum and maximum storage constraints and anticipated consumption schedule. The consumption schedule does not have to be constant or continuous. The application considers these factors when developing the allocation, transportation routing and transportation vehicle/route schedules. Preferably, the user designates the existing inventories, preferred storage constraints and anticipated consumption schedule for each demand stream.

The vehicles may be homogeneous or heterogeneous in capacity and cost. In one embodiment, the vehicles are heterogeneous in both capacity and cost. The vehicles utilized in the invention will typically contain multiple segregations to permit the transport of multiple products without unintentionally compromising the compositional integrity of the products. Accordingly, each bulk product that is loaded from each supply location is transported in one or more separate segregations of the same transportation vehicle.

The different bulk products loaded onto each transportation vehicle can be blended as the products are loaded onto or discharged from the transportation vehicle, or during vehicle transit, in a manner that changes the properties of one or more of the loaded bulk products and benefits the overall value (e.g., monetary value) of bulk products delivered to meet demand location requirements. For example, different products can be blended by simultaneous load or discharge, at defined rates, through the same load or discharge tube. In other words, by opening and closing valves for different product streams leading to a common load or discharge tube, in a controlled manner, products can be mixed in the tube at different rates. Further, different products can be blended by consecutive load or discharge, in defined amounts, to an empty holding tank. In addition, due to the flexibilities in the compartments of vessels, a vessel may load several products and move and blend them into several new products during transit. Blended products may be prepared for several demand streams, depending upon the economics and consumption rates of the demand streams. The value of a blended product is its value, in view of its properties, to the demand port where the product is delivered—which can be assessed, for example, based on the local spot market for the demand port. An example includes blending a lower value product (e.g., high sulfur VGO (HSVGO)), which is not acceptable for many VGO demand streams, with a high quality product (e.g., low sulfur VGO (LSVGO)), to create a new product stream that is acceptable. Therefore the modeling application not only saves transportation costs, but can also create value by reducing quality giveaway.

In another embodiment of the invention, the application, when executed, additionally causes a computer to account for one or more, and preferably all, of the following: (i) the availability, cost, capacity and current cargo of each vehicle in an available fleet; (ii) the relative separation, in travel time and/or distance, of each supply location and demand location from one another and travel cost for traversing the same; (ii) any vehicle size restrictions, loading restrictions and/or discharge restrictions at each supply location and demand location; (iv) holding costs, if any, for storing bulk product at the supply locations, demand locations and/or on-board the transportation vehicles; and (v) the availability of spot market purchases to augment supply deficits and spot market sales to deplete supply overages. Each of the additional points is discussed in more detail below.

First, when assigning specific vehicles to perform specific transportation routes, the application considers the time availability, carrying capacity, associated transportation costs (e.g., flat rate, overage costs, demurrage costs, etc.), and current cargo for each vehicle in an available fleet of vehicles. The vehicles may be selected from spot vehicles, term vehicles or any mixture thereof. Less desirably, if the available fleet of vehicles is neither fully known nor anticipated general information regarding a desired class of vehicles (e.g., an Aframax or a Panamax vessel) can be utilized. Preferably, this information is input by the user for each chartered or anticipated vehicle in the available fleet.

Second, when designing transportation routes, the executed application causes a computer to consider the relative geographic location, in time and/or distance, of each supply location and each demand location from one another and the relative cost of traversing the same. Preferably, the user inputs information regarding the relative separations for each location and relative travel cost (e.g., the Worldscale rate for the trade route). Preferably, this information is input by the user for each supply location, demand location and each travel leg between locations.

Third, when designing transportation routes and assigning specific vehicles to specific routes, the executed application causes a computer to consider any vehicle size restrictions, loading restrictions and/or discharge restrictions at each supply location and demand location. For example, some ports have inlet draft and outlet draft restrictions, load and/or discharge blackout days, and minimum and maximum amounts of cargo that can be loaded and/or discharged. Preferably, any such restrictions are input by the user for each supply location and demand location.

Fourth, holding costs are generally incurred for every unit of bulk product production that is not moved immediately. Holding costs are also incurred for every unit of bulk product delivered that is not consumed immediately. Holding costs are also incurred for every unit of bulk product that sits in a vehicle without being loaded, unloaded or actively transported. There may be a single universal holding cost applicable for all holding scenarios. Alternatively, there may be one holding cost for all supply locations, one holding cost for all demand locations, and one holding cost for all transportation vehicles. Alternatively, there may be a separate holding cost for each demand location, each supply location and each transportation vehicle. Holding costs are preferably input by the user.

Fifth, and finally, there may be instances where the production at the supply locations under consideration either cannot meet, or exceeds, the consumption at the demand locations. In such cases, the computer application can factor in the availability of bulk product purchases on the spot market to augment production and/or the availability of bulk product sales on the spot market to deplete production. Preferably, the user specifies the identity, location, amount and price of bulk products that can be purchased and/or sold on the spot market.

4.3 The Modeling Application and Maritime Transportation

The vehicular mode of bulk product transportation is not restricted and may be vessel, plane, train, truck or any combination thereof. However, in a preferred embodiment, the bulk products are transported by vessel. Accordingly, in this preferred embodiment, each vehicle is a vessel, each route to be performed is a voyage, each supply location is a supply port and each demand location is a demand port.

Therefore, one embodiment of the invention is a computer application that resides on a computer readable medium and, when executed, causes a computer to optimize bulk product allocation, transportation routing and vessel/voyage scheduling, for the movement of one or more bulk products from supply ports to demand ports within a planning horizon, in order to maximize total net profit margin. In this embodiment, the executed application preferably causes a computer to take into account one or more of the following: (i) existing inventory, anticipated production, properties and monetary value of the bulk product(s) produced at each supply port; (ii) existing inventory, anticipated consumption and property requirements of bulk product(s) needed at each demand port and the monetary value of bulk products that meet the property requirements; and (iii) opportunities to blend different bulk products to benefit the overall value of delivered bulk products. Preferably, the executed application causes a computer to take into account items (i) and (ii) above. Ideally, the executed application causes a computer to take into account each of items (i), (ii) and (iii) above.

More particularly, each supply port can produce multiple supply streams of bulk product, each stream having its own properties and monetary valuation based thereon, and each stream having its own accumulated inventory, storage constraints and production schedule. In addition, each demand port can require multiple demand streams of bulk product, each stream having its own property range requirements and property based monetary valuation for actual bulk products that are delivered to meet those requirements, and each stream having its own inventory, storage constraints and consumption schedule. Finally, different bulk product streams are loaded into separate segregations of the same transportation vehicle. However, the different bulk product can be blended, on loading, discharge or during transit, in a manner that changes the properties of one or more of the loaded bulk products and benefits the overall value of bulk products delivered to meet demand location requirements.

In another embodiment, the executed computer application additionally causes a computer to account for one or more, and preferably all, of the following: (i) the availability, cost, capacity and current cargo of each vessel in an available fleet; (ii) the relative separation, in travel time and/or distance, of each supply port and demand port from one another and cost for traversing the same; (iii) any vessel draft restrictions, loading restrictions and/or discharge restrictions at each supply location and demand location; (iv) the holding costs, if any, for storing bulk product at the supply ports, demand ports and/or on-board the vessels; locations; and (v) the availability of spot market purchases to augment supply deficits and spot market sales to deplete supply overages. Each of these points has been previously detailed.

4.4 The Bulk Products

The types of bulk product transported in the problem to be solved by the application are not restricted. However, in a preferred embodiment, the bulk products are selected from one or more grades of petroleum and/or products derived from petroleum. In a more preferred embodiment, the bulk products are selected from one or more grades of the following products: crude oil; gasoline; gas oil; condensate; distillate; and intermediate petrochemical feed stock.

4.5 The Hardware and Software

The modeling application runs on a conventional computer processor (e.g., a 3 GHz single-processor personal computer). The processor can, but does not have to be, a single standalone processor. The processor can also be a collection of interactive processors connected directly to one another or a collection of interactive processors connected indirectly to one another over a computer network (e.g., a local area network or the internet).

The application, when executed, utilizes a data entry and storage interface. The data entry storage interface may be integral to, or interface with, the application. Data entry and storage for the application can be accomplished in a number of ways. The application can use Excel, or another type of spreadsheet software, as the data entry and storage interface. Alternatively, an ERP (Enterprise Resource Planning) system, such as SAP, Oracle and JD Edwards, or a business data warehouse (BDW), can be utilized. Alternatively, a DataBase Management System such as MS Access, MS SQL server, or DB2 can also be utilized.

The application comprises code that defines calculations, simulations, and math models and, optionally, one or more optimization based solution methods. The application further comprises code that calls upon an optimization solver which is integral to, or interfaces with, the application to solve the math models, through an exact method and/or through one or more heuristics. Preferably, the code is written using modeling system software such as AIMMS, GAMS, ILOG OPL, AMPL, or XPress Mosel. However, the code could also be written using any computer programming language including C++. In one embodiment, the application is written using AIMMS and employs an AIMMS user interface. Preferably, the solver is capable of solving linear programming and mixed integer (linear) programming problems. Preferred solvers include CPLEX, XPress, KNITRO and XA.

The solution to the modeling application will specify a recommended transportation program detailing each of the following: (i) the allocation of products produced at one or more supply locations to meet the consumption demands of one or more demand locations; (ii) a transportation routing schedule to implement the allocation plan; and (iii) a transportation vehicle/route schedule to implement the routing schedule. In a preferable embodiment, the transportation program will also detail (iv) a schedule for blending product during product loading, transit or discharge. The solution will be one that maximizes total profit margin for the combination of operations. The total net profit margin, in this case, is the difference between the monetary value of the products loaded and the monetary value of the products delivered, minus costs associated with the transportation and inventory holding. Depending on whether the application's models are solved using an exact method, using heuristics, or using a combination thereof, and depending upon the degree to which the model is permitted to run, the results obtained will either be an optimal solution or a near optimal solution. The results can then be stored in the form of one or more reports, spreadsheets, etc.

In a preferred embodiment, data entry and storage is accomplished using an Excel interface and the program is written in the AIMMS modeling language and calls upon a CPLEX solver to solve the math modeling problems in the program using an exact method, or using one or more heuristics, or using a combination thereof. In this embodiment, the program utilizes an AIMMS interface for execution and output. The results can then be transferred (e.g., exported or copied) back to Excel and stored as an Excel file. Alternatively, the results can be stored and managed in AIMMS.

FIG. 1 illustrates the interaction between a user and a computer loaded with the modeling application, with its various interfaces and calculation engines, in a preferred embodiment of the invention. A user inputs "Data" including, inter alia, data pertaining to supply production schedules and demand consumption schedules, available vessels, and the planning period to be optimized. The data is input using a "Data Input Interface"—such as an Excel workbook. The data is then exported into a "Calculation Engine" (i.e., the model and associated solver) which determines the optimal product allocation, transportation routing, transportation vehicle/voyage scheduling and blending activities to maximize total net profit margin. The results can then be stored in the form of "Reports, Spreadsheets" etc.

Accordingly, one embodiment of the invention is an apparatus that comprises at least four components. First, the apparatus comprises a processing device selected from a single processor, multiple interactive processors connected directly to one another, or multiple interactive processors connected indirectly to one another over a computer network. Second, the apparatus comprises a computer application stored on a computer readable medium that operates on the processing device. The computer application is as previously described. The computer application, when executed, causes the computer to optimize the bulk product allocation, transportation routing and transportation vehicle/route scheduling for movement of one or more bulk products from supply locations to demand locations within a planning horizon in order to maximize total net profit margin. The executed computer application takes into account each of the following: (i) existing inventory, anticipated production, properties and monetary value of bulk product(s) produced at each supply location, (ii) existing inventory, anticipated consumption and property requirements of bulk product(s) needed at each demand location and the monetary value of bulk products that meet the property requirements, and, optionally, (iii) opportunities to blend different bulk products to benefit the overall value of delivered bulk products. Third, the apparatus comprises a data entry and storage application, stored on a computer readable medium, that is either part of, integrally connected to, or otherwise capable of communicating with, the computer application, for inputting and storing data pertaining to the variables and constraints. Fourth, the apparatus comprises a solver that is integral to, or interfaces with, the computer application.

4.6 The Calculation Engine

The application code defines a modeling problem. The modeling problem may be expressed in a number ways, either as single problem or a series of sub-problems. Preferably, the modeling problem is expressed as a single mixed integer programming problem which may be solved using an exact method and/or using heuristics.

FIG. 1 identifies a "Calculation Engine" that includes a "Solver" and one or more "Hueristics." The solver (e.g., a CPLEX solver) preferably employs a branch and cut method to solve the mixed integer programming problem to obtain an optimal solution. In addition, the calculation engine comprises one or more hueristics that can be employed by the user to find an optimal or near optimal solution.

In one embodiment, the calculation engine solves the model exactly, using a branch and cut method, to obtain an optimal answer. In this embodiment, the user can supply preferred "cuts" for the solver to use in the branch and cut method or rely, either partly or entirely, on the solver to generate its own cuts.

In another embodiment, a hybrid hueristic/optimization approach is utilized whereby one or more heuristics are used either once, or iteratively, to obtain a feasible solution that is then utilized to find an optimal solution to the model in a shorter amount of time. In another embodiment, one or more heuristics are utilized, either once or in an iterative manner, to determine an optimal or a near optimal solution. The latter approach is the fastest and is the preferred approach for solving complex problems. In general, using heuristics alone, a near optimal solution to a typical complex problem can be obtained in less than thirty minutes running on an unimpeded 3 GHz single-processor personal computer. In this regard, a typical complex problem has 4-6 load ports, 4-6 discharge ports, a spot purchase port, a spot sale port, a fleet of 10 vehicles, at least one production stream per supply port, at least one consumption stream per discharge port and about a month of planning period.

The heuristics employed preferably comprise a construction heuristic and/or one or more large neighborhood searches. Preferably, the heuristics employed comprise a construction heuristic and multiple large neighborhood searches. Each heuristic is typically employed at least once. Preferably, each large neighborhood search is employed in an iterative manner until no further improvements in the feasible solution are obtained.

The construction heuristic determines a feasible solution to a simplified version of the complex problem being modeled. Typically, the construction heuristic is created by limiting the supply ports and demand ports that each available vessel can visit. This reduces the problem size. The solver is then utilized to determine a feasible solution to the construction heuristic. The solver is generally stopped when a feasible solution to the construction heuristic is found. Because the construction heuristic represents a subset of the more complex modeling problem, the feasible solution to the construction heuristic is a feasible solution to the more complex problem. If a feasible solution the construction heuristic cannot be found, then the full model is run to find an initial feasible solution.

In the preferred embodiment, one or more improvement hueristics are utilized to improve the feasible solution found by the construction heuristic. Preferably, the improvement heuristics include one or more, and preferably multiple, large neighborhood searches. In a preferred embodiment, the process uses two improvement heuristics, both of which comprise a large neighborhood search. In this embodiment, the first heuristic is a "Solution Polishing" functionality offered by CPLEX. Although the exact details of the CPLEX Solution Polishing are proprietary to CPLEX, it appears to be a combination of a genetic algorithm and a large neighborhood search. In this embodiment, the second heuristic relaxes the schedule of two vessels in the feasible solution and fixes the remaining vessel schedules in accordance with the feasible solution. The optimal answer to each improvement heuristic is solved by the solver. Each improvement heuristic can be utilized alone or in series. When operated in series, the answer from the first improvement heuristic is used in the next improvement heuristic. Preferably, each improvement heuristic is used multiple times, in an iterative manner, until no further improvement in the feasible solution is obtained.

Optionally, but preferably, the solution from a large neighborhood search can be further improved by running a time and volume optimization. Preferably, the time and volume optimization is automatically invoked each time a specified large neighborhood search is invoked. In a preferred embodiment, where a series of two or more large neighborhood search heuristics are employed, the time and volume optimization is run on the answer obtained by the last heuristic in the series. The time and volume optimization fixes all the routes in accordance with the solution from the large neighborhood search, so that the routes are no longer a variable. However, the timing of the stops and how much is loaded and discharged is relaxed and then solved to optimality. This often improves the solution.

4.7 Process Using the Modeling Application

Another aspect of the invention is a process for determining bulk product allocation, transportation routing, and transportation vehicle/route scheduling. In one embodiment, the process comprises three steps.

The first step in the process is entering data into a database. The database is integral to, or interfaces with, a computer application stored on a computer readable medium. The data typically comprises one or more, and preferably all, of the following: (i) information regarding each supply stream at each supply location to be considered and its properties, monetary valuation, accumulated inventory, storage constraints and production schedule; (ii) information regarding each demand stream at each demand location to be considered and its property range requirements, property based monetary valuation for actual bulk products that are delivered to meet those requirements, inventory, storage constraints and consumption schedule; (iii) information regarding the availability, cost, capacity and current cargo of each vehicle in an available fleet; (iv) information regarding the relative separation, in travel time and/or distance, of each supply location and demand location from one another and cost for traversing the same; (v) information regarding vehicle size restrictions, loading restrictions and discharge restrictions at each supply location and demand location; and (vi) information regarding holding costs, if any, for storing bulk product at the supply locations, demand locations and/or on-board the transportation vehicles; and (vii) information regarding the availability of spot market purchases to augment supply deficits and spot market sales to deplete supply overages.

The second step in the process is running the computer application on a processor. The computer application is as previously described. The computer application, when executed, causes the processor to optimize bulk product allocation, transportation routing and transportation vehicle/route scheduling, for the movement of one or more bulk products from supply locations to demand locations within a planning horizon, in order to maximize total net profit margin. The computer application, when executed, causes the computer to take into account each of the following: (i) existing inventory, anticipated production, properties and monetary value of bulk product(s) produced at each supply location, (ii) existing inventory, anticipated consumption and property requirements of bulk product(s) needed at each demand location and the monetary value of bulk products that meet the property requirements, and, optionally, (iii) opportunities to blend different bulk products to benefit the overall value of delivered bulk products. The resultant solution is a recommended plan for bulk product allocation, transportation routing, transportation vehicle/route scheduling and blending.

The third step in the process is enacting the recommended solution. In other words, the solution will designate product to be moved between different locations, routes to be performed to move the product, vehicles to be utilized on each route, and specific blending operations to be performed during the loading, discharge and/or movement of bulk product by each vehicle. Each designated vehicle will be assigned the identified route, load the designated products at the designated times from each supply port on the route, perform the designated blending operations (either on loading, discharge or during transit) and deliver the designated products at the designated times to the designated demand ports for the designated demand streams.

More particularly, FIG. 2 illustrates user interaction with, and the steps performed by, the application. In FIG. 2, the rectangular boxes denote steps or processes and diamonds denote check points to determine if problem inputs are valid.

In FIG. 2, the first step is "Prepare and adjust data in the Data Entry Interface." The data to be entered is as previously described in this section.

In FIG. 2, the second step is the computer implemented step to "Read data to application" and the third step is "Examine data pages and validate data transfer." In this embodiment, for the sake of convenience, the Data Entry Interface is separate from the application. For example, the Data Entry Interface may be an Excel workbook. Therefore, data transfer to the modeling application and validation of data transfer are necessary steps. However, the "Data Entry Interface" does not need to be separate from the application and can, in fact, be an integral part of the application. In such cases, the second and third steps shown are not necessary.

In FIG. 2, the fourth step is the computer implemented step of checking for "Data Errors." In the simplest version of the process, if any data errors or found, the user can return to the Data Entry Interface, correct the data and restart the process. Alternatively, in other embodiments, the user can make changes directly to some of the data.

In FIG. 2, the fifth step is the computer implemented step of solving the optimization model. As previously described, this can be done using an exact method, using heuristics, or using a combination thereof.

In FIG. 2, the sixth step is to check to insure that the solution is feasible. The modeling application will find a solution. If the modeling application does not find a feasible solution, then the user restarts the process using an altered data set. Alternatively, the user can view the highest ranked (i.e., least penalized) infeasible solution. The model may not find a feasible solution if either (a) no feasible solution exists or (b) the application is prematurely terminated and, in such cases, the solution found will be the best solution given the data set and time permitted. The application should flag any solution that is not feasible and the reason for the infeasibility. If the solution is not feasible, then the process is typically restarted with either an adjusted data set or more time permitted for finding the solution.

In FIG. 2, the seventh step is to "Analyze results in solution pages" and the eighth step is to determine whether the results are "Satisfactory." The user reviews the solution results to insure that the results are acceptable. If the results are not deemed satisfactory, or if the user wants to perform an additional what-if analysis, then the user can restart the process with an adjusted data set.

In FIG. 2, the ninth and last step is the computer implemented step of generating the reports. These reports represent the solution found. The reports reflect solutions recommendations regarding product to be moved, routes to be performed, vehicles from the available fleet to be utilized and blending operations to be performed, in order to maximize total net profit margin.

4.8 Comparative Advantages of the Modeling Application

The transportation tool of this invention is a considerable advancement over prior processes which, generally, utilize spreadsheets and expert economic analysis to determine product allocation, transportation routing, vehicle/route scheduling and blending operations. The prior art procedure is effective for a limited number of decisions where there only a few variables but becomes more and more ineffective as the complexity of the decision to be made increase. For example, the typical petroleum product transportation problem is quite complex and typically involves, inter alia, multiple supply locations each with multiple production products, each with different properties and different economic valuations, multiple demand locations each with multiple demand stream needs, each having different requirements and different price valuations for delivered products that meet the requirements, non-constant rates of supply and demand, and a heterogeneous fleet of transportation vehicles.

The invention uses advanced modeling and optimization technology to enable a computer to find an optimal or a near optimal allocation, routing, vehicle scheduling and blending plan. The optimization application causes a computer to search through far more solution options than an individual can ever consider. The executed application enables a computer to find an optimal solution if allowed to run to completion when solved by, or using, an exact method. The executed application enables a computer to find a near optimal solution quickly (e.g., in less than a thirty minutes) if solved by or using heuristics. This is fast enough to for the user to re-optimize frequently as inputs (i.e., business parameters) change and fast enough to support real-time allocation, routing, vehicle scheduling and blending decisions. The computer, when running the application, considers all the relevant and important economic effects simultaneously. A computer running the application permits the user to run a "what if" case analysis, and obtain side-by-side comparisons of alternate solutions and their corresponding economic impact. The results obtained sometimes align with conventional wisdom and sometimes are counter-intuitive.

4.9 Illustrative Example 4.9.1 Introduction to METEORITE

This example describes one embodiment of the invention and its use in finding a near optimal solution for the allocation, transportation routing, vessel/voyage scheduling and blending planning to maximize total net profit margin in the movement of VGO from supply ports to demand ports to feed FCC units within a given planning horizon. In this embodiment, each supply port produces one or more streams of VGO, each stream having an independent composition and/or property set, and each stream having an independent inventory and production schedule. Similarly, each demand port requires one or more streams of VGO for its FCC units, each stream having independent ranges of property requirements, and each stream having an independent inventory and consumption schedule. In addition, each load and discharge port has unique physical and temporal restrictions for vessel usage and each vessel has unique size, availability, capacity, and cost parameters. The allocation, transportation routing, voyage/vessel scheduling and blending are optimized, in view of all of these factors, to meet the demand consumption using the load port production in a manner that maximizes total net profit. For reference purposes, the particular application described in this embodiment is nicknamed "METEORITE."

4.9.2 Basic Hardware and Software for METEORITE

METEORITE has some basic preferred hardware and software configurations. First, METEORITE prefers a relatively modern processor (e.g., a 3 GHz processor with 2 GB of RAM). Second, METEORITE prefers a relatively modern operating system such as Microsoft Windows XP Professional (v. 2002, SP1). Third, since METEORITE is an AIMMS modeling application, it requires a licensed version of a relatively modern AIMMS modeling system (e.g., AIMMS version 3.6.2). AIMMS, a product of Paragon Decision Technology B.V., is an advanced development system for building optimization based decision support applications. AIMMS provides a mathematical modeling language that is designed for the development of modeling applications, a graphical interactive user interface that developers can tailor for the applications, and an ability to link the applications to optimization solvers (e.g., CPLEX, XPress, XA, KNITRO, etc.). Fourth, METEORITE prefers a relatively modern version of Microsoft Excel (e.g., Microsoft Office Excel 2003). METEORITE uses an Excel workbook for data entry and, in addition, the results from the METEORITE model can be stored in Excel format. Fifth, and finally, although programs written in AIMMS can perform some calculations, METEORITE requires a solver (e.g., CPLEX, XPress, XA, KNITRO, etc.) to solve the hueristics and/or the mixed-integer programming modeling problem in the application.

4.9.3 Process for METEORITE

The basic process for METEORITE is well organized and conforms to the general process set forth in FIG. 2 and previously discussed. First, the user enters the necessary data into an Excel workbook. Second, the user causes the computer to read the data from the Excel workbook into a METEORITE AIMMS application. Third, the user examines the data and validates data transfer using an AIMMS interface page. If errors in the data exist, the user restarts the process. Alternatively, the user can make changes directly to some of the data through the AIMMS interface pages, however, such changes are not saved in the Excel workbook for future program runs. Fourth, the user executes the optimization model on the computer either through an exact method or through various heuristic options. If the model does not have a feasible solution, then the user restarts the process using an altered data set. Alternatively, the user can view the highest ranked (i.e., least penalized) infeasible solution. Fifth, the user reviews the results through various AIMMS interface pages. If the results are not satisfactory, or the user wants to perform a what-if analysis, the user restarts the process using a different data set. If the reports are satisfactory, then the user saves and/or generates reports that record the solution. The user then enacts the solution. The ultimate result of the process is the assignment and, thereby, movement of vessels from various locations to load, move and discharge product from supply locations to demand locations and the transformation of products through blending during loading, discharge or transportation.

4.9.4 Data Entry for METEORITE

METEORITE uses an Excel workbook for data entry. In general, the data comprises information regarding identity, physical restrictions, production schedule and inventories of supply ports, the identity, physical restrictions, consumption schedule and inventories of demand ports, variations in stream value based on composition and/or properties and the physical parameters, capacity, cost and availability of transportation vessels. Preferably, the workbook comprises at least twelve worksheets. The twelve worksheets have the following names and purposes: (i) a Start worksheet that contains preliminary inputs regarding the planning horizon, optional parameters, penalties and inventory holding cost; (ii) a Port worksheet that defines the load and discharge ports to be considered in the modeling problem and physical and temporal restrictions for the same; (iii) a Product-Spec_Def worksheet that sets forth the properties used to assign a monetary value to the bulk product being transported (e.g., VGO for FCC units), the direction in which changes in such properties affect monetary value and typical property values for different grades of the bulk product; (iv) a Product-Supply worksheet that identifies the supply streams to be considered in the modeling problem, properties regarding the same and the monetary valuation of the same; (v) a Product-Demand worksheet that identifies the demand streams to be considered in the modeling problem, property range requirements for the same, the monetary valuation of a typical stream of the required grade that meets the range requirements and property specific monetary adjustment factors to determine the monetary valuation of actual streams delivered to meet the range requirements; (vi) a Production worksheet that details projected production/inventory for each supply stream during the production horizon assuming no inventory is moved; (vii) a Consumption worksheet that details the projected consumption/inventory for each demand stream during the consumption horizon assuming no additional inventory is delivered; (viii) a Legs worksheet that allows a user to forbid voyage legs between specified ports; (ix) a Ship worksheet that identifies the spot vessel charters that have been made and that are of interest, as well as the physical and cost parameters for the same and any relevant port restrictions for the same; (x) a Time worksheet that records the average days it takes a vessel to transit each potential leg in a voyage; (ix) a Cost worksheet that records a leg rate for each potential voyage leg between ports; and (xii) a BlackOut worksheet that records any days within the relevant production horizon or consumption horizons in which a load port will not be available for cargo loading or a discharge port will not be available for cargo discharge, respectively. Entering data into the twelve worksheets for the first time can be work intensive. However, thereafter, the job is much easier since much of the data is relatively static (e.g., travel time between ports, the physical characteristics of each available vessel, port constraints, etc.). The user starts with a copy of an existing data file and updates dynamic information therein to the extent that changes have occurred. Preferably, this is done routinely as part of a regular process. Each of these worksheets is illustrated in the accompanying FIGS. 3, 4A, 4B, 4C, 4D, 5, 6, 7, 8, 9, 10, 11A, 11B, 11C, 12, 13 and 14, respectively, and separately discussed below.

i. The Start Worksheet

The Start worksheet is the first of the twelve worksheets in the METEORITE workbook. The Start worksheet contains preliminary inputs regarding the planning horizon, optional parameters, penalties and inventory holding costs. FIG. 3 illustrates a typical Start worksheet. The data in the Start worksheet is set forth below.

a. "Number of Outlook Days"—The number of days in the planning period.

b. "Number of Rollover Days"—Production must be produced and moved before it can meet consumption. Therefore, there should be an offset in the production and consumption horizons considered. This offset is the number of rollover days.

c. "Production Start Date"—The first day in the production horizon. This is the start date for the planning period.

d. "Production End Date"—The last day in the production horizon. Preferably, this date is automatically projected by adding the number of outlook days to the production start date and deducting the number of rollover days.

e. "Demand Start Date"—The first day in the consumption horizon. Preferably this date is automatically projected by adding the number of rollover days to the production start date.

f. "Demand End Date"—The last day in the consumption horizon. Preferably this date is automatically projected by adding the number of rollover days to the production end date. This date represents the end of the planning period.

g. "Minimum Total VGO Transported"—An optional field where the user can input, if desired, a minimum amount of product, in ktons, to be transported in the problem solution.

h. "Minimum Number of Ships"—An optional field where the user can input, if desired, the minimum number of vessels to be utilized in the problem solution.

i. "Maximum Number of Ships"—An optional field where the user can input, if desired, the maximum number of vessels to be used in the problem solution.

j. "Maximum Cost per Ton of VGO"—An optional field where the user can input, if desired, the maximum vessel transportation cost, in U.S. k$/ton, permitted in the problem solution.

k. "Load Side Slack Penalty"—A problem may not have a feasible solution. If so, it may be desirable to view ranked infeasible solutions. A load side slack penalty can be used to evaluate infeasible solutions. A penalty value is assigned for every kton of production inventory in an infeasible solution that is not either stored in supply side inventory holding or moved to a discharge port. For example, if the load side slack penalty is 1, and a load port generates 20 ktons of VGO during a production horizon and can only store 10 ktons, and the solution is only able to transport 9 of the remaining 10 ktons to discharge ports, then one ton [i.e., (20−10)−9=1] remains unaccounted for and the load side slack penalty will be 1 (i.e., 1×1=1).

l. "Discharge Side Slack Penalty"—Again, a problem may not have any feasible solutions. If so, it may be desirable to view ranked infeasible solutions. A discharge side slack penalty can also be used, either alone or in conjunction with a load side slack penalty, to evaluate infeasible solutions. A penalty value is assigned for every kton of consumption demand in an infeasible solution that is not either met through existing demand side inventory holding or through additional inventory delivery. For example, if the discharge side slack penalty is 3, and a discharge port demands 10 ktons of VGO during a consumption horizon and only has 2 ktons of VGO in existing storage, and the solution is only able to deliver 7 ktons of additional VGO, then one ton of demand [i.e., (10−2)−7=1] is not met an the discharge side slack penalty is 3 (i.e., 1×3=3).

m. "Inventory Holding Cost at Load Port"—This is an assigned value, in U.S. $/kton, incurred for every day inventory sits in a storage tank at a supply port.

n. "Inventory Holding Cost at Discharge Port"—This is an assigned value, in U.S. $/kton, for every day inventory sits in a holding tank at a demand port.

o. "Inventory Holding Cost on Ship"—This is an assigned value, in U.S. $/kton, for every day inventory sits in a transportation vessel.

ii. The Port Worksheet

The Port worksheet is the second of the twelve worksheets in the METEORITE workbook. The Port worksheet defines the load ports and discharge ports to be considered in the modeling problem and physical and temporal restrictions for the same. FIGS. 4A, 4B, 4C and 4D shows an illustrative Port worksheet. In FIGS. 4A, 4B, 4C and 4D, the load port names are generic (e.g., LP1, LP2, etc.) and the discharge port names are generic (e.g., DP1, DP2, etc.). In actual practice, the port names are generally more descriptive (e.g., Antwerp or Torrance).

Figure 4A:
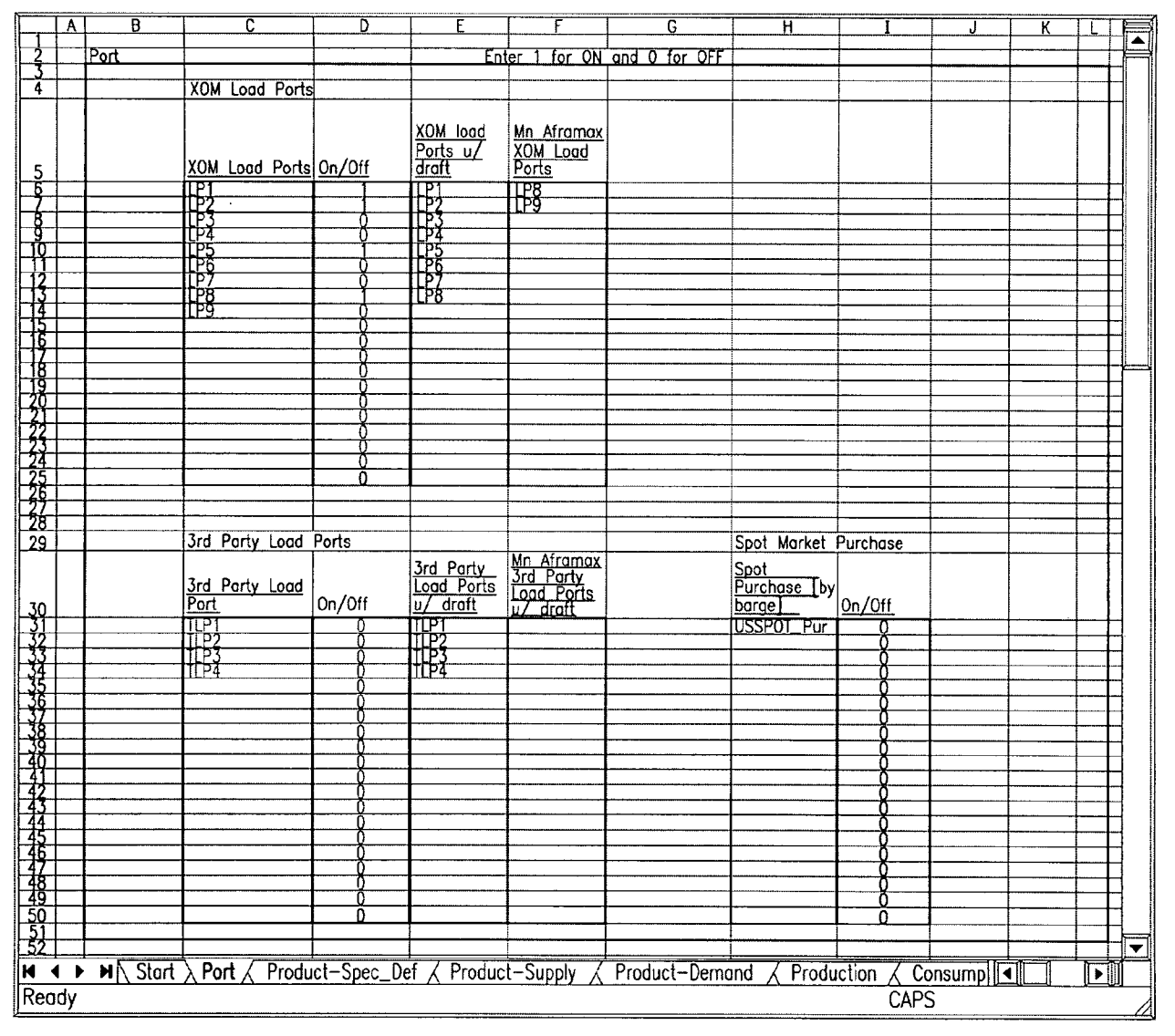

FIG. 4A shows a first portion of the Port worksheet. FIG. 4A contains two tables entitled "XOM Load Ports" (LP) and "3rd Party Load Ports" (TLP) In these tables, for each company (XOM) and third party load port, the user inputs the following information in the following columns:

a. "Load Port"—the name of each load port;

b. "On/Off"—a "1" is entered for each load port should be considered and a "0" is entered for each load port should not be considered;

c. "Load Port w/Draft"—the load port name is re-entered for each load port that contains draft restrictions (a blank indicates that no such restrictions exist); and d. "No Aframax Load Ports"—the load port name is re-entered for each load port that does not serve Aframax class vessels (a blank indicates that no such restrictions exist).

FIG. 4A also contains a third table entitled "Spot Market Purchase." In this table, for a spot purchase port (USSPOT_Pur), the user inputs the following information in the following columns:

e. "Spot purchase (by barge)"—the name, which may simply be a place holder, of each anticipated spot purchase port where spot purchases might be made to augment production (spot market purchases are generally handled by barge); and f. "On/Off" (Spot Market Purchase)—a "1" is entered by the spot purchase port if the production on the load supply side can be augmented with spot market purchases and a "0" is entered if such purchases are not an option.

Figure 4B:
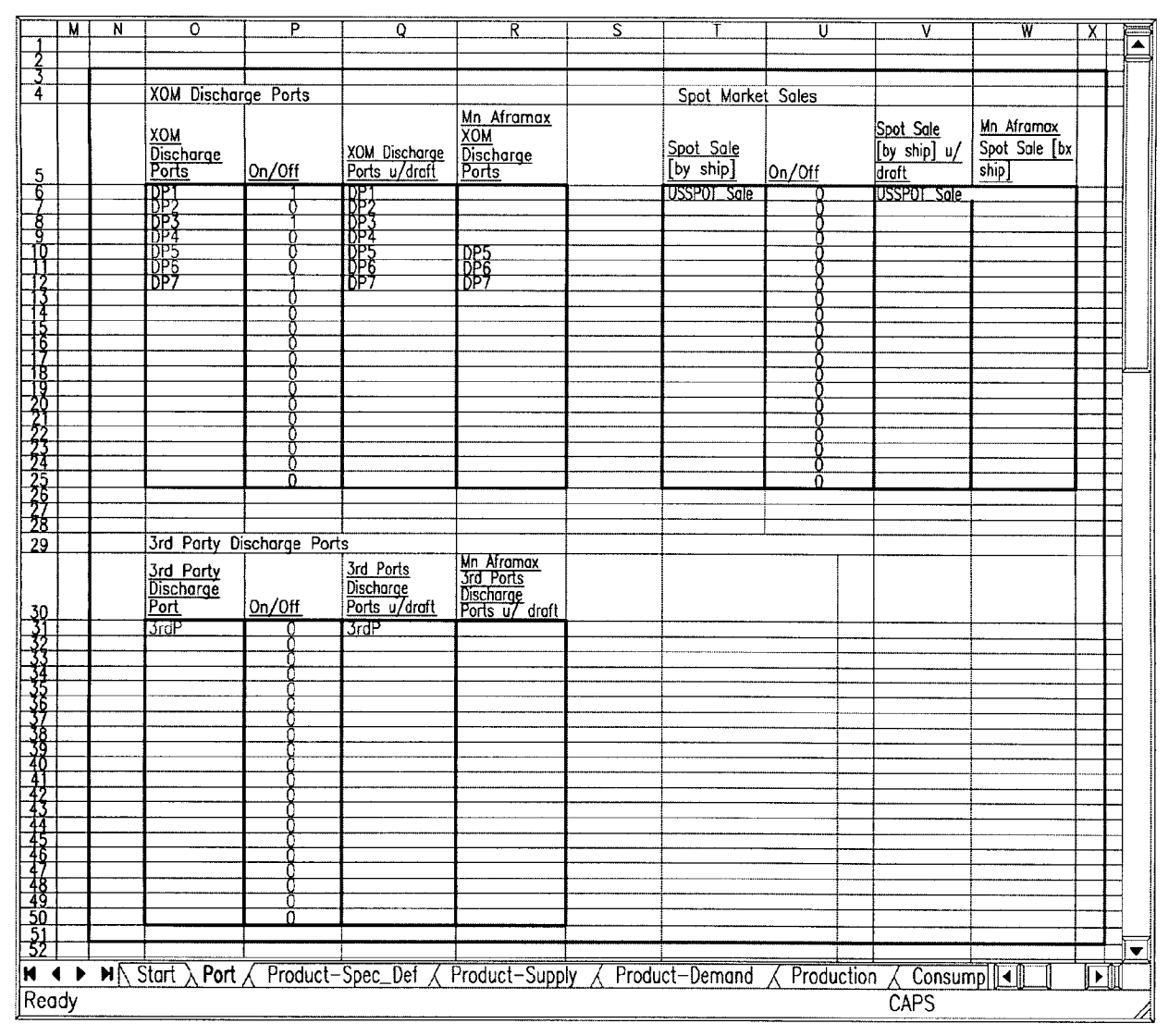

FIG. 4B shows a second portion of the Port worksheet. FIG. 4B contains tables entitled "XOM Discharge Ports" (DP) and "3rd Party Discharge Ports" (3rdP). In these tables, for each company (XOM) and third party discharge port, the user inputs the following information in the following columns:

g. "Discharge Port"—the name of each discharge port;

h. "On/Off"—a "1" is entered for each discharge port that should be considered and a "0" is entered for each discharge port that should not be considered;

i. "Discharge Port w/Draft"—the discharge port name is re-entered for each discharge port that contains draft restrictions (a blank indicates that no such restrictions exist); and j. "No Aframax Discharge Ports"—the discharge port name is re-entered for each discharge port that does not serve Aframox class vessels (a blank indicates that no such restrictions exist).

FIG. 4B also contains a third table entitled "Spot Market Sales." In this table, for a spot sale port (USSPOT_Sale), the user inputs the following information in the following columns:

k. "Spot sale (by ship)"—the name of the anticipated spot sale port where excess production might be sold on the spot market (spot market sales are generally handled by ship);
l. "On/Off"—a "1" is entered for the spot sale port if production can be depleted by spot market sales and a "0" is entered if this should not be an option;
m. "Spot sale (by ship) w/draft"—the spot sale port name is re-entered if the spot sale port that has draft restrictions (a blank means no such restrictions exist); and
n. "No Aframax Spot Sale (by ship)"—the spot sale port name is re-entered if the spot sale port that does not serve Aframax class vessels (a blank means no such restriction exists).

FIG. 4C shows a third portion of the Port worksheet. FIG. 4C contains two tables entitled "XOM Load Port Properties" and "3rd Party Load Port Properties." In these tables, for each company (XOM) load port (LP) and third party load port (TLP), the user inputs the following information in the following columns:
o. "Load Port"—the name of each load port;
p. "Min Flow"—the minimum amount, in ktons, that each load port will permit a vessel to load;
q. "Max Flow"—the maximum amount, in ktons, that each load port will permit a vessel to load;
r. "Outlet Draft limit"—the maximum draft, in ktons, that a vessel can carry to each load port considering the load port's outlet route draft limit (this value typically changes with each vessel, but a single value is utilized here since the vessels in this example are all either Aframax or Panamax class ships);
s. "Inlet Draft limit"—the maximum draft, in ktons, that a vessel can carry to each load port considering the load port's inlet route draft limit (again, this value typically changes with each vessel, but a single value is utilized here since the vessels in this example are all either Aframax or Panamax class ships);
t. "Revisit limit"—the maximum times any vessel can visit each load port on a single voyage; and
u. "Days For Next Visit (adjacency)"—the minimum number of days that must elapse between consecutive vessel visits to each load port is input for company (XOM) load ports only.

Figure 4D:
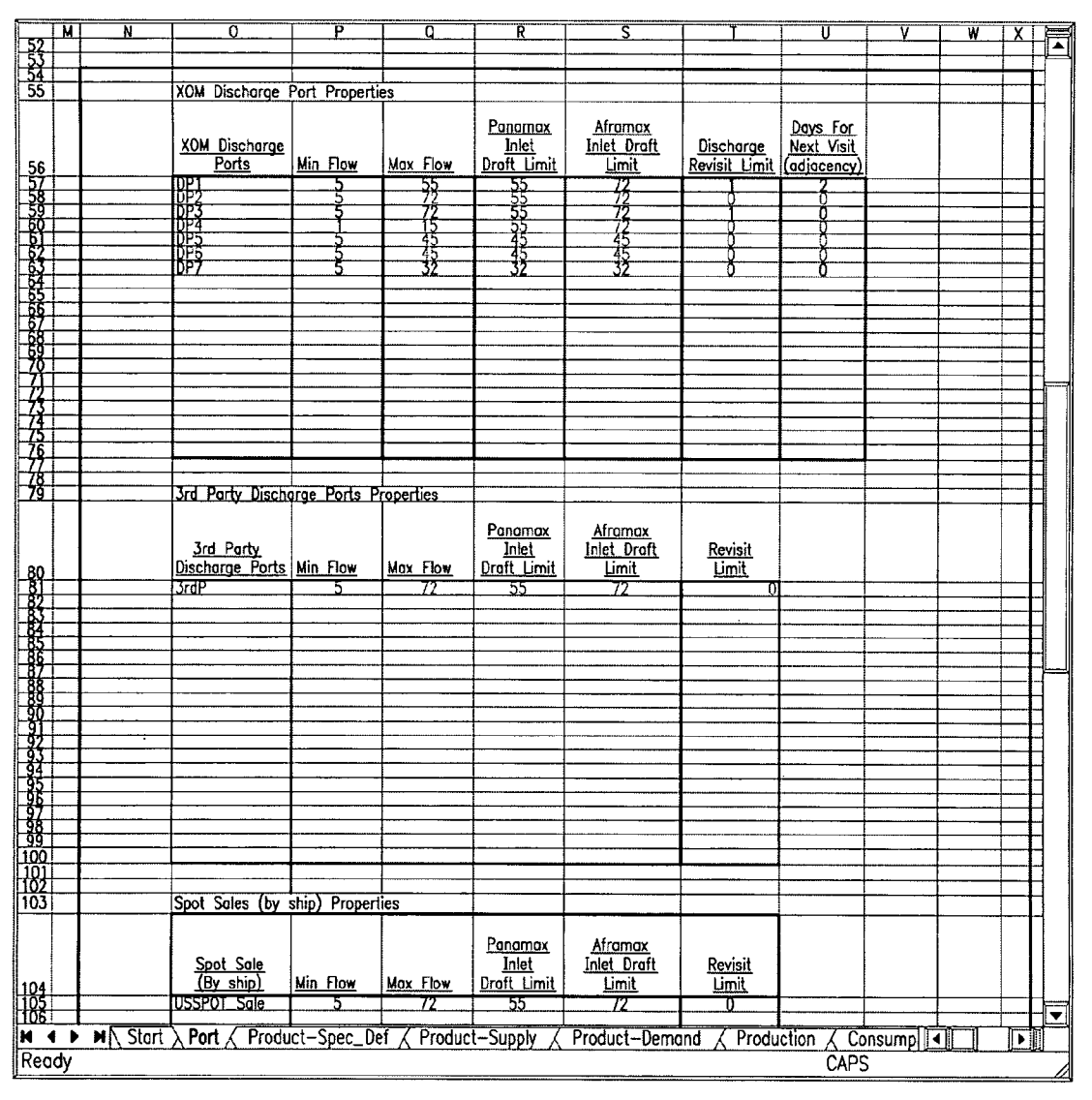

FIG. 4D shows a fourth portion of the Port worksheet. FIG. 4D contains tables entitled "XOM Discharge Port Properties" and "3rd Party Discharge Ports Properties." In these tables, for each company (XOM) discharge port (DP) and third party discharge port (3rdP), the user inputs the following information in the following columns:
v. "Discharge Port"—the name of each discharge port;
w. "Min Flow"—the minimum amount, in ktons, that each discharge port will permit a vessel to discharge;
x. "Max Flow"—the maximum amount, in ktons, that each discharge port will permit a vessel to discharge;
y. "Panamax Inlet Draft Limit"—the maximum weight of cargo, in ktons, that a Panamax can carry to each discharge port considering the discharge port's inlet route draft limits;
z. "Aframax Inlet Draft Limit"—the maximum weight of cargo, in ktons, that a Aframax can carry to each discharge port considering the discharge port's inlet route draft limits;
aa. "Revisit limit"—the maximum times a single vessel can visit each discharge port on a single voyage; and
bb. "Days For Next Visit (adjacency)"—the minimum number of days that must elapse between consecutive vessel visits to each discharge port is input for company (XOM) discharge ports only.

FIG. 4D also contains a third table entitled "Spot Sales (by ship) Properties." In this table, for the spot sale port (USS-POT_Sale), the user updates the following information:
cc. "Spot Sale (by ship)"—the name of the anticipated spot sale port;
dd. "Min Flow"—the minimum amount, in ktons, that the spot sale port will permit a vessel to discharge;
ee. "Max Flow"—the maximum amount, in ktons, that the spot sale port will permit a vessel to discharge;
ff. "Panamax Inlet Draft Limit"—the maximum weight of cargo, in ktons, that a Panamax can carry to the spot sale port considering the spot sale port's inlet route draft limit;
gg. "Aframax Inlet Draft Limit"—the maximum weight of cargo, in ktons, that a Aframax can carry to the spot sale port considering the spot sale port's inlet route draft limit; and
hh. "Discharge Revisit limit"—the maximum times a single vessel can visit the spot sale port on a single voyage.

iii. The Product-Spec_Def Worksheet

The Product-Spec_Def worksheet is the third of the twelve worksheets in the METEORITE workbook. The Product-Spec_Def worksheet sets forth the properties used to assign a monetary value to the bulk product being transported (e.g., VGO for FCC units), the direction in which changes in such properties affect the monetary value and typical property values for different grades of the bulk product. FIG. 5 shows an illustrative Product-Spec_Def worksheet in a typical workbook. The worksheet comprises two tables.

The first table, entitled "Spec Definition for FCC VGO," identifies the properties that can affect the monetary valuation for the bulk product. In this case, the properties are as follows: sulfur content; analine content; Conradson carbon residue (CCR) content; nitrogen (N2) content; sodium (Na) content; nickel (Ni) content; copper (Cu) content; iron (Fe) content; vanadium (Va) content; and 50% temperature (i.e., the temperature at which half of the product evaporates). For each identified property, the units of measurement are specified. In addition, for each property, the following data is provided:
a. "Reverse"—whether higher (Y) values or lower (N) values of the property raise the bulk product value; and
b. "Value Base Unit"—the degree of property change for which the monetary adjustment factor (discussed later in the Product-Demand worksheet) is based.

The second table, entitled "Standard Specs for FCC VGO," sets forth the typical property values for different grades of VGO. The different grades are low sulfur VGO, medium sulfur VGO and high sulfur VGO. The table lists the minimum and maximum sulfur content for each grade as well as the typical values for each property set forth in the Spec Definition for FCC VGO measured in the same units.

iv. The Product-Supply Worksheet

Figure 6:
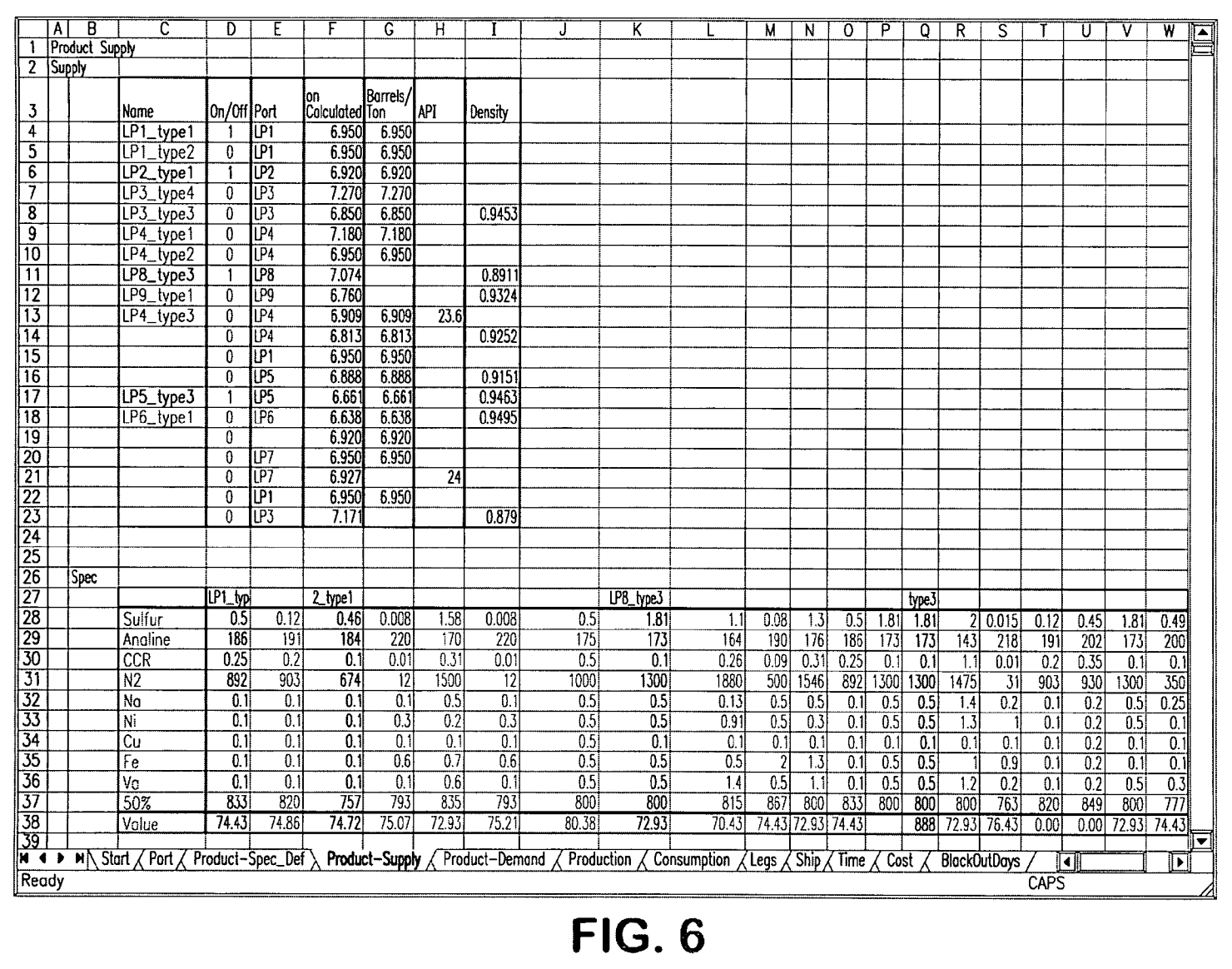

The Product-Supply worksheet is the fourth of the twelve worksheets in the METEORITE workbook. The Product-Supply worksheet identifies the supply streams to be considered in the modeling problem, properties regarding the same and the monetary valuation of the same. FIG. 6 shows an illustrative Product-Supply worksheet. The worksheet comprises two tables.

The first table, entitled "Supply," identifies the supply streams and some basic information pertaining to the same. The supply stream names are generic (e.g., LP1_type1, LP2_type2, etc.). In actual practice, the supply stream names are usually more descriptive (e.g., Antwerp-LSVGO1). Although not expressly identified as such, each of the supply streams listed is a grade of VGO (i.e., LSVGO, MSVGO or HSVGO). The following data is provided in the "Supply" table for each supply stream:

a. "Name"—the name of the supply stream;
b. "On/Off"—a "1" is entered if the supply stream should be considered and a "0" is entered if the supply stream should not be considered;
c. "Port"—the load port where each supply stream is produced is indicated (some load ports produce multiple supply streams); and
d. "Barrels/Ton Calculated"—the barrels per ton for each supply stream is either automatically retrieved or automatically calculated from user inputs in subsequent columns entitled "Barrels/Ton," "API" and/or "density."

The second table, entitled "Spec," identifies, for each VGO supply stream to be considered, the property values for each property listed in the Product-Spec_Def worksheet measured in the same units. Accordingly, for each supply stream to be considered (i.e., for each supply stream marked as "1" in the "On/Off" column of the Supply table), values for the following properties are set forth: sulfur content; analine content; Conradson carbon residue (CCR) content; nitrogen (N2) content; sodium (Na) content; nickel (Ni) content; copper (Cu) content; iron (Fe) content; vanadium (Va) content; and 50% temperature. In addition, for each supply stream, a stream "Value" is provided, which is the monetary assessment, in U.S. $/B, of the supply stream value in the applicable spot market of the supply port.

v. The Product-Demand Worksheet

The Product-Demand worksheet is the fifth of the twelve worksheets in the METEORITE workbook. The Product-Demand worksheet identifies the demand streams to be considered in the modeling problem, property range requirements for the same, the monetary valuation of a typical stream of the required grade that meets the range requirements and property specific monetary adjustment factors to determine the monetary valuation of actual streams delivered to meet the range requirements. FIG. 7 shows an illustrative Product-Demand worksheet. The worksheet comprises five tables.

The first table, entitled "Demand," identifies the demand streams for which product will need to be delivered and some basic information pertaining to the same. The demand stream names are generic (e.g., LP1_type1, LP2_type2, etc.). In actual practice, the demand stream names are usually more descriptive (e.g., Torrance-LSVGO1). Although not expressly identified as such, each demand stream in this example is a grade of VGO (i.e., LSVGO, MSVGO and HSVGO). The following data is provided in the "Demand" table for each demand stream:

e. "Name"—the name of each demand stream;
f. "On/Off"—a "1" is entered if the demand stream requirements should be considered and a "0" is entered if the demand stream requirements should not be considered;
g. "Port"—the discharge port where each demand stream is consumed is indicated (some discharge ports consume multiple streams);
h. "Feed Type"—the type of unit (e.g., FCC unit) that each demand stream feeds; and
i. "Barrels/Ton Calculated"—the barrels per ton for each demand stream is either automatically retrieved or automatically calculated from user inputs in subsequent columns entitled "Barrels/Ton," "API" and/or "density" (this information is an estimate since actual values will vary depending on the properties of the actual streams delivered to meet demand stream consumptions).

The second table, entitled "Product Base Value," provides a base monetary valuation, in U.S. $/B, for a typical stream meeting the property range requirements of the demand port stream. The monetary valuation is a value assessment of the typical stream on the local spot market applicable to the demand port. For this calculation, the properties of a typical stream are taken from the Product-Spec_Def worksheet. In other words, if the demand stream is an HSVGO stream, then the typical stream used in this base value calculation will correspond to the typical HSVGO stream set forth in the Product-Spec_Def worksheet.

The third and fourth tables, entitled "Min" and "Max," respectively, provides minimum and maximum property requirements for additional inventory delivered to meet the demand stream consumption. The properties listed are the same properties set forth in the Product-Spec_Def worksheet measured in the same units. Accordingly, for each demand stream to be considered (i.e., for each demand stream marked as "1" in the "On/Off" column of the Demand table), minimum and maximum values for the following properties are provided: sulfur content; analine content; Conradson carbon residue (CCR) content; nitrogen (N2) content; sodium (Na) content; nickel (Ni) content; copper (Cu) content; iron (Fe) content; vanadium (Va) content; and 50% temperature. It should be noted that one of the minimum and maximum values will be a soft limit and the other will be a hard limit, depending on whether the monetary valuation rises or false with increasing values for the property. A soft limit for a demand stream property means that the refinery will accept delivered product outside the property limit to meet demand stream consumption, but the refinery will not pay any additional value for exceeding the limit. A hard limit for a demand stream property means that the refinery will not accept delivered product outside the property limit to meet demand stream consumption. To determine which limit for a property is hard and which is fot, one needs to look at the Reverse column in the Spec Definition for FCC VGO table of the Product-Spec_Def worksheet. If the monetary valuation of the demanded product (VGO) rises with increasing property values (e.g., analine content), then the upper limit is the soft limit and the lower limit is the hard limit. If the monetary valuation of the product lowers with increasing property values (e.g., sulfur content) then the lower limit is the soft limit and the upper limit is the hard limit. Because the refinery will pay no additional monetary value for exceeding a soft limit, if a product is delivered with one or more properties outside a soft limit, then the product properties that are outside the soft limit will be assumed by the modeling program to equal, rather than exceed, the soft limit for the calculation of value adjustment.

The fifth table, entitled "Value vs. Standard," provides monetary adjustment factors that are both demand stream specific and property specific. More particularly, a monetary adjustment factor is provided for each demand stream for each of the properties listed in the Product-Spec_Def worksheet, namely: sulfur content; analine content; Conradson carbon residue (CCR) content; nitrogen (N2) content; sodium (Na) content; nickel (Ni) content; copper (Cu) content; iron (Fe) content; vanadium (Va) content; and 50% temperature. Monetary adjustment factors are used in calculating the monetary value of the streams actually delivered to meet demand stream consumption and minimum and maximum property requirements. The reason monetary adjustment factors are needed is that it is highly unlikely that a delivered stream will conform exactly to the typical stream for which the base value is derived. In fact, the actual value for the delivered streams may vary greatly based on the actual properties of the delivered streams. The degree of this variance, per value base unit set forth in the Product-Spec_Def worksheet, is reflected in the monetary adjustment factors.

For example, suppose a property of a delivered stream is within the maximum and minimum values required for the demand stream, but is nonetheless different than a typical stream upon which the base value in the Base Value table has been calculated. If so, then an adjustment to the base value needs to be calculated in the following manner:

$$A = \{[(P_T - P_A)/VBU] \times MAF\}$$

where A is the adjustment in U.S. $/B, $P_T$ is the typical property value taken from the Product-Spec_Def worksheet, $P_A$ is the actual property value of the discharged product, VBU is the value base unit for the property taken from the Product-Spec_Def worksheet and MAF is the monetary adjustment fact in U.S. $/B. This is done each time there is a property variance. Each adjustment factor is then added or subtracted from the base value, depending on whether the change in property value was monetarily beneficial or detrimental as indicated in the "Reverse" field of the Product-Spec_Def worksheet, to generate the actual monetary valuation of the delivered product.

vi. The Production Worksheet

Figure 8:
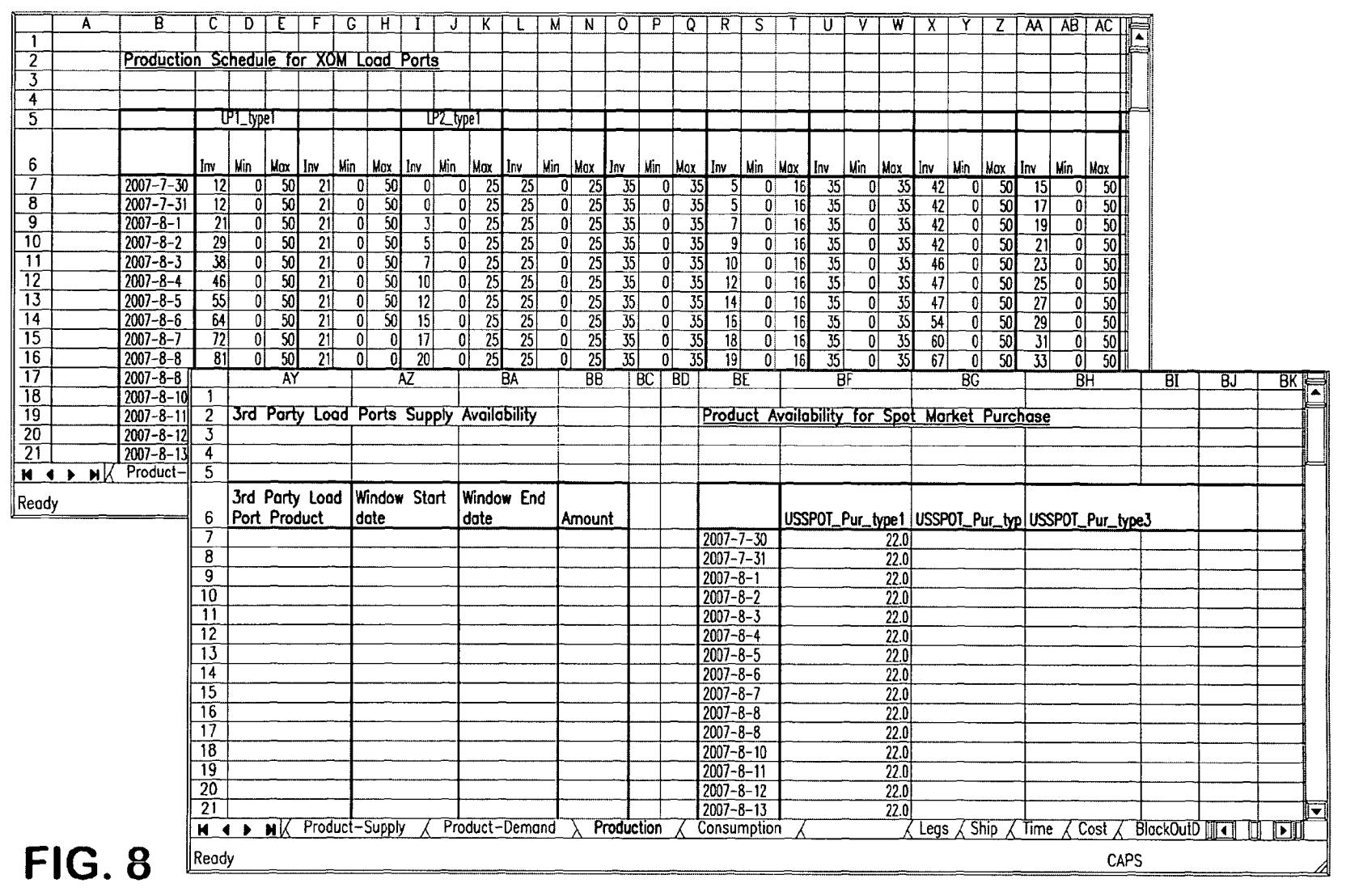

The Production worksheet is the sixth of the twelve worksheets in the METEORITE workbook. The Production worksheet details projected production/inventory for each supply stream during the production horizon assuming no inventory is moved. FIG. 8 illustrates a typical Production worksheet. The illustrated worksheet consists of three tables.

The first table, entitled "Production Schedule for XOM Load Ports," details the daily projected inventory (Inv) and minimum (Min) and maximum (Max) inventory constraints for each company (XOM) supply stream during the production time horizon. The inventory minimum, in ktons, is the minimum amount of the supply stream (typically zero) that the supply port requires in storage on any given day. Conversely, the inventory maximum, in ktons, is the maximum amount of the supply stream that the supply port permits on any given day. As indicated, as production continues but inventory is not moved, the inventory maximum is eventually reached and, thereafter, surpassed more and more each day. This time table of inventory build-up and inventory capacity is considered for voyage load schedules.

The second table, entitled "3rd Party Load Ports Supply Availability," identifies the supply streams, if any, that can be loaded at third party ports to augment company production, the start and end dates that mark the time window when such pick-ups can occur, and the amounts, in ktons, that can be loaded. Generally, this data reflects contract terms.

The third table, entitled "Product Availability for Spot Market Purchase," identifies the supply streams that may be purchased on the spot market to augment production. The daily projected availability of such streams, in ktons, is provided (which generally remains steady).

vii. The Consumption Worksheet

The Consumption worksheet is the seventh of the twelve worksheets in the METEORITE workbook. The Consumption worksheet details projected consumption/inventory for each demand stream during the consumption window assuming no additional inventory is delivered. FIG. 9 illustrates a typical Consumption worksheet. The illustrated worksheet consists of three tables.

The first table, entitled "Demand Schedule for XOM Discharge Ports," details the daily projected inventory (Inv) and minimum (Min) and maximum (Max) inventory constraints for each company (XOM) demand stream during the consumption time period under consideration. The inventory minimum, in ktons, is the minimum amount of product for the demand stream that the demand port requires on any given day. Conversely, the inventory maximum, in ktons, is the maximum amount of product for the demand stream that the demand port will permit on any given day (typically this equals the maximum storage capacity). As inventory depletes and is not replenished, the demand stream needs will eventually cease to be met and, thereafter, projected inventory has negative values. This time table of inventory depletion and inventory capacity is considered for voyage delivery schedules.

The second table entitled, "3rd Party Discharge Port Availability for spot sales," identifies the demand streams, if any, that can be discharged to third party ports to deplete overage, the start and end dates that mark the time window when such deliveries should can occur, and the amounts, in ktons, that can be discharged. Generally, this data reflects contract terms.

The third table, entitled "Availability for Spot Market Sales," identifies the demand streams that may be sold on the spot market to deplete overage. The daily projected availability of such streams, in ktons, is provided (which generally remains steady).

viii. The Legs Worksheet

Figure 10:
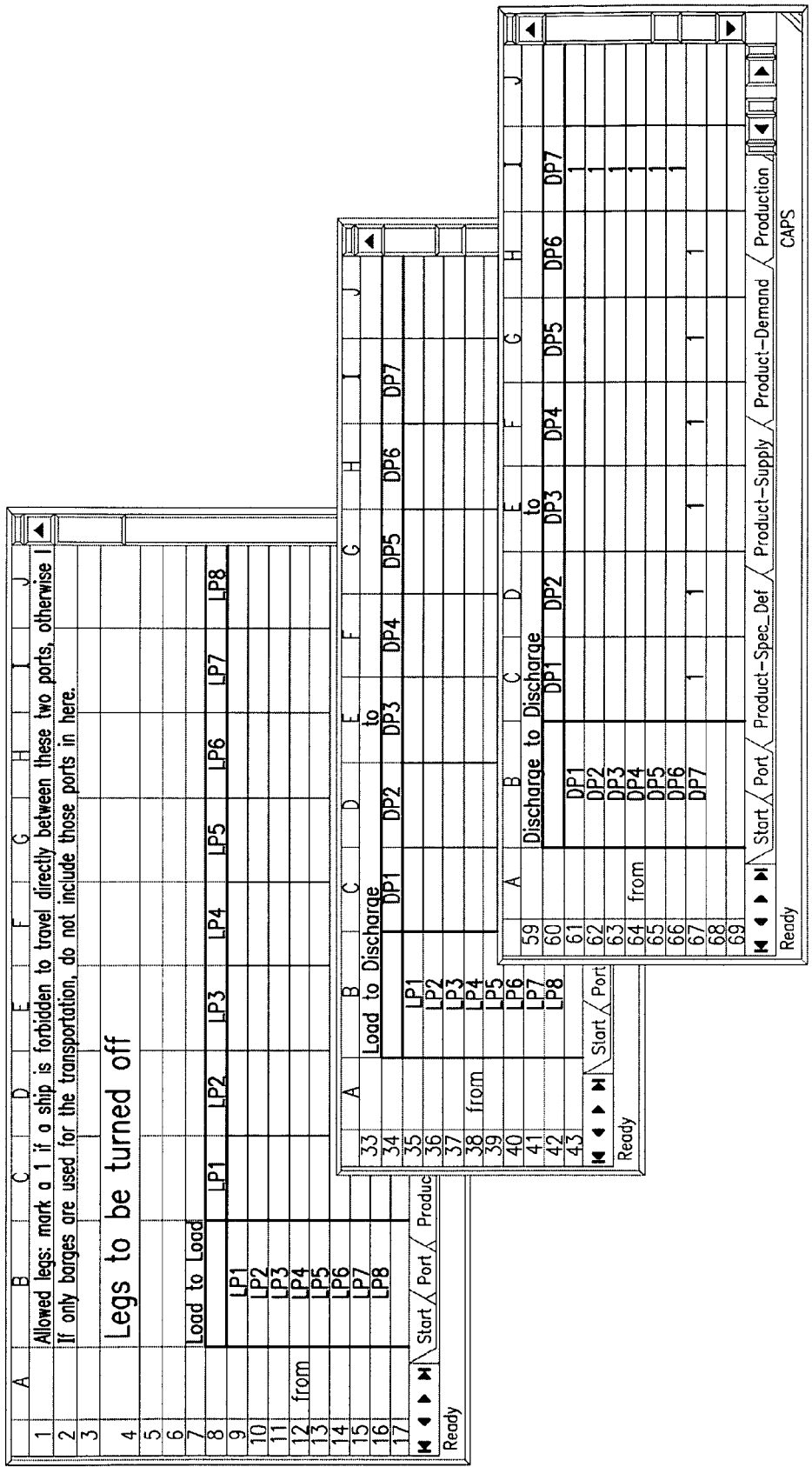

The Legs worksheet is the eighth of the twelve worksheets in the METEORITE workbook. The Legs worksheet allows the user to forbid voyages that have legs between specific load ports, between specific discharge ports, and between specific load and discharge ports. FIG. 10 illustrates a typical Legs worksheet. The illustrated worksheet consists of three tables.

The first table, entitled "Load to Load" provides a matrix of load port origins ("from") and load port destinations ("to"). By entering a one (1) into a cell representing any origin/destination combination of two load ports, any voyage comprising a leg from the indicated origin load port to the indicated destination load port is forbidden.

The second table, entitled "Load to Discharge" provides a matrix of load port origins ("from") and discharge port destinations ("to"). By entering a one (1) into any cell representing any origin/destination combination of load port and destination port, any voyage comprising a leg from the indicated origin load port to the indicated destination discharge port is forbidden.

The third table, entitled "Discharge to Discharge" provides a matrix of discharge port origins ("from") and discharge port destinations ("to"). By entering a one (1) into a cell representing any origin/destination combination of two discharge ports, any voyage comprising a leg from the indicated origin discharge load port to the indicated destination discharge port is forbidden.

ix. The Ship Worksheet

Figure 11B:
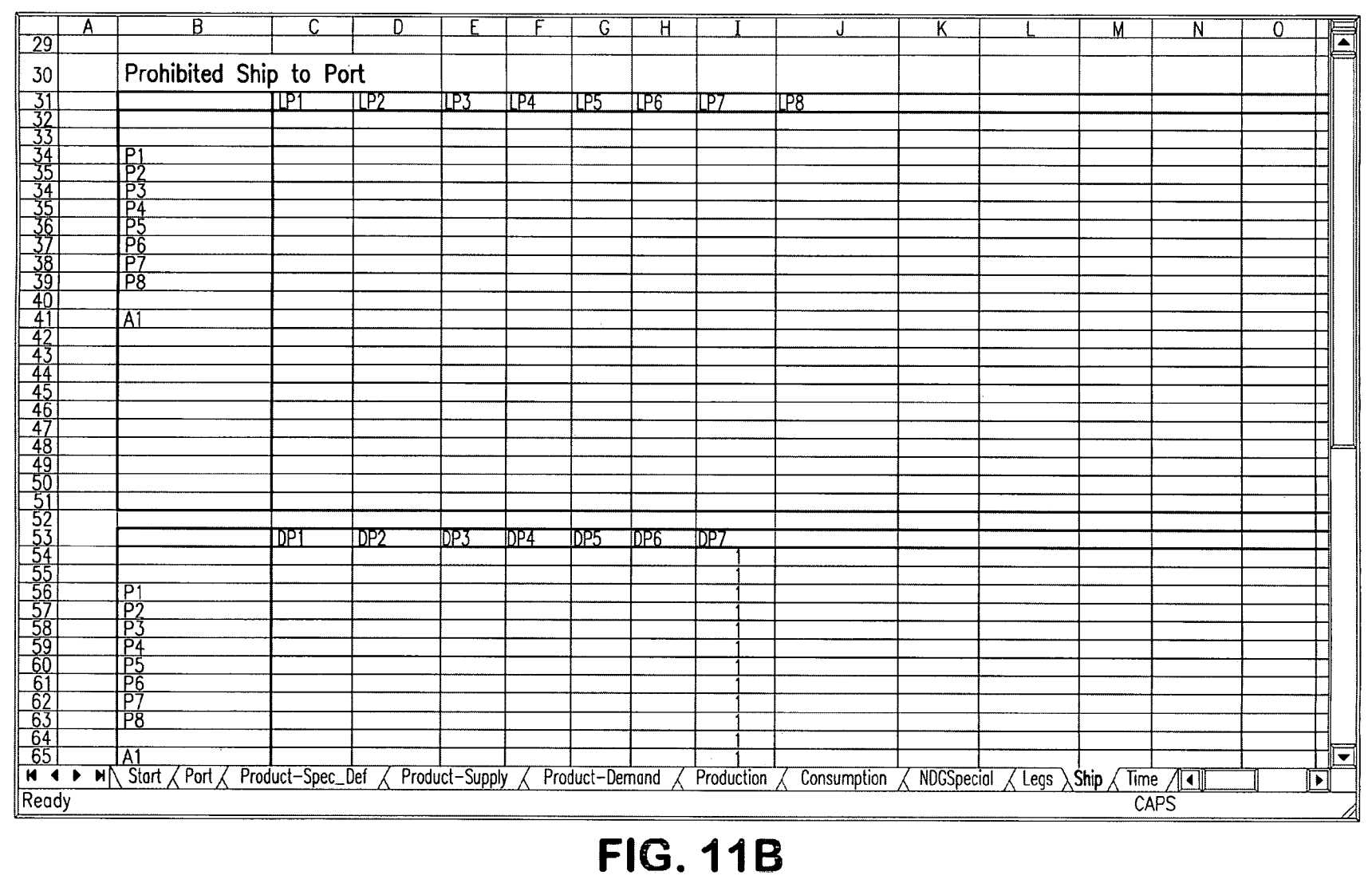
Figure 11C:
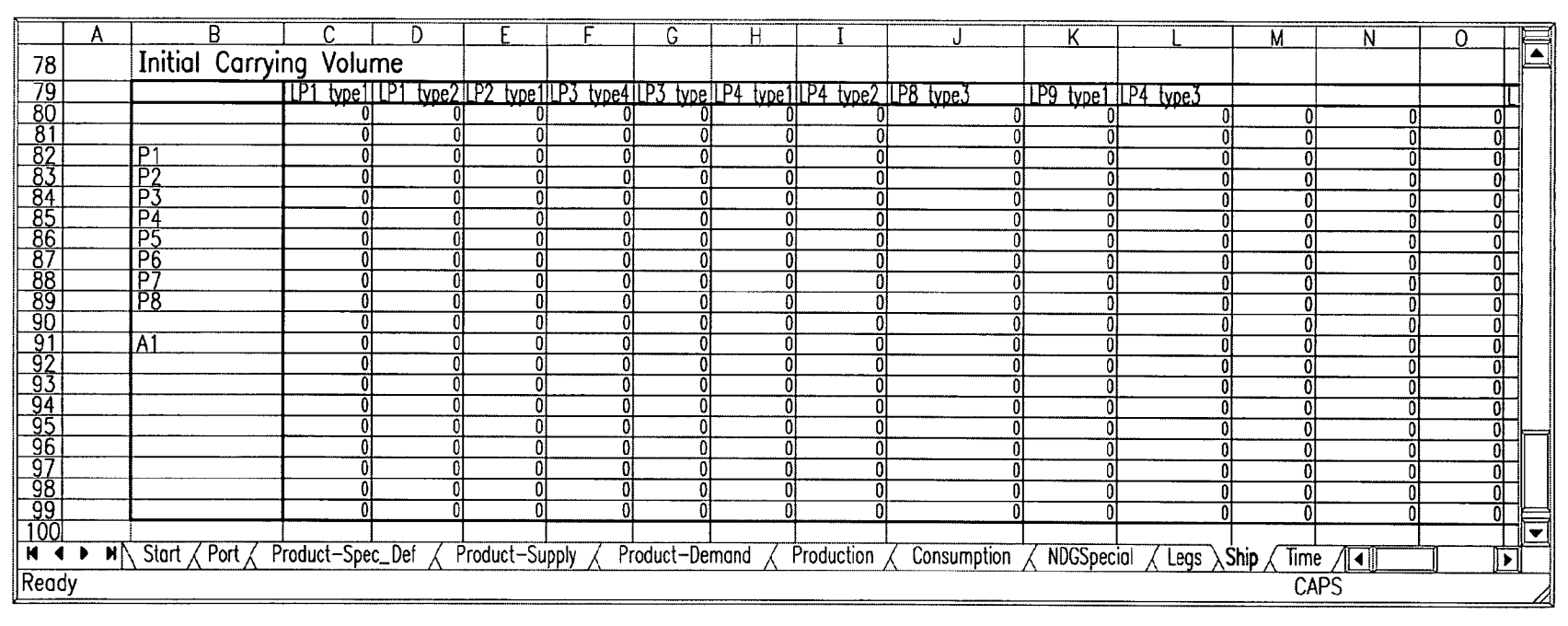

The Ship worksheet is the ninth of the twelve worksheets in the METEORITE workbook. The Ship worksheet identifies the spot vessel charters that have been chartered or are of interest (this particular example only employs spot vessels), as well as the physical and cost parameters for the same and relevant port restrictions for the same. FIGS. 11A, 11B, and 11C illustrates a typical Ship worksheet using generic fictional vessel names (e.g., Aframax 1 (A1), Panamax 1 (P1), etc. . . . ). In actual practice, it is easier to employ the registered names of the vessels under consideration. The illustrated worksheet consists of three tables.

The first table entitled "Ship," shown in FIG. 11A, contains the columns and information set forth below for each vessel.

a. "Name"—the name of the vessel;
b. "Vessel Use"—whether the vessel is already "chartered" (and, therefore, must be used) or whether the spot vessel would be a "new" charter.
c. "Vessel Type"—whether the vessel is an "Aframax" or "Paramax" class vessel.
d. "Max Capacity"—the maximum vessel capacity of the vessel in ktons.
e. "Worldscale"—the vessel specific rate, relative to Worldscale100, that the spot vessel charges. Worldscale is a periodically updated average rate (in U.S. $/kton) for carrying cargo on various routes. This average value is designated as Worldscale100 (WS100). Depending on market conditions, vessel size, etc., a spot vessel may charge more or less than WS100 for performing voyages. This variation, expressed as a percentage of WS100, typically ranges from 40% (0.40) to 200% (2.00).
f. "Base Volume"—the part cargo minimum, in ktons, for which the vessel will charge even if less volume is loaded;
g. "Overage"—the percentage of the basic transportation rate the spot vessel charges for each additional ton of cargo transported over the base volume;
h. "Demurrage"—the idle cost of the vessel in U.S. k$/day;
i. "Max Demurrage Days (Actual)"—the maximum demurrage days allowed;
j. "Start Date (chartered date) for vessel"—the first date of the vessel's contract;
k. "Last Window Date"—the last day loading on the vessel should finish;
l. "Actual Arrival Date for Chartered Vessels"—the first day a previously chartered vessel is actually available (which may be earlier than the start date from which demurrage is calculated);
m. "Penalty/(Incentive) to use Vessel"—penalties or incentives to use a specific vessel; and
n. "Min % Basis Vol"—the minimum percentage of the base volume that must be loaded.

The second table, entitled "Prohibited Ship to Port," shown in FIG. 11B, provides a one matrix of vessel names and load ports and another matrix of vessel names and discharge ports. By entering a one (1) in a cell representing any combination of a given vessel and a port, any voyage wherein the given vessel travels to the given port is forbidden.

The third table, entitled "Initial Carrying Volume," shown in FIG. 11C, provides a matrix of vessel names and supply streams. It may be that, at the start of the planning period, some of the vessels to be considered in the loading and delivery schedules are already partially or fully loaded. If so, the amount, in ktons, of each supply stream already loaded on the vessel is entered in the corresponding to the vessel and the loaded streams.

x. The Time Worksheet

Figure 12:
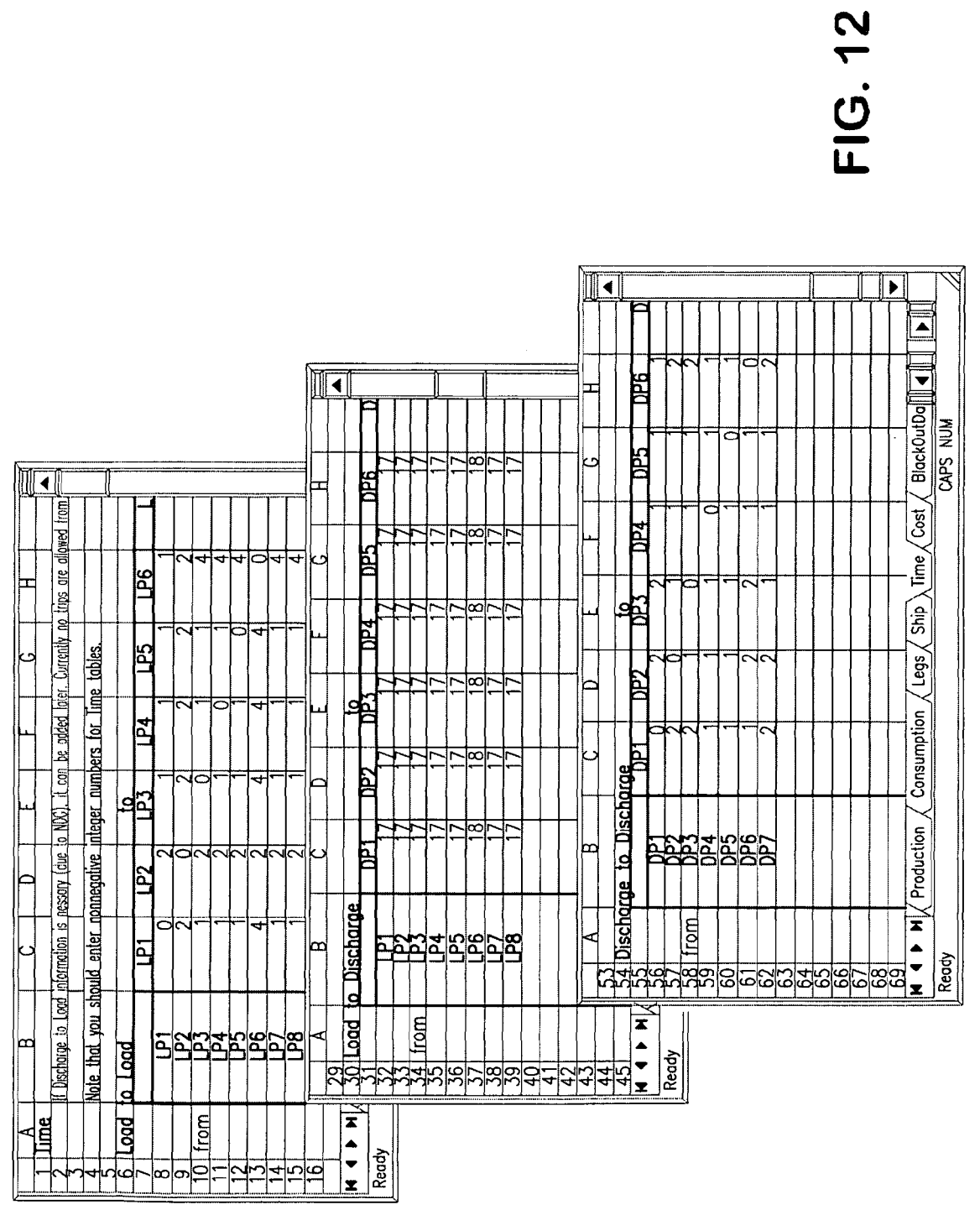

The Time worksheet is the tenth of the twelve worksheets in the METEORITE workbook. The Time worksheet records the average days it takes a vessel to transit each potential leg in a voyage. FIG. 12 illustrates a typical Time worksheet. The illustrated worksheet consists of three tables.

The first table, entitled "Load to Load" provides a matrix of origin load ports ("from") and destination load ports ("to"). The average travel time, in days, for a vessel to move from each origin load port to each destination load port is set forth in the cell representing the origin load port/destination load port combination.

The second table, entitled "Load to Discharge" provides a matrix of origin load ports ("from") and destination discharge ports ("to"). The average travel time, in days, for a vessel to move from each origin load port to each destination discharge port is set forth in the cell representing the origin load port/destination discharge port combination.

The third table, entitled "Discharge to Discharge" provides a matrix of discharge load ports ("from") and destination discharge ports ("to"). The average travel time, in days, for a vessel to move from each origin discharge port to each destination discharge port is set forth in the cell representing the origin discharge port/destination discharge port combination.

xi. The Cost Worksheet

The Cost worksheet is the eleventh of the twelve worksheets in the METEORITE workbook. The Cost worksheet records the trade route specific Worldscale100 rate (in U.S. $/ton) for moving cargo on each potential leg in a voyage. The trade route specific Worldscale100 rate, when multiplied by (a) the base volume (provided in the Ship worksheet) and (b) the relative percentage of the Worldscale100 rate a vessel charges (provided in the Ship worksheet), equals the flat rate the vessel will charge to perform the voyage leg. Similarly, this rate, when multiplied by (a) the overage rate for a vessel (provided in the Ship worksheet), (b) the overage amount, in ktons, and (c) the relative percentage of the Worldscale100 rate a vessel charges (provided in the Ship worksheet), equals the overage cost for a voyage leg. Even though a specific leg does not have any overage, if a voyage has any overage leg, overage cost is charged to all the legs in the voyage based on the maximum amount of overage in that voyage. The total cost to perform any given voyage is then the sum of the flat rate and overage costs for each leg of the voyage using the vessel.

Figure 13:
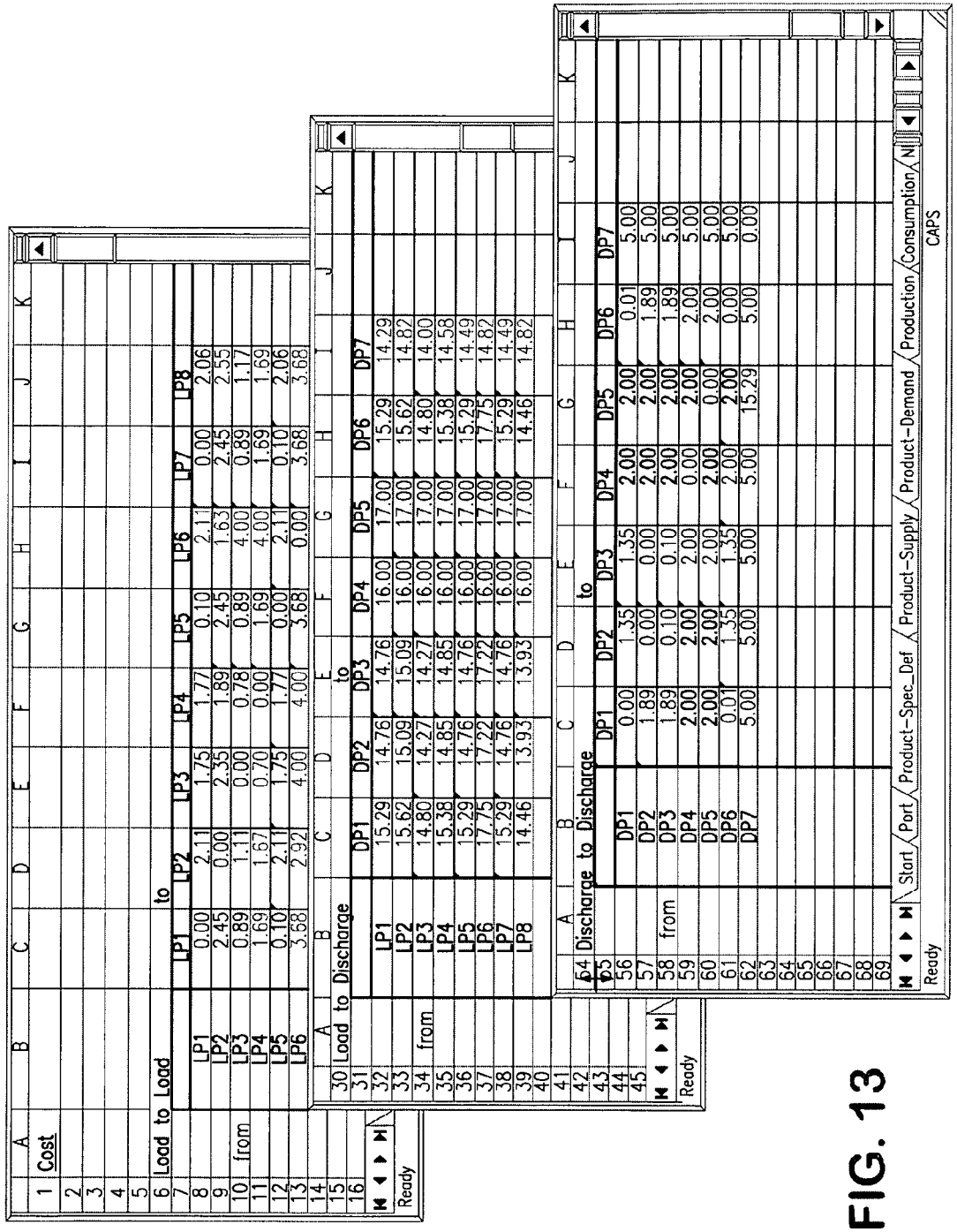

FIG. 13 illustrates a typical Cost worksheet. The illustrated worksheet consists of three tables.

The first table, entitled "Load to Load" provides a matrix of origin load ports ("from") and destination load ports ("to"). The average cost, in U.S. k$/kton, for a vessel to carry cargo from any origin load port to any destination load port is set forth in the cell representing the combination of the origin load port and the destination load port.

The second table, entitled "Load to Discharge" provides a matrix of origin load ports ("from") and destination discharge ports ("to"). The average cost, in U.S. k$/kton, for a vessel to carry cargo from any origin load port to any destination discharge port is set forth in the cell representing the combination of the origin load port and the destination discharge port.

The third table, entitled "Discharge to Discharge" provides a matrix of origin discharge ports ("from") and destination discharge ports ("to"). The average cost, in U.S. k$/kton, for a vessel to carry cargo from any origin discharge port to any destination discharge port is set forth in the cell representing the combination of the origin discharge port and the destination discharge port.

xii. The BlackOut Worksheet

Figure 14:
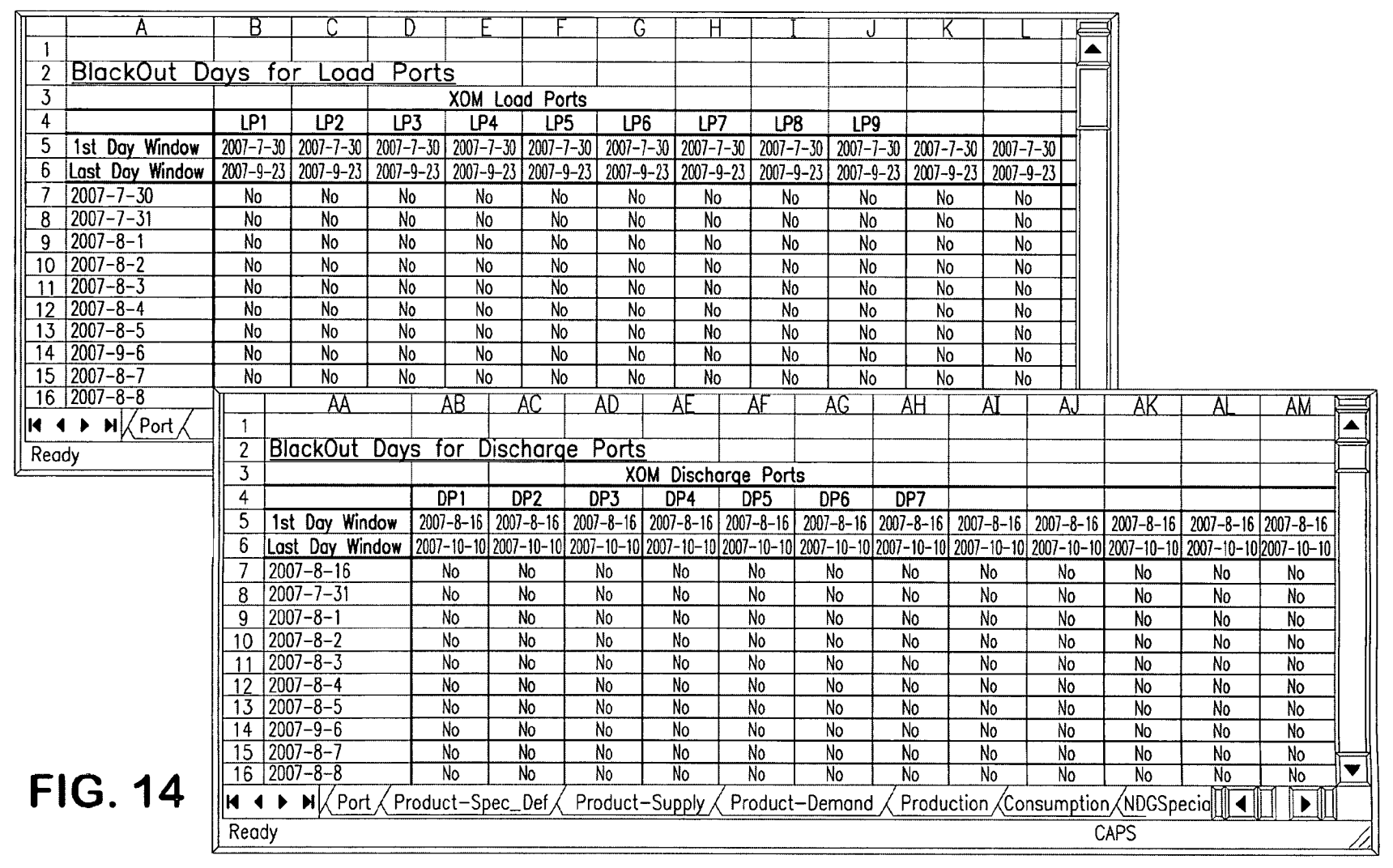

The BlackOut worksheet is the twelfth of the twelve worksheets in the METEORITE workbook. The BlackOut worksheet records any days within the relevant production or consumption horizons in which a load port will not be available for cargo loading or a discharge port will not be available for cargo discharge, respectively. FIG. 14 illustrates a typical BlackOut worksheet. The illustrated worksheet consists of two tables.

The first table, entitled "BlackOut Days for Load Ports" sets forth the first and last day in the production window and provides a matrix of each day in the production window and each load port. If, for any load port, there will be one or more days when cargo cannot be loaded at the port, then a "Yes" is entered into the cells corresponding to those days at the load port. Otherwise, the default for all the cells is "No"—meaning that cargo can be loaded at the given port on the given day.

The second table, entitled "BlackOut Days for Discharge Ports" sets forth the first and last day in the consumption window and provides a matrix of each day in the consumption window and each discharge port. If, for any discharge port, there will be one or more days when cargo cannot be discharged at the port, then a "Yes" is entered in the cell corresponding those days at the discharge port. Otherwise, the default for all the cells is "No"—meaning that cargo can be discharged at the given port on the given day.

4.9.5 Transferring Data from Excel to AIMMS

The METEORITE model is written in the AIMMS modeling language and employs an AIMMS graphical user interface. Therefore, when the user has populated or updated the Excel workbook, the data in each of the worksheets must be transferred to an AIMMS application. This is accomplished using an Excel add-in feature of AIMMS that has been appropriately configured by the METEORITE developer. The METEORITE developer, using the AIMMS Excel add-in configuration wizard, configures the add-in by specifying the necessary links between the data in the Excel workbook and identifiers in the underlying AIMMS model in a point-and-click manner. The add-in also generates a button that appears in the Excel tool bar and is named anything the developer desires (e.g., "Execute Read/Data" in the case of METEORITE). When the user clicks the "Execute Read Data" action key on the Excel tool bar or, alternatively, calls a corresponding visual basic function, the data in the Excel workbook is exported to the METEORITE model. If an error occurs during this read data step, an error dialog will appear in Excel. Otherwise, the data has been read into the METEORITE model successfully.

4.9.6 The METEORITE AIMMS Interface

METEORITE uses an AIMMS user interface to enable the user to review and alter the data, solve the model, and review the solution. There are numerous pages in the interface. The main pages to the interface are the following: (i) a "FrontPage" screen; (ii) a "Data" screen; a "Options" screen; a "Solve" screen; and a "Solution" screen. Each of these screens, as well a few additional screens accessible there from, is illustrated in the accompanying FIGS. 15, 16, 17, 18, and 19 and separately discussed below.

i. The FrontPage Screen

When the user exports data to the METEORITE application from the Excel workbook, the "FrontPage" screen of an AIMMS graphical user interface designed for the METEORITE application automatically appears. The user must have a licensed version of AIMMS for METEORITE application to start up properly.

Figure 15:
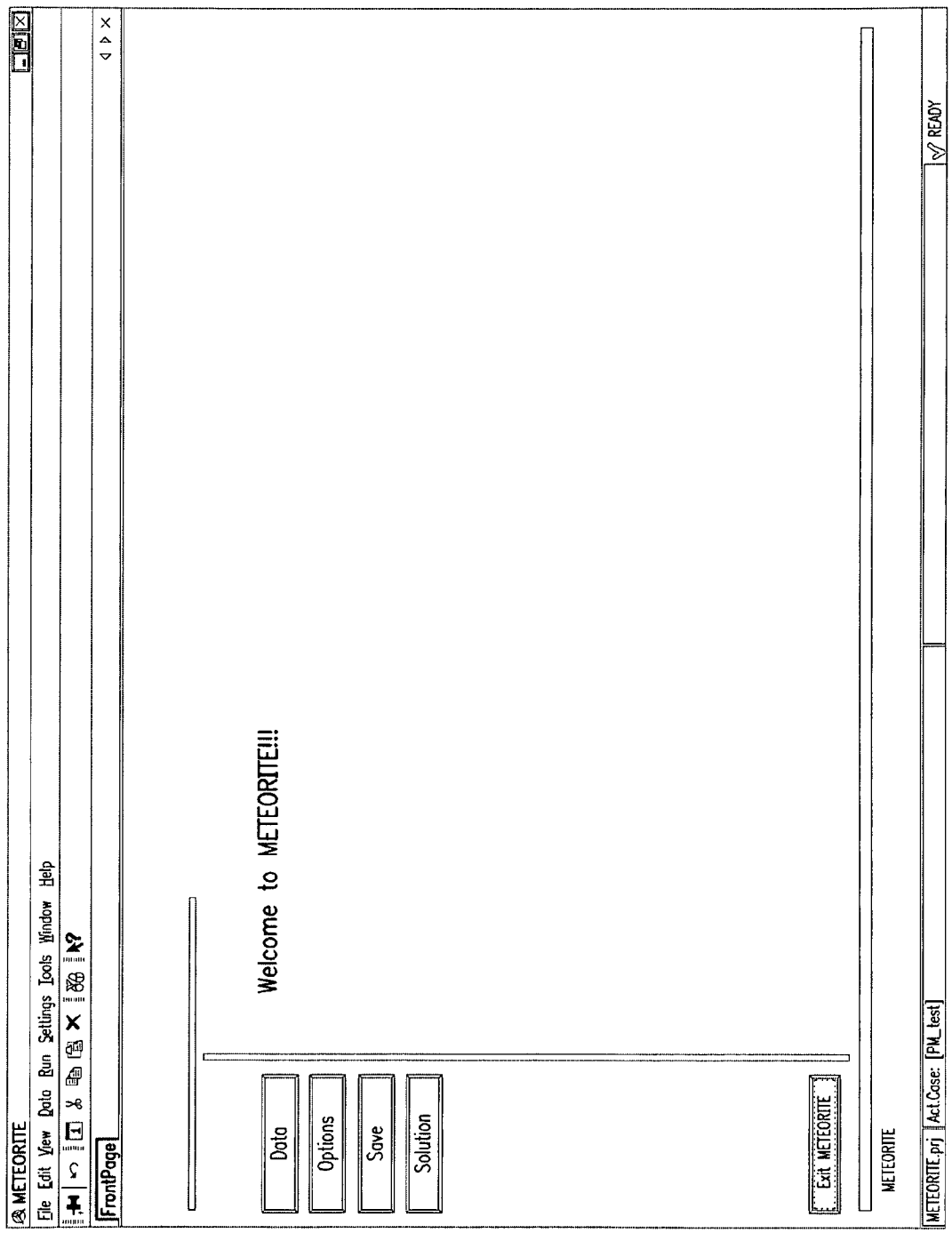

The FrontPage screen is illustrated in FIG. 15. The FrontPage screen contains the following navigation buttons: "Data," "Options," "Solve," and "Solution." These buttons take the user to screens where the user can review the imported data, vary options for the problem to be solved, solve the problem and review the solution results, respectively. In addition, the FrontPage screen contains an "Exit METEORITE" button that allows the user to exit the program.

ii. The Data Screen

When the user hits the "Data" navigation button on the "FrontPage," the "Data" screen appears. This screen allows the user to review and alter the data imported from the Excel workbook.

Figure 16:
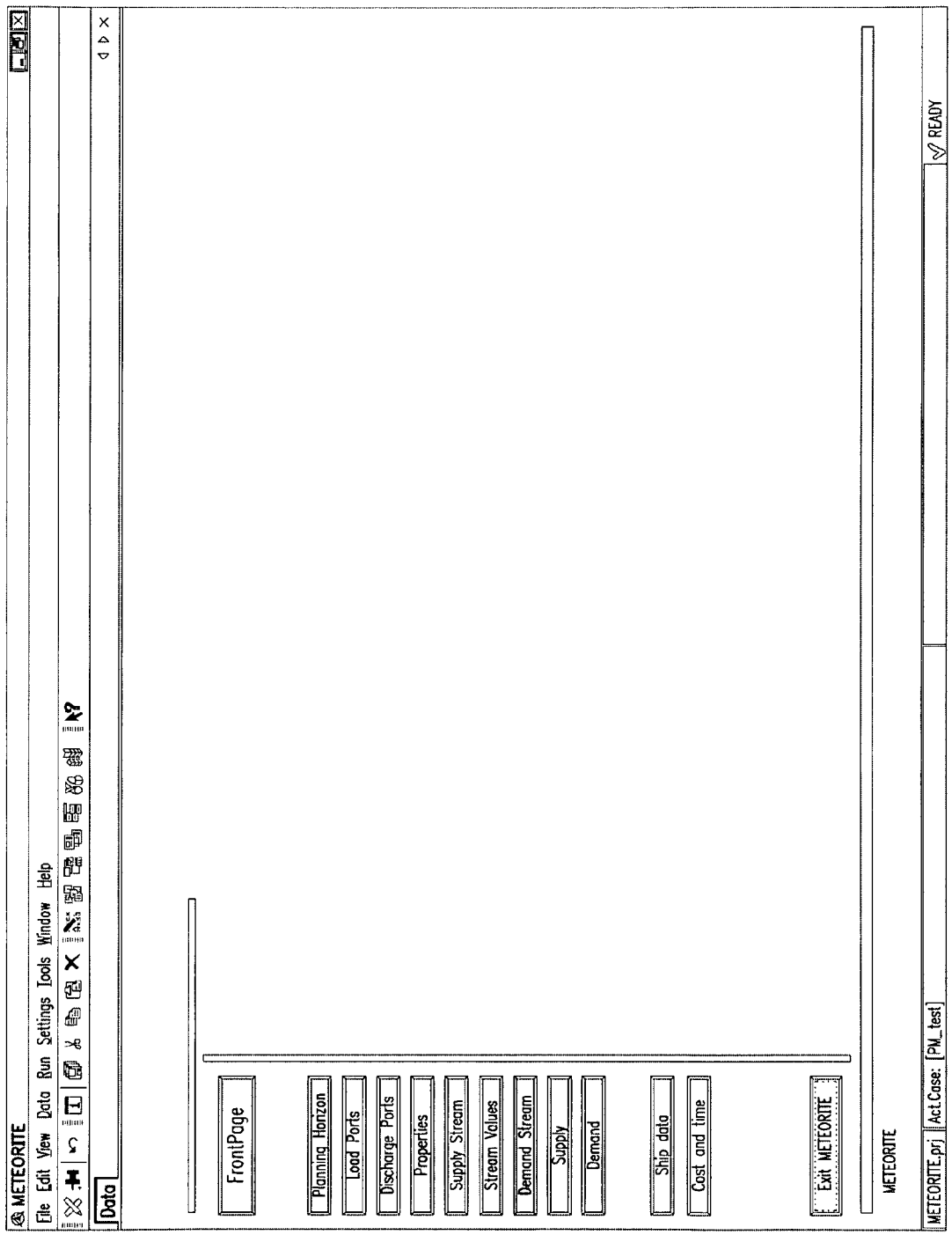

The Data screen is illustrated in FIG. 16. Along the left hand side of the Data screen are several navigational buttons entitled: "Planning Horizon;" "Load Ports;" "DischargePorts;" "Properties;" "Supply Stream;" "Stream Values;" "Demand Stream;" "Supply;" "Demand;" "Ship Data;" and "Cost and Time." When the user clicks on any of one of these navigational buttons, the screen of data relevant to the topic will appear. For example, if the user were to click the "Stream Values" button, a data screen (not shown) would appear that listed the monetary valuation of each supply stream. If desired, the user can modify the data directly on the screen, but the modifications will not update the Excel workbook and, therefore, only be stored for the time the user is running the METEORITE program.

After reviewing the data, the user can return to the FrontPage screen by clicking the "FrontPage" button on the Data screen. Alternatively, the user can exit the application by clicking the "Exit METEORITE" button on the Data screen.

iii. The Options Screen

When the user hits the "Options" navigation button on the "FrontPage," the "Options" screen appears. This screen allows the user to change constraints for the problem.

Figure 17:
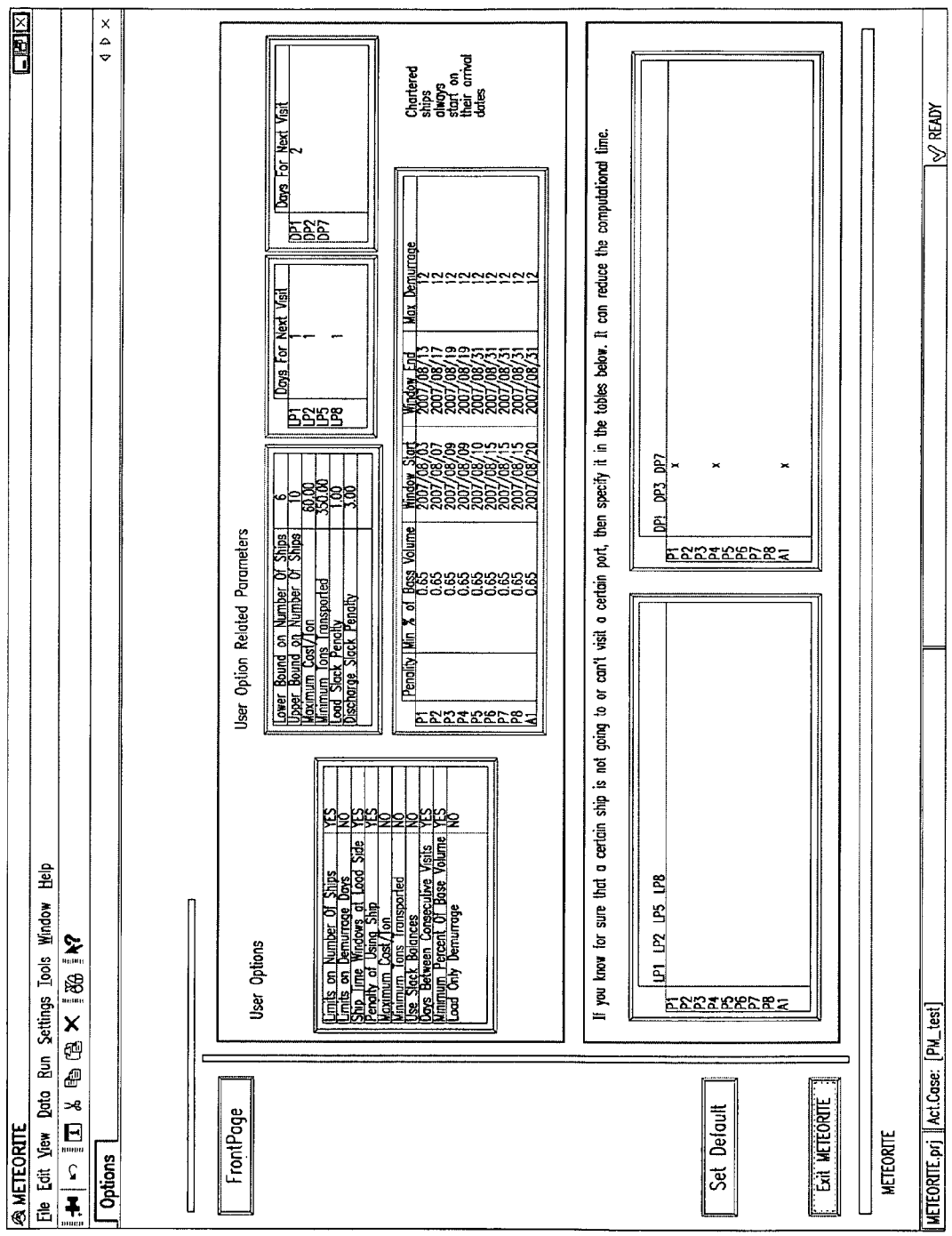

The Options screen is illustrated in FIG. 17. The right hand side of the screen displays constraints for the problem imported from the Excel workbook. For instance, there are tables showing the current bounds on the minimum and maximum number of vessels, the maximum demurrage days, time windows for load ports, penalties for using a vessel, maximum transportation cost/ton, minimum tons transported, slack penalties, days between consecutive visits to ports, minimum percent of base volume, and load only demurrage. There is also a table indicating, by an entered "YES" or a "NO," whether the aforementioned options should or should not be recognized. The user can change any of this data directly. Alternatively, the user can hit the "Set Default" button on the right hand side of the screen to change the designations of which constraints are and are not considered to standard defaults.

After reviewing the options, the user can return to the FrontPage screen by clicking the "FrontPage" button on the Options screen. Alternatively, the user can exit the application by clicking the "Exit METEORITE" button on the Options screen.

iv. The "Solve" Screen

When the user hits the "Solve" navigation button on the "FrontPage," the "Solve" screen appears. This screen allows the user specify how the model should be solved.

The Solve screen is illustrated in FIG. 18. The Solve screen gives the user several options for how the problem can be solved. A first option button, entitled "SOLVE—Construction Heuristic+Improvement Heuristics," will solve the model using a construction heuristic and improve the solution through one run of two improvement heuristics (i.e., the large neighborhood searches). This is the fastest option and generally yields good results. Similarly, a second option button, entitled "SOLVE—Constructive Heuristic+Iterative Improvement Heuristics," will solve the model using the construction heuristic and then improve the solution using iterative runs of the two improvement heuristics until no additional improvement in the solution is obtained. This is a slightly slower option, but generally yields a better result. In a third option, the user can run the construction heuristic and each of the two improvement heuristics singly and in an iterative fashion, one step at a time. This option is represented by the buttons entitled: "SOLVE—Construction Heuristic Only," "SOLVE—Improvement Heuristic 1 Only," "SOLVE—Improvement Heuristic 2 Only," and "SOLVE—Iterative Improvement Heuristics." A fourth option button, entitled "SOLVE—Full Model Only," will solve the model without using heuristics. This is the slowest option (generally too slow), but will yield an optimal result. A fifth option is a hybrid heuristic/optimization option, entitled "SOLVE—Construction+Improvement+Full Model." In this option, a solution, found using the construction heuristic and one run of the two improvement heuristics, is thrown into the full model and the full model is solved. This is a faster way of obtaining an optimal result as the heuristics decrease the time necessary to solve the mode. Similarly, in a sixth option, a solution, found using the constructive heuristic and iterative runs of the two improvement heuristics, is thrown into the full model and solved. Accordingly, the user has many options to select from in deciding how to solve the problem. Generally, options 1 or 2 will yield a suitable answer in the fastest amount of time.

In order to stop running, the user can press ctrl+shift+s simultaneously at any time. The user can then go to the FrontPage by clicking the "FrontPage" button on the "Solve" screen. Alternatively, the user can exit the program by clicking "Exit Meteorite" button on the "Solve" screen.

v. The "Solution" Screen

When the user hits the "Solution" navigation button on the "FrontPage," the "Solution" screen appears. This screen allows the user view the best solution found by the model up to the point where the Solve option was ended by the user or reached its natural completion.

The Solution screen is illustrated in FIG. 19. On the left hand side is a summary of the solution obtained. The solution summary sets forth the total value (in U.S. k$) of loaded and discharged product, shipping costs for the same, holding costs for the same, any assigned penalties to the solution obtained if it is infeasible, the total amount (in ktons) of product transported, and the identity dates and amounts of each stream that each ship or barge loaded and discharged. In addition, along the left hand side are several navigational buttons entitled: "Load;" "Discharge;" "Ship Overall;" "Ship Specific;" "Blending FCC;" "Barge FCC;" "Inventory Holding;" and "Gannt Chart." When the user clicks on any of one of these navigational buttons, a screen of more detailed solution information corresponding to the topic will appear. Some of these more detailed screens will be discussed below.

For example, if the user clicks the "Load" button, then a "Load" screen (not shown) appears that lists each supply stream and the total amounts (in ktons and kB) loaded in the solution. In addition, for each supply stream, the user can view the vessels that loaded product from the supply stream, the corresponding load dates, amounts loaded (in ktons and kB) and monetary value (in U.S. k$) of the load product, and the daily inventory level of the supply stream over the production period.

Or, in further example, if the user clicks the "Discharge" button, then a "Discharge" screen (not shown) appears that lists each demand stream for which product was delivered in the solution and the total amounts (in ktons and kB) delivered. In addition, for each demand stream, the user can view the vessels that delivered product for the demand stream and the corresponding discharge date, the discharged amounts (in ktons and kB) and monetary value (in U.S. k$) for the deliveries, and the inventory level of the demand stream over the consumption period.

Or, in further example, if the user clicks the "Blending—FCC" button, then a "Blending—FCC" screen (not shown) appears. This screen details, by vessel, each delivery made to each demand port, including the vessel name, the demand stream name for which delivery was intended, the date of delivery, the amounts (in ktons and kB) delivered, the density (B/ton) of the delivery, the monetary value (U.S. k$/B and U.S. k$)) of the delivery and the base value of a typical stream (in U.S. k$/B) that would meet the demand stream's property range requirements. If the user clicks on a particular vessel's delivery for a particular demand stream, then the blending recipe for the delivered product (if applicable) appears. For each cargo that contributed to the blended product, the amount (in ktons and kB), monetary value at the time of load (in U.S. $k/B and U.S. $k) and properties are provided. In addition, the amount (in ktons and kB), discharge value (in U.S. $k/B and U.S. $k) and properties of the delivered blended product are provided. Finally, value adjustments made to value of the discharged product, compared to the base value of a typical product that would meet the demand stream's property range requirements, are detailed, in total and by property.

Or, in further example, if the user clicks the "Gantt Chart" button, then a "Gantt Chart" screen (not shown) appears. The Gantt Chart screen shows a chart listing, by vessel, the numbered days in the planning period for loading, discharging and other activities of each vessel. The Gantt Chart screen also shows a second chart listing, by load port and discharge port, the numbered day in the planning period for loading, discharging and other activities of each port.

Other screens (not shown) include the "Ship Overall," "Ship Specific," "Barge-FCC" and "Inventory Holding" screens. The "Ship Overall" and "Ship Specific" screens list the vessel assignments, voyages, loading and discharging amounts, associated flat rate, overage and demurrage costs, etc., both as a whole and by individual vessel. The "Barge-FCC" screen details the identity, amount and monetary value of spot market purchases in the solution. The "Inventory Holding" screen details the daily inventory at each loading port, discharge port and on each vessel and the associated individual and total costs for the same.

4.9.7 Saving Reports From METEORITE

All of the grids and tables described above from the Solution screen and its component screens (e.g., the Load screen, Discharge screen, Blending screen, Inventory Holding screen, etc.), describing the solution found by METEORITE in both general and specific detail, can be saved in report format by clicking the "Export Reports" button on the Solution screen. The reports can be stored as Excel documents, Microsoft Word documents or in any other desired format. In addition, each case (data and solution) can be stored and managed in the METEORITE AIMMS application.

4.9.8 The Underlying Mathematics of METEORITE i. Problem Definition and Formulation a. Problem Definition The mathematical problem can be viewed as a variation of ship inventory routing problems. However, there are many additional features that differentiate it from the conventional inventory routing problems. Each loading port may have multiple supply streams, and since each supply stream produces a different product, the problem is a multi-product problem. It is not a conventional multi-product distribution problem because each supply stream has its own product specifications and each demand stream has its own acceptable specifications. Further, completely new products can be produced by blending several products during loading, discharge or transit. The value of a discharged product stream is determined based on the specifications of the discharged product. An example includes blending of lower value product (i.e., HSVGO), which is not acceptable to some particular demand streams, with a high quality product (i.e., LSVGO) to create a new product stream that is acceptable to the demand stream. Therefore the model is not only saving on transportation costs, but also creating value to the system by reducing quality giveaway.

The objective of the mathematical optimization problem is to maximize profit, which can be defined as the sum of the values of discharged products for demand streams minus the values of the loaded products at the supply streams minus all of the transportation related costs. Due to the flexibilities in the compartments of ships, a ship may load several products, blend them into several new products, and discharge them at several demand streams based on the economics and consumption rates at the demand streams. The formal definition of the mathematical model follows.

Multiple products are distributed from a set $J^L$ of load ports to a set $J^D$ of discharge ports over a planning horizon T. The model presented in this report is a discrete time model and time t belongs to the set $\{1, 2, \ldots, T\}$. Although the time unit used in practice is one day, a different unit of time could easily be substituted and applied as necessary. A set J of all ports is the union of $J^L$ and $J^D$. The set $J^O \subset J$ represents the set of ports owned and/or operated by company, the set $J^M$ represents the set of ports for spot markets, and the set $J^3 \subset J$ represents the set of ports operated by third parties. Without loss of generality it will be assumed that $J^3 = \emptyset$ and $J^M = \emptyset$ for the purposes of presenting the details of the mathematical programming model. The set $J^{DL} \emptyset J$ is the set of ports with draft limits. The number of loads or discharges by a ship at port j may be limited such that each ship may not load or discharge at some port j more than $u_j$ times.

Each load port $j \in J^L$ has a set $SS^j$ of supply streams, and each discharge port $j \in J^D$ has a set $DS^j$ of demand streams. The set SS and the set DS represent the set of all supply streams and the set of all demand streams, respectively. Let Q represent a set of all tracked properties, and let its subsets $\overline{Q}$ or $\underline{Q}$ represent the different directions for value adjustments on products based on property. Each $q \in Q$ may only belong in either $\overline{Q}$ or $\underline{Q}$, but not in both. If $q \in \underline{Q}$, then value increases with higher specifications of property q. If $q \in \overline{Q}$, then value increases with lower specifications of property q. Each supply stream $ss \in SS$ has an initial inventory $I_{ss,0}$ on the beginning day and a value $VL_{ss}$ per unit at its supply port, and produces $P_{ss,t}$ amount of product from time t−1 to time t. The inventory level of supply stream $ss \in SS$ has to be larger than or equal to $I_{ss,t}^{min}$ and less than or equal to $I_{ss,t}^{max}$ at time t. The product from supply stream $ss \in SS$ has $s_{ss,t}^q$ specification for property $q \in Q$. Each demand stream $ds \in DS$ also has an initial inventory $I_{ds,0}$ on the beginning day, and consumes $D_{ds,t}$ amount of product from time t−1 to time t. The inventory level of demand stream $ds \in DS$ has to be larger than or equal to $I_{ds,t}^{min}$ and less than or equal to $I_{ds,t}^{max}$ at time t. When a ship stops at load port $j \in J^L$, it can load from any $ss \in SS^j$, but the total amount of load has to be greater than or equal to $F_j^{min}$ and less than or equal to $F_j^{max}$. Similarly when a ship stops at discharge port $j \in J^D$, it can discharge at any $ds \in DS^j$, but the total amount of discharge has to be greater than or equal to $F_j^{min}$ and less than or equal to $F_j^{max}$.

The calculation of the value of discharged product for a demand stream is somewhat complex. Each demand stream ds has its standard specification $std_{ds}^q$ for each property $q \in Q$. If the level of property q of discharged product is different from $std_{ds}^q$, then its value needs to be adjusted. The following notations are necessary for the presentation of the model. The level of $q \in Q$ of discharged product for demand stream $ds \in DS$ needs to be greater than or equal to $lbh_{ds}^q$ and less than or equal to $ubh_{ds}^q$. These are called hard bounds. If the level of $q \in Q$ of discharged product for demand stream $ds \in DS$ is less than $lbs_{ds}^q$ or the level of $q \in \overline{Q}$ of discharged product for demand stream $ds \in DS$ is greater than $ubs_{ds}^q$, then the value adjustment is calculated based on $lbs_{ds}^q$ or $ubs_{ds}^q$, respectively. These are called soft bounds. Without loss of generality, it is assumed that $lbh_{ds}^q \leq lbs_{ds}^q \leq ubh_{ds}^q$ for each $q \in Q$ and $lbh_{ds}^q \leq ubs_{ds}^q \leq ubh_{ds}^q$ for each $q \in \overline{Q}$. In the METEORITE implementation, when $q \in \overline{Q}$, we set $ubh_{ds}^q = \infty$. When $q \in \underline{Q}$, we set $lbh_{ds}^q = 0$. These settings are based on user requests. The base value per unit of discharged product for demand stream ds is denoted by $VLB_{ds}$. For every value base unit $VBU^q$ difference between the specification of q of discharged product and the standard specification $std_{ds}^q$, the value per unit of discharged product for demand stream ds increases or decrease from $VLB_{ds}$ by $VS_{ds}^q$, value versus standard, depending on whether $q \in \overline{Q}$ or $q \in \underline{Q}$. As mentioned earlier, if the specification of q of discharged product for demand stream ds is less than $lbs_{ds}^q$ with $q \in \underline{Q}$ or greater than $ubs_{ds}^q$ with $q \in \overline{Q}$, then $lbs_{ds}^q - std_{ds}^q$ or $ubs_{ds}^q - std_{ds}^q$ is used for the calculation of value adjustment, respectively. The value adjustment steps and hard bounds are closely related to the on-board blending. Linear blending rules are assumed for all the properties. In reality it may not be true for some properties, however this practical assumption is good enough for the level of detail in this kind of distribution model.

The set V is the set of ships available for the transportation. A ship may stop at multiple load ports, load from multiple supply streams, stop at multiple discharge ports, and discharge to multiple demand streams. If a ship stops at a port with multiple streams, it can load from or discharge to multiple streams at the same time. Each ship $v \in V$ has an initial inventory $I_{ss,0}^v$ of supply stream ss on the beginning day. Each ship v has a maximum amount of product $I_{max}^v$ it may carry. Travel times between ports j and j' are denoted by $T_{jj'}$, and it is assumed that $T_{jj'}$ is a multiple of the discrete time unit (one day in this case). A ship $v \in V$ may belong to a set $V^{Chart}$ of previously chartered ships. Each ship $v \in V^{chart}$ becomes available at time $T_v^{Chart}$ and must be used in a model solution. Each non-chartered ship $v \in V \backslash V^{Chart}$ may or may not be used. For each $v \in V$, $j \in J^{DL}$, and $t \in \{1,2,\ldots,T\}$ the inlet draft limit $DL_{vjt}^{IN}$, and outlet draft limit $DL_{vjt}^{OUT}$ need to be satisfied. For each ship $v \in V$, $B_v$, $WS_v$, $DR_v$, and $OVR_v$ represent basis amount of product (PC tons), world scale multiplier, demurrage rate and overage rate respectively. The flat rate for traveling from port $j \in J$ to port $j' \in J$ is $C_{jj'}$. If ship v travels from port j to port j', the flat cost for this leg is $B_v WS_v C_{jj'}$. The demurrage cost for ship v is calculated by $DR_v$ multiplied by the number of demurrage days in ship v's voyage. Overage refers to the product tons over the basis amount $B_v$. If any leg of ship v's voyage incurs overage, the overage rate $OVR_v$ applies to all the legs of ship v's voyage based on the largest amount of overage of that voyage.

The objective is to maximize profit while satisfying all the requirements. The profit is defined by values of discharged product at demand streams minus values of loaded product at supply streams minus total transportation costs over the planning horizon T.

b. Problem Formulation

The time-space network formulation can be viewed as an integer multi-commodity flow formulation in which a ship is a commodity and nodes represent a possible visit to a port at a particular time. The network has a set of nodes and a set of arcs. The node set is shared by all ships, and each ship has its own arc set. The set of nodes N consists of one origin node $(0,0)$, one sink node $(0,T+1)$, and a set of regular nodes $N_r=\{(j,t): j \in J, t \in \{1,2,\ldots,T\}\}$. Each ship v has its own arc set $A^v$. Then set of arcs $A=\cup_{v \in V} A^v$.

Each set of arcs $A^v$ consists of five types of arcs. A travel arc $(v,(j,t),(j',t+T_{jj'}))$ such that $v \in V$, $(j,t) \in N_r$, $(j',t+T_{jj'}) \in N_r$, and $j \neq j'$ represents the possibility of ship v to travel from port j to port j', leaving at time t and arriving at time $t+T_{jj'}$. Let $A_T^v$ denote the set of all travel arcs for ship v. Then $A_T=\cup_{v \in V} A_T^v$ represents the set of all travel arcs. A demurrage arc $(v,(j,t),(j,t+1))$ with $v \in V$, $(j,t) \in N$, and $(j,t+1) \in N_r$ represents the possibility of ship v to wait at port j from time t to time t+1. Let $A_D^v$ denote the set of all demurrage arcs for ship v. Then $A_D=\cup_{v \in V} A_D^v$ represents the set of all demurrage arcs. An arc $(v,(0,0),(j,t))$ with $v \in V$ and $(j,t) \in N_r$ represents when and where ship v starts its voyage. An arc $(v,(j,t),(0,T+1))$ with $v \in V$ and $(j,t) \in N_r$ represents when and where ship v ends its voyage. An arc $(v,(0,0),(0,T+1))$ represent a possibility of ship v not being used. Let $c_a$ represent the cost of using arc a. The cost of using travel arc $a \in A_T^v$ which goes from node (j,t) to node $(j',t+T_{jj'})$ is $B_v WS_v C_{jj'}$. The cost of using demurrage arc $a \in A_D^v$ is $DR_v$. The cost of the remaining arcs is set to zero. Let $\delta^+(n)$ denote the set of arcs that have node n as their tail node. The set of arcs that have node n as their head node is denoted by $\delta^-(n)$.

FIG. 20 shows an example of the network structure described above. In this example, a ship enters the system at time $t_2$ by arriving at port i. After spending several days of demurrage, it visits port j at time $t_{T-1}$ and leaves the system.

The binary variable $x_a$ for each $a \in A^v$ takes a value 1 if ship v uses arc a and takes the value 0 otherwise. The binary variable $z_n^v$ for each ship $v \in V$ and each node $n=(j,t) \in N_r$ indicates whether or not ship v loads product(s) from port j if $j \in J^L$ and discharges product(s) to port j if $j \in J^D$ at time t.

The continuous decision variable $f_{n,ss}^v$ with $n=(j,t) \in N_r$, $j \in J^L$, and $ss \in SS^j$ represents the loading amount of product from supply stream ss to ship v at time t. The continuous decision variable $f_{n,ds,ss}^v$ with $n=(j,t) \in N_r$, $j \in J^D$, $ds \in DS^j$, and $ss \in SS$ represents the discharge amount of ss product for demand stream ds from ship v at time t. The continuous decision variable $I_{ss,t}$ with $ss \in SS$ and $t \in \{1,2,\ldots,T\}$ denotes the inventory level of supply stream ss right after time t. Similarly, the continuous decision variable $I_{ds,t}$ with $ds \in DS$ and $t \in \{1,2,\ldots,T\}$ denotes the inventory level of demand stream ds right after time t. Another continuous decision variable $I_{ss,t}^v$ represents the inventory level of product from supply stream ss on ship v at right after time t. The continuous variable $SAV_{n,ds,q}^v$ represents the specification adjusted value based on property $q \in Q$ of discharged product for demand stream $ds \in DS$ by ship $v \in V$ where $n=(j,t) \in N_r$ and $ds \in DS^j$. The continuous variable $O^v$ for each ship $v \in V$ represents the largest amount of overage of ship v's voyage. Another continuous variable $O_n^v$ for each travel arc $a \in A_T^v$ and $v \in V$ is equal to $O^v$ if arc a is used. Otherwise $O_a^v$ takes zero. The variable $O_a^v$ is used in the objective function for the calculation of overage costs.

The remainder of this section presents the time-space network-based formulation for METEORITE.

The first group of equations represents the flow conservation constraints.

$$\sum_{\{a \in A^v: a \in \delta^-(n)\}} x_a - \sum_{\{a \in A^v: a \in \delta^+(n)\}} x_a = 0 \quad \forall v \in V, \forall n \in N_r, \quad (1)$$

$$\sum_{\{a \in A^v: a \in \delta^+((0,0))\}} x_a = 1, \quad \forall v \in V, \quad (2)$$

$$\sum_{\{a \in A^v: a \in \delta^-((0,T+1))\}} x_a = 1, \quad \forall v \in V. \quad (3)$$

The next set of constraints ensures inventory balance at supply streams from the ports owned and/or operated by a company.

$$I_{ss,t-1} - \sum_{v \in V} f_{n,ss}^v + P_{ss,t} = I_{ss,t}, \quad (4)$$

$\forall n = (j,t) \in N_r$,
$\forall j \in J^L \cap J^O$,
$\forall ss \in SS^j$, $$I_{ds,t-1} + \sum_{v \in V} \sum_{ss \in SS} f_{n,ds,ss}^v - D_{ds,t} = I_{ds,t}, \quad (5)$$

$\forall n = (j,t) \in N_r$,
$\forall j \in J^D \cap J^O$,
$\forall ds \in DS^j$.

The following set of constraints ensures inventory balances for the ships.

$$I_{ss,t-1}^v + \sum_{\{n=(j,t), ss \in SS^j: j \in J^L\}} f_{n,ss}^v - \sum_{\{n=(j,t), ds \in DS^j: j \in J^D\}} f_{n,ds,ss}^v = I_{ss,t}^v, \quad (6)$$

$\forall ss \in SS, \forall t \in \{1, 2, \ldots, T\}, \forall v \in V$.

Loads and discharges by a ship can occur only when the ship is at that port. If a load or discharge occurs, the total loading amount or total discharging amount is forced to be between the port specific minimum and maximum amounts. These are represented by the following constraints.

$$z_n^v \leq \sum_{\{a \in A^v: a \in \delta^-(n)\}} x_a, \quad \forall n \in N_r, \forall v \in V, \quad (7)$$

$$F_j^{min} z_n^v \leq \sum_{ss \in SS^j} f_{n,ss}^v \leq F_j^{max} z_n^v, \quad (8)$$

$\forall j \in J^L, \forall n = (j,t) \in N_r, \forall v \in V$, $$F_j^{min} z_n^v \leq \sum_{ds \in DS^j} \sum_{ss \in SS} f_{n,ds,ss}^v \leq F_j^{max} z_n^v, \quad (9)$$

$\forall j \in J^D, \forall n = (j,t) \in N_r, \forall v \in V$.

Only one ship may stop for load or discharge at a port at a time. The following set of constraints ensures that this is true. If more than one ship can stop at a port at a time, the right hand side can be adjusted appropriately as necessary.

$$\sum_{v \in V} z_n^v \leq 1 \, \forall n \in N_r. \quad (10)$$

The following constraints ensure that a ship cannot load/discharge more than $u_j$ times at port j.

$$\sum_{n=(j,t)\in N_r} z_n^v \leq u_j, \forall v \in V, \forall j \in J. \quad (11)$$

Each demand stream has hard upper and lower property specifications, or bounds. These hard bounds represent acceptability of product.

$$\sum_{ss\in SS} s_{ss}^q f_{n,ds,ss}^v \geq lbh_{ds}^q \sum_{ss\in SS} f_{n,ds,ss}^v, \forall v \in V, \forall n=(j,t)\in N_r, \quad (12)$$
$$\forall ds \in DS^j, \forall q \in Q,$$

$$\sum_{ss\in SS} s_{ss}^q f_{n,ds,ss}^v \leq ubh_{ds}^q \sum_{ss\in SS} f_{n,ds,ss}^v, \forall v \in V, \forall n=(j,t)\in N_r, \quad (13)$$
$$\forall ds \in DS^j, \forall q \in Q.$$

The specification adjusted valuation of discharged product which may be blended on-board is one of the most interesting features in this model. The following set of constraints and the objective function at the end of this section deal with this feature.

$$SAV_{n,ds,q}^v \leq \frac{VS_{ds}^q}{VBU^q}\left(std_{ds}^q \sum_{ss\in SS} f_{n,ds,ss}^v - \sum_{ss\in SS} s_{ss}^q f_{n,ds,ss}^v\right), \quad (14)$$
$$\forall v \in V, \forall n=(j,t)\in N_r, \forall ds \in DS^j, \forall q \in Q,$$

$$SAV_{n,ds,q}^v \leq \frac{VS_{ds}^q}{VBU^q}(std_{ds}^q - lbs_{ds}^q)\sum_{ss\in SS} f_{n,ds,ss}^v, \quad (15)$$
$$\forall v \in V, \forall n=(j,t)\in N_r, \forall ds \in DS^j, \forall q \in Q,$$

$$SAV_{n,ds,q}^v \leq \frac{VS_{ds}^q}{VBU^q}\left(\sum_{ss\in SS} s_{ss}^q f_{n,ds,ss}^v - std_{ds}^q \sum_{ss\in SS} f_{n,ds,ss}^v\right), \quad (16)$$
$$\forall v \in V, \forall n=(j,t)\in N_r, \forall ds \in DS^j, \forall q \in \overline{Q},$$

$$SAV_{n,ds,q}^v \leq \frac{VS_{ds}^q}{VBU^q}(ubs_{ds}^q - std_{ds}^q)\sum_{ss\in SS} f_{n,ds,ss}^v, \quad (17)$$
$$\forall v \in V, \forall n=(j,t)\in N_r, \forall ds \in DS^j, \forall q \in \overline{Q}.$$

The next set of constraints enforces draft limits. Without loss of generality, it is assumed that draft limits for ship v are less than or equal to ship v's capacity $I_{max}^v$.

$$\sum_{ss\in SS} I_{ss,t-1}^v \leq DL_{vjt}^{IN} + (I_{max}^v - DL_{vjt}^{IN})(1-z_n^v), \quad (18)$$
$$\forall n=(j,t)\in N_r \forall v \in V,$$

$$\sum_{ss\in SS} I_{ss,t}^v \leq DL_{vjt}^{OUT} + (I_{max}^v - DL_{vjt}^{OUT})(1-z_n^v), \quad (19)$$
$$\forall n=(j,t)\in N_r \forall v \in V.$$

Overage calculations can be taken care of as follows. Without loss of generality, it is assumed that the capacity of ship $I_{max}^v$ is greater than or equal to its base amount $B_v$.

$$O^v \geq \sum_{ss\in SS} I_{ss,t}^v - B_v, \forall v \in V, \forall t \in \{1, 2, \ldots, T\}, \quad (20)$$

$$O_a^v \geq O^v - (I_{max}^v - B_v)(1-x_a), \forall v \in V, \forall a \in A_T^v. \quad (21)$$

The following set of constraints ensures that a ship may not carry products in excess of its cargo capacity.

$$\sum_{ss\in SS} I_{ss,t}^v \leq I_{max}^v, \forall t \in \{1, 2, \ldots, T\}, \forall v \in V. \quad (22)$$

The final set of constraints provides the bounds on all variables.

$$x_a \in \{0,1\}, \forall a \in A^v \forall v \in V, \quad (23)$$

$$z_n^v \in \{0,1\}, \forall n \in N_r, \forall v \in V, \quad (24)$$

$$I_{ss,t}^{min} \leq I_{ss,t} \leq I_{ss,t}^{max}, ss \in SS, t \in \{1,2,\ldots,T\}, \quad (25)$$

$$I_{ds,t}^{min} \leq I_{ds,t} \leq I_{ds,t}^{max}, ds \in DS, t \in \{1,2,\ldots,T\}, \quad (26)$$

$$f_{n,ss}^v \geq 0, \forall n=(j,t)\in N_r, \forall ss \in SS^j, \forall v \in V, \quad (27)$$

$$f_{n,ds,ss}^v \geq 0, \forall n=(j,t)\in N_r, \forall ds \in DS^j, \forall ss \in SS, \forall v \in V, \quad (28)$$

$$I_{ss,t}^v \geq 0, \forall ss \in SS, \forall t \in \{1,2,\ldots,T\}, \forall v \in V, \quad (29)$$

$$0 \leq O_a^v \leq I_{max}^v - B_v, \forall a \in A_T^v \forall v \in V, \quad (30)$$

$$0 \leq O^v \leq I_{max}^v - B_v, \forall v \in V. \quad (31)$$

The objective is to maximize profit. The profit is defined by values of discharged product minus values of loaded product minus all the transportation related costs.

$$\max \sum_{v\in V}\sum_{n=(j,t)\in N_r}\sum_{ds\in DS^j}\sum_{ss\in SS} VLB_{ds} f_{n,ds,ss}^v + \quad (32)$$
$$\sum_{v\in V}\sum_{n=(j,t)\in N_r}\sum_{ds\in DS^j}\sum_{q\in Q} SAV_{n,ds,q}^v - \sum_{v\in V}\sum_{n=(j,t)\in N_r}\sum_{ss\in SS^j} VL_{ss} f_{n,ss}^v -$$
$$\sum_{v\in V}\sum_{a\in A^v} c_a x_a - \sum_{v\in V} OVR_v WS_v \sum_{a\in A_T^v} c_a O_a^v.$$

ii. Solution Techniques

The size of time-space network-based model easily becomes very large as the size of data instance increases. It is therefore very important to reduce the size of the network in a preprocessing step. Problem specific cuts and special branching rules can improve the performance of a Branch-and-Cut algorithm. In subsection 4.9.8(iii)(a) below, some effective branching rules and cuts for application in this problem are below. The problem studied in this report is a difficult problem to solve, but at the same time it is important in practice to have a good solution that may not necessarily be proven to be the globally optimal solution within a reasonable period of time. Thus the development of a heuristic algorithm is imperative in order to find a good solution in that reasonable amount of time. As described below, a series of optimization-based heuristics has been developed for such purposes. In subsection 4.9.8(iii)((b)(1-4) below, the entire solution process developed for the new METEORITE model is presented. This system includes a construction heuristic, an optimization-based large neighborhood search procedure, and a time and volume optimization step.

a. Branch and Cut

A few sets of valid cuts have been identified that aid in tightening the formulation. These cuts can be added either on the fly or at the root node of a Branch-and-Cut algorithm.

For any $t \in \{1, 2, \ldots, T\}$ and $ss \in SS^j$ such that $j \in J^L$, $I_{ss,0} + \Sigma_{t' \leq t} P_{ss,t'}$ represents the amount of product available at supply stream ss up to time t. Any ship on any time no later than t cannot load more than $\min\{F_j^{max}, \max_{t' \leq t}\{I_{ss,t'}^{max} + P_{ss,t'} - I_{ss,t'}^{min}\}\}$ per load from supply stream ss. This gives a lower bound, $$LB_{ss,t} = \left\lceil \frac{I_{ss,0} + \sum_{t' \leq t} P_{ss,t'} - I_{ss,t}^{max}}{\min\{F_j^{max}, \max_{t' \leq t}\{I_{ss,t'}^{max} + P_{ss,t'} - I_{ss,t'}^{min}\}\}} \right\rceil,$$

on the number of loads up to time t from the beginning date for supply stream ss. Since $I_{ss,t}^{max}$, $I_{ss,t}^{min}$, and $P_{ss,t}$ are not constant overtime, $$LLB_{ss,t} = \max_{t' \leq t}\{LB_{ss,t'}\},$$

can sometimes give a tighter bound than $LB_{ss,t}$.

For any $t \in \{1, 2, \ldots, T\}$ and $j \in J^L$, $\Sigma_{ss \in SS^j}\{I_{ss,0} + \Sigma_{t' \leq t} P_{ss,t'}\}$ represents the combined amount of product available at port j up to time t. Any ship on any time no later than t cannot load more than $\min\{F_j^{max}, \max_{t' \leq t}\{\Sigma_{ss \in SS^j}\{I_{ss,t'}^{max} + P_{ss,t'} - I_{ss,t'}^{min}\}\}\}$ per load from port j. This gives a lower bound, $$LB_{j,t} = \left\lceil \frac{\sum_{ss \in SS^j}\{I_{ss,0} + \sum_{t' \leq t} P_{ss,t'} - I_{ss,t}^{max}\}}{\min\{F_j^{max}, \max_{t' \leq t}\{\sum_{ss \in SS^j}\{I_{ss,t'}^{max} + P_{ss,t'} - I_{ss,t'}^{min}\}\}\}} \right\rceil,$$

on the number of loads up to time t from the beginning date for load port j. Since $I_{ss,t}^{max}$, $I_{ss,t}^{min}$, and $P_{ss,t}$ are not constant over time, $$LLB_{j,t} = \max_{t' \leq t}\{LB_{j,t'}\},$$

can sometimes give a tighter bound than $LB_{j,t}$. Then the following set of inequalities is a set of valid inequalities.

$$\sum_{v \in V} \sum_{\{n=(j,t') \in N_T | t' \leq t\}} z_n^v \geq \max\{LLB_{j,t}, \max_{ss \in SS^j}\{LLB_{ss,t}\}\},$$

$$\forall j \in J^L, \forall t \in \{1, 2, \ldots, T\}.$$

Similar valid inequalities for discharge ports can also be defined. Let $$LB_{ds,t} = \left\lceil \frac{I_{ds,t}^{min} - \left(I_{ds,0} - \sum_{t' \leq t} D_{ds,t'}\right)}{\min\{F_j^{max}, \max_{t' \leq t}\{I_{ds,t'}^{max} + D_{ds,t'} - I_{ds,t'}^{min}\}\}} \right\rceil,$$

$$LLB_{ds,t} = \max_{t' \leq t}\{LB_{ds,t'}\},$$

$$LB_{j,t} = \left\lceil \frac{\sum_{ds \in DS^j}\{I_{ds,t}^{min} - \left(I_{ds,0} - \sum_{t' \leq t} D_{ds,t'}\right)\}}{\min\{F_j^{max}, \max_{t' \leq t}\{\sum_{ds \in DS^j}\{I_{ds,t'}^{max} + D_{ds,t'} - I_{ds,t'}^{min}\}\}\}} \right\rceil,$$

$$LLB_{j,t} = \max_{t' \leq t}\{LB_{j,t'}\}.$$

Then the following inequalities are valid inequalities for discharge ports.

$$\sum_{v \in V} \sum_{\{n=(j,t') \in N_T | t' \leq t\}} z_n^v \geq \max\{LLB_{j,t}, \max_{ds \in DS^j}\{LLB_{ds,t}\}\},$$

$$\forall j \in J^D, \forall t \in \{1, 2, \ldots, T\}.$$

If the limit on the number of loads or discharges at port j is imposed, the following valid inequalities can cut off the optimal solution of LP relaxation.

$$\sum_{\{n=(j,t)|t \in \{1,2,\ldots T\}\}} z_n^v \leq u_j \left( \sum_{\{a=(v,(j,t),(j',t')) \in A_T\}} x_a + \sum_{\{a=(v,(j,t),(0,T+1)) \in A\}} x_a \right),$$

$$\forall j \in J, \forall v \in V.$$

Even though no examples are provided here to illustrate this point, the solution from the LP relaxation of the original model is violated by these sets of inequalities on occasion.

The following set of constraints is imposed.

$$\left( \sum_{\{a=(v,(j',t'),(j,t)) \in A_T\}} x_a + \sum_{\{a=(v,(0,0),(j,t)) \in A\}} x_a \right) \leq 1, \forall j \in J, \forall v \in V.$$

Due to the direct revisit, a special branching rule can be employed. We divide the solution space into $\Sigma_{\{a=(v,(j,t),(j',t')) \in A_T\}} X_a = 1$ and $\Sigma_{\{a=(v,(j,t),(j',t')) \in A_T\}} X_a = 0$ for each $v \in V$ $j \in J$, and $j' \in J$ such that $j \neq j'$. We apply a similar branching rule to the arcs from SRC and arcs to SNK. This special branching rule makes the branch tree more balanced so that the highest priority is given to this special branching.

b. Optimization Based Heuristic Methods

Most of the time, the practical instances of the proposed MILP model are too large and complicated to solve in a reasonable amount of time. However, the developed optimization algorithm works well with small instances. Due to this fact, the optimization algorithm can be used in the framework of a large neighborhood search. This method is similar to the 2-opt algorithm developed for the Traveling Salesman Problem in the sense that we continue iterating the optimization of subproblems in which most ship routes are fixed and only two ships are free to be re-scheduled until no better solution can be found. The initialization of this method requires starting with a feasible solution. The primary difficulty with the method is that sometimes finding an initial integer feasible solution is not an easy task. A construction heuristic is therefore developed to find integer feasible solutions quickly. The next step is to call the ILOG CPLEX Solution Polishing algorithm in order to improve the solution before applying the optimization-based large neighborhood search procedure. This solution polishing method is a proprietary commercial solver technology involving some combination of local neighborhood search and genetic algorithms. It should be noted that his solution method is dependent on the use of the ILOG CPLEX solver technology. In the event that another MILP solver technology is used, some substitute would be required to replace the ILOG CPLEX Solution Polishing algorithm. Dash Optimization's XpressMP solver could be used as a potential replacement for CPLEX. A specialized neighborhood search algorithm can also be developed to replace the Solution Polishing algorithm.

1. Construction Heuristic

The goal of the Construction Heuristic developed here is to quickly find a feasible solution such that the improvement heuristics developed below can use this feasible solution as an initial starting solution. The brute force method of achieving this goal would be to run a Branch-and-Cut algorithm on the full MILP model until it finds a feasible solution. Such a method is unacceptable because in typical cases it is computationally intensive to find a feasible solution due to the problem complexity. Due to this, instead of using the full model to find a feasible solution, a reduced model is built in such a way that any of its feasible solution is also a feasible solution to the original full model. The reduced model which is smaller than the full model increases the likelihood of finding a feasible solution faster. The reduced model has been used successfully in practice to find an initial solution. There could be many other ways of designing alternate construction heuristics. Since different initial solutions can produce different final solutions, it may be useful to develop several construction heuristics that all have fast computational speed. This remains a topic for future research.

The idea of the reduced model for the Construction Heuristic is simple: instead of allowing each ship to be able to visit any load port, accessible load ports are restricted for each ship based on production schedules for load ports and available dates for ships. Algorithm 1 shows how it is decided which ship is accessible to which load port in the reduced model for the Construction Heuristic. The size of the reduced model is controlled with the parameter AF, which is short for Aggressiveness Factor for the Construction Heuristic.

---
Algorithm 1 Construction of Reduced Model
---

Set $K_{j,t} = \max\{0, LLB_{j,t}\}$, $\forall j \in J^L$ $\forall t \in \{1, 2,..., T\}$
Set $T_v$ to the earliest available time of ship $v \in V$
Set $Acc_{j,v} = 0$ $\forall j \in J^L$ $\forall v \in V$
Set count = 0
while count < AF do
    $j' = \mathrm{argmin}_j\{t|K_{j,t} \geq 1\}$
    $v' = \mathrm{argmin}_v\{T_v\}$
    $Acc_{j',v'} = 1$
    for t do
        if $K_{j',t} \geq 1$ then
            $K_{j',t} = K_{j',t} - 1$
        end if
    end for
    if $\Sigma_{j,t} K_{j,t} = 0$ then
        Set $K_{j,t} = \max\{0, LLB_{j,t}\}$, $\forall j \in J^L$ $\forall t \in \{1, 2,..., T\}$
        count = count + 1
    end if
    $T_{v'} = T + 1$
    if $\min_v\{T_v\} = T + 1$ then
        Set $T_v$ to the earliest available time of ship $v \in V$
    end if
end while

---

Ship v can visit load port j only when $Acc_{j,v}=1$ in the reduced model. That means that if $Acc_{j,v}=0$, all associated arcs are removed in the reduced model. The default value of AF used in practice is 2, which seems to work well most of the time. If the reduced model is infeasible, AF is increased to 3 or 4 to build a new reduced model for the Construction Heuristic. The Construction Heuristic applies the Branch-and-Cut algorithm introduced earlier to this reduced model. It stops at the first feasible solution or after a predetermined run-time expires without finding a feasible solution. These procedures all collectively compose the Construction Heuristic. It is possible that the Construction Heuristic can fail to find an initial solution even though the original model is feasible. However, in practice, this rarely happens. When the Construction Heuristic fails, the original model is used to find an initial feasible solution.

2. Large Neighborhood Search

The real world instances of the proposed MIP model are too large and complex to solve in a reasonable amount of time. The optimization algorithm introduced earlier, however, works well for small instances. This makes it possible to use the optimization algorithm in the framework of a large neighborhood search.

The search starts with a feasible solution. By fixing some of the binary variables to the values of the current feasible solution, a small subproblem is constructed. This procedure continues until it is determined that a better solution cannot be found with this method. The Large neighborhood Search algorithm is described in detail in Algorithm 2.

---
Algorithm 2 Large Neighborhood Search
---

Set count = 0
while count < |V|*(|V|-1)/2 do
    Select two ships v and v' which have never been selected since the current best solution found Fix binary variables which are not associated with ship v and v' to their values in the current best solution
    Solve new subproblem
    if Better solution found then
        Update best solution
        count = 0
    else
        count = count + 1
    end if
end while

---

Note that there are many factors which can affect the performance of the search procedure. The initial solution can make the performance of this search different. The choice of two ships for each subproblem can produce different solutions. A time limit or some different stopping rules can also be enforced for the subproblems in case the solution takes too long. The best setting of these parameters can be different from instance to instance. The setting of the parameters of Algorithm 2 is tuned through a number of realistic computational experiments.

3. Time and Volume Optimization

When a feasible solution is available, a Time and Volume optimization problem can be generated by fixing route information of each ship based on the feasible solution. If the feasible solution available is not an optimal solution, solving the Time and Volume optimization problem can produce a better solution in some instances. The overall solution procedure described below includes solving Time and Volume optimization problems several times. Let $\hat{x}_n$ be the feasible solution from which we generate a Time and Volume optimization problem. Fixing the route information for each ship is performed by adding the following constraints to the original problem.

$$\sum_{\{a=(v,(0,0),(j,t)\in A)\}} x_a = \sum_{\{a=(v,(0,0),(j,t)\in A)\}} \hat{x}_a, \forall v \in V, \forall j \in J, \quad (33)$$

$$\sum_{\{a=(v,(j,t),(j',t')\in A_T)\}} x_a = \sum_{\{a=(v,(j,t),(j',t')\in A_T)\}} \hat{x}_a, \quad (34)$$

$$\forall v \in V, \forall j \in J, \forall j' \in J, j \neq j',$$

$$\sum_{\{a=(v,(j,t),(0,T+1)\in A)\}} x_a = \sum_{\{a=(v,(j,t),(0,T+1)\in A)\}} \hat{x}_a, \forall v \in V, \forall j \in J. \quad (35)$$

There is another excellent use of the Time and Volume optimization. This model can be used to evaluate user's existing solution to the business problem. The model can produce a better solution by just using the route information. The need for a user to merely provide the route information for each ship from the solution they have independently derived is convenient. The optimization technique thus makes it a simple process in practice to compare with an existing solution since a complete solution specification would be complex involving both routes and timing for all vessels and would be very cumbersome to manually input into a decision support tool. Users can also compare their own independent solution with those the algorithm developed in this report. This is one way of evaluating the quality of the solutions from the algorithm and it also provides a user confidence in the solutions determined by the heuristic algorithms.

4. Overall Procedure

By combining the Construction Heuristic, ILOG CPLEX Solution Polishing, the Large Neighborhood Search, and the Time and Volume optimization, a very effective optimization based solution method is designed for the problem. The Branch-and-Cut algorithm is implemented with the ILOG CPLEX 10 MIP solver. The solution method begins by running the Construction Heuristic. If it finds a feasible solution, the Time and Volume optimization is applied to the route of the solution which may allow it to terminate with a better solution. This solution is called incumbent solution. The ILOG CPLEX Solution Polishing algorithm is then applied in order to improve the solution for some given amount of time. The incumbent is updated if a better solution is found during this process. The Time and Volume optimization is then again applied to the route of the incumbent solution. If this terminates with a better solution, then the incumbent solution is updated. The incumbent solution is then passed to the Large Neighborhood Search algorithm. If that finds a better solution, the Time and Volume optimization algorithm is applied again. Algorithm 3 describes the whole procedure in detail.

---
Algorithm 3 METEORITE Solution Method
---
Run Construction Heuristic
if Construction Heuristic fails to find an initial solution then
    Run Branch-and-Cut to the original model until it finds a feasible solution
    if Original model is infeasible then
        Terminate
    end if
end if
Solve time and volume optimization model constructed from incumbent
Run ILOG Solution Polishing for a given amount of time ---
-continued Algorithm 3 METEORITE Solution Method
---
Solve Time and Volume optimization model constructed from incumbent
Run Large Neighborhood Search starting from incumbent
Solve Time and Volume optimization model constructed from incumbent Time limits are enforced on the Construction Heuristic, Time and Volume optimization, and subproblems in the Large Neighborhood Search procedure in order to make sure the overall procedure terminates in a reasonable amount of time. These limits are tuned through extensive computational experiments. Most of the time, these routines terminate before they reach their time limits. This implies that, most of the time, the construction heuristic terminates with a feasible solution, and the time and volume optimization model and subproblems in large neighborhood search procedure are solved up to optimality.

iv. Time-Space Network Model: Variations for Practical Requirements

Many variations of the model introduced earlier are confronted in practice. The purpose of this section is to discuss how one can incorporate these practical variations into the model.

Third party ports are different from company owned or operated ports because the supply and demand stream inventory levels are not tracked. For each stream at a third party port, time windows and the amount of available product for loading or discharging for each time window are given. Let $T_{ss,k}^1$ and $T_{ss,k}^2$ represent the beginning and the ending of $k^{th}$ time window for a supply stream ss$\in SS^j$ such that $j \in J^3 \cap J^L$ respectively. Let $Q_{ss}^k$ represent available amount for loading during $k^{th}$ time window for third party supply stream ss. Similarly, let $T_{ds,k}^1$ and $T_{ds,k}^2$ represent the beginning and the ending of $k^{th}$ time window for a demand stream ds$\in DS^j$ such that $j \in J^3 \cap J^D$ respectively. Let $Q_{ds}^k$ represent maximum amount for discharging during $k^{th}$ time window for third party demand stream ds. We assume that time windows for a third party stream are mutually exclusive.

Instead of Constraint (4) and (5) defined earlier, the following constraints are required for each time window k of a third party supply stream.

$$\sum_{v \in V} \sum_{\{n=(j,t)|T_{ss,k}^1 \leq t \leq T_{ss,k}^2\}} f_{n,ss}^v \leq Q_{ss}^k, \forall j \in J^3 \cap J^L, \forall ss \in SS^j.$$

For each time window k of third party demand stream, the following constraints are necessary.

$$\sum_{v \in V} \sum_{ss \in SS} \sum_{\{n=(j,t)|T_{ds,k}^1 \leq t \leq T_{ds,k}^2\}} f_{n,ds,ss}^v \leq Q_{ds}^k, \forall j \in J^3 \cap J^D, \forall ds \in DS^j.$$

Spot market streams are an extreme case of third party streams because their time window is essentially the entire time horizon. Like third party streams, inventories are not tracked for spot market streams and there is a maximum amount for loading or discharging for each day at a spot market stream. Let $Q_{ss}^t$ and $Q_{ds}^t$ denote these amounts. Constraint (4) and (5) are replaced with the following constraints for spot market streams. In typical METEORITE business data instances, the U.S. spot sales market is in this category.

$$\sum_{v \in V} f_{n,ss}^v \leq Q_{ss}^j, \forall j \in J^M \cap J^L, \forall ss \in SS^j,$$

$$\forall t \in \{1, 2, \ldots, T\}, n = (j, t),$$

$$\sum_{v \in V} \sum_{ss \in SS} f_{n,ds,ss}^v \leq Q_{ds}^k, \forall j \in J^M \cap J^D,$$

$$\forall ds \in DS^j, \forall t \in \{1, 2, \ldots, T\}, n = (j, t).$$

A lower limit $N^{LBV}$ and an upper limit $N^{UBV}$ on the number of ships used in the solution can be easily considered in the model.

$$N^{LBV} \leq \sum_{v \in V} (1 - x_{(v,(0,0),(0,T+1))}) \leq N^{UBV}.$$

A minimum amount of product M to be transported may be imposed as an optional constraint. The following constraint equation adds such a consideration.

$$\sum_{v \in V} \sum_{\{n=(j,t) \in N_r | j \in J^D\}} \sum_{ds \in DS^j} \sum_{ss \in SS} f_{n,ds,ss}^v \geq M.$$

For each ship $v \in V$, there may exist a demurrage limit $DW_v$. This is represented by $$\sum_{\{a \in A_D^v\}} x_a \leq DW_v, \forall v \in V.$$

Each ship $v \in V$ may need to load at least $pct_v$ percent of base volume. To satisfy this requirement, we define the set of constraints $$\sum_{\{n=(j,t) \in N_r | j \in J^L\}} \sum_{ss \in SS^j} f_{n,ss}^v \geq pct_v B_v \sum_{\{a=(v,(0,0),(0,T+1)) \in A\}} (1 - x_a), \forall v \in V.$$

A port may have a special requirement on the minimum amount of time between consecutive loads or discharges. Let port j need at least $T_j^{adj}$ amount of time between any consecutive loads or discharges. For each $t \in \{1, 2, \ldots, T-T_j^{adj}\}$, the following constraint ensures this requirement, by defining $$\sum_{v \in V} \sum_{\{n=(j,t') \in N_r | t \leq t' \leq t+T_j^{adj}\}} z_n^v \leq 1.$$

Inventory holding costs could also be added to the model. Since product may be purchased from third party ports and spot markets, the amount and timing of these purchases can make an impact on such costs. If all the ports are company owned ports, it is not necessary to consider inventory holding costs because production and demand profiles are fixed inputs in the model and cannot be controlled as decision variables.

Let $h^L$ represent the inventory holding cost per unit per day for products at load ports. Let $h^D$ represent the inventory holding cost per unit per day for products at discharge ports. Let $h^S$ represent the inventory holding cost per unit per day for products on board a ship. It should be noted that these values can be easily made product and time specific without adding any additional complexity to the model. The following term is necessary to be added to the objective function in order to consider inventory holding costs.

$$-\left[ h^L \sum_t \sum_{j \in J^L \cap J^O} \sum_{ss \in SS^j} I_{ss,t} + \\ h^S \sum_t \sum_{v \in V} \sum_{ss \in SS} I_{ss,t}^v + h^D \sum_t \sum_{j \in J^D \cap J^D} \sum_{ds \in l_{DS}^j} I_{ds,t} \right].$$

Up to this point, it has been assumed that only spot ships may be used for the transportation of product. However, this is not always the case. Spot product is delivered to some refineries by barges. This feature can be implemented either explicitly or implicitly. However, explicit implementation makes the model too complicated and this is not the key component of the model. These special features are implemented implicitly in the METEORITE model, which means that each ship's movements are not modeled for these special cases.

For discharging product from the U.S. spot market, total discharge on a day must be enforced not to exceed daily product availability. There is no blending allowed when barges are used and the inventory level at the demand stream needs to accommodate the products from U.S. spot purchase market.

5.0 Closing

While this description utilizes a variety of screenshots, examples and illustrative equations to fully illustrate the concepts behind the invention, the invention is by no means so limited. Various modifications, adjustments and applications of the disclosed invention will be apparent to those of ordinary skill in the art and are covered to the extent they fall within the scope of the appended claims.

What is claimed is:

1. An apparatus for determining the transportation of bulk products, comprising:
   (i) a processing device;
   (ii) a memory device storing data containing:
      (a) an identification of a plurality of supply locations and a plurality of demand locations;
      (b) at each supply location: identification of one or more supply streams of bulk products, and the monetary values of the bulk products from the supply streams;
      (c) at each demand location: identification of one or more demand streams of bulk products, and the monetary values of the bulk products that meet the property specification requirements of the demand streams;
      (d) identification of a fleet of vehicles that can load bulk products at the supply locations and discharge bulk products at the demand locations;
      (e) the capacity of each vehicle in the fleet; and
      (f) the transportation costs related to the transport of bulk products from the supply locations to the demand locations;
   (iii) a computer application executable by the processing device to formulate a mathematical model using the stored data in the memory device, wherein the mathematical model can be solved for feasible bulk product allocation, transportation routing and transportation vehicle/route scheduling for the movement of bulk products from supply locations to demand locations within a planning horizon, wherein the model comprises an objective function for net profit margin and a plurality of constraints including inventory constraints at the supply locations and the demand locations, and wherein the objective function for net profit margin comprises the sum of the monetary values of the bulk products discharged to the demand streams, including specification adjusted valuations of the discharged bulk products that are blended from different supply streams, minus the sum of the monetary values of the bulk products loaded from the supply streams and costs including the costs related to the transportation of the bulk products between the supply locations and the demand locations; and (iv) a calculation engine comprising a solver operable by the processing device to obtain a solution to the mathematical program model that maximizes the objective function for net profit margin.

2. The apparatus of claim 1, wherein mathematical model is a mixed-integer linear program model and the calculation engine applies one or more linear programming optimization algorithms.

3. The apparatus of claim 2, wherein the one or more mixed integer linear programming optimization algorithms includes an algorithm that fixes routes and optimizes based on the timing and volume of each load and discharge of bulk product.

4. The apparatus of claim 2, wherein the one or more mixed integer linear programming optimization algorithms includes a branch-and-cut algorithm.

5. The apparatus of claim 2, wherein the calculation engine applies one or more heuristic algorithms to obtain an initial feasible solution to the mixed integer linear programming model.

6. The apparatus of claim 5, wherein the one or more heuristic algorithms includes a construction heuristic and a large neighborhood search.

7. The apparatus of claim 6, wherein the large neighborhood search is performed iteratively.

8. The apparatus of claim 5, wherein each heuristic algorithm can run up to a pre-determined maximum length of time.

9. The apparatus of claim 2, wherein each mixed integer linear programming optimization algorithm can run up to a pre-determined maximum length of time.

10. The apparatus of claim 2 where the calculation engine, prior to obtaining a solution to the linear programming model, reduces the mixed integer linear programming model.

11. The apparatus of claim 10, wherein the linear programming model is reduced by restricting the accessible supply locations for each vehicle based on the anticipated production at each supply location and the available dates of each vehicle.

12. The apparatus of claim 1, wherein the stored data includes at least one demand location that requires a bulk product having a different property than the bulk products available from the supply streams.

13. The apparatus of claim 1, wherein each vehicle is a vessel, each supply location is a supply port, and each demand location is a demand port.

14. The apparatus of claim 1, wherein the fleet of vehicles is heterogeneous.

15. The apparatus of claim 1, wherein the one or more constraints include one or more of the following: flow conservation, inventory balance at the supply streams, inventory balance for the vehicles, minimum and maximum load amounts for each supply location, minimum and maximum discharge amounts for each demand location, only one vehicle at a time may load or discharge at a supply location or a discharge location, limits on the number of loads and discharges for each vessel at the supply locations and the demand locations, upper and lower property specification bounds for each demand stream, draft limits for each vehicle, and a vehicle cannot exceed cargo capacity.

* * * * *